US012629548B2

(12) United States Patent
Statter et al.

(10) Patent No.: US 12,629,548 B2
(45) Date of Patent: May 19, 2026

(54) NETWORKS, SYSTEMS AND METHODS FOR WILDFIRE MITIGATION

(71) Applicant: Has LLC., Jackson, WY (US)

(72) Inventors: Harry A. Statter, Jackson, WY (US); Michael L. Simmons, San Francisco, CA (US)

(73) Assignee: HAS LLC, Jackson, WY (US)

( * ) Notice: Subject to any disclaimer, the term of this patent is extended or adjusted under 35 U.S.C. 154(b) by 331 days.

(21) Appl. No.: 18/366,803

(22) Filed: Aug. 8, 2023

(65) Prior Publication Data

US 2024/0216727 A1 Jul. 4, 2024

Related U.S. Application Data

(63) Continuation-in-part of application No. 17/979,716, filed on Nov. 2, 2022.

(60) Provisional application No. 63/493,734, filed on Apr. 1, 2023, provisional application No. 63/421,949, filed on Nov. 2, 2022, provisional application No. 63/397,891, filed on Aug. 14, 2022, provisional application No. 63/396,162, filed on Aug. 8, 2022, provisional application No. 63/274,900, filed on Nov. 2, 2021.

(51) Int. Cl.
*A62C 3/02* (2006.01)
*G08B 17/00* (2006.01)

(52) U.S. Cl.
CPC .............. *A62C 3/02* (2013.01); *G08B 17/005* (2013.01)

(58) Field of Classification Search
CPC ................................ A62C 3/02; G08B 17/005
See application file for complete search history.

(56) References Cited

U.S. PATENT DOCUMENTS

| | | | |
|---|---|---|---|
| 4,428,434 | A | 1/1984 | Gelaude |
| 5,165,482 | A | 11/1992 | Smagac |
| 5,931,233 | A | 8/1999 | La Bonte |
| 6,523,616 | B1 | 2/2003 | Walllace |
| 9,619,996 | B1 | 4/2017 | Smith |
| 10,016,643 | B2 | 7/2018 | Smith |
| 10,042,086 | B1 | 8/2018 | Smalley |

(Continued)

FOREIGN PATENT DOCUMENTS

JP 2021077392 A * 5/2021

OTHER PUBLICATIONS

U.S. Appl. No. 18/798,451, filed Aug. 8, 2024, Statter.
U.S. Appl. No. 18/972,760, filed Dec. 6, 2024, Statter.

*Primary Examiner* — Steven Lim
*Assistant Examiner* — James E Munion
(74) *Attorney, Agent, or Firm* — Belvis Law, LLC.; Glen P. Belvis

(57) ABSTRACT

There is provided networks, systems and displays for providing derived data and predictive information for use in emergencies; and in particular for use in wildfire emergencies. More particularly, there is provided systems, equipment and networks having a control system having an operation control command plan for performing an operation plan. in embodiments the operation plan can be a hydration plan, a lockout plan, a low line pressure plan, an adjacent structure based plan, an auto-activation notice with default activation plan. In an embodiment there is provided a parcel by parcel control and optimization of the EFMS for a particular area.

5 Claims, 26 Drawing Sheets

(56) References Cited

U.S. PATENT DOCUMENTS

| | | | | |
|---|---|---|---|---|
| 11,247,087 | B2 * | 2/2022 | McDonald | G08B 17/005 |
| 11,295,131 | B1 | 4/2022 | Dhawan | |
| 11,642,555 | B2 | 5/2023 | Conboy | |
| D1,029,025 | S | 5/2024 | Statter | |
| D1,033,465 | S | 7/2024 | Statter | |
| D1,033,466 | S | 7/2024 | Statter | |
| D1,034,673 | S | 7/2024 | Statter | |
| D1,035,677 | S | 7/2024 | Statter | |
| 2004/0163827 | A1 | 8/2004 | Privalov | |
| 2005/0139363 | A1 | 6/2005 | Thomas | |
| 2006/0113403 | A1 | 6/2006 | Aamondt | |
| 2009/0266563 | A1 | 10/2009 | Wright | |
| 2009/0321094 | A1 | 12/2009 | Thomas | |
| 2010/0000743 | A1 | 1/2010 | Cohen | |
| 2013/0321637 | A1 | 12/2013 | Frank | |
| 2014/0132409 | A1 | 5/2014 | Billman | |
| 2014/0209330 | A1 | 7/2014 | Statter | |
| 2015/0136428 | A1 | 5/2015 | Connery | |
| 2015/0321033 | A1 | 11/2015 | Statter | |
| 2016/0142612 | A1 | 5/2016 | Brav | |
| 2016/0304051 | A1 | 10/2016 | Archer | |
| 2017/0372578 | A1 | 12/2017 | Klein | |
| 2018/0054982 | A1 | 3/2018 | Whalley | |
| 2018/0063529 | A1 | 3/2018 | Statter | |
| 2018/0239948 | A1 | 8/2018 | Ritschman | |
| 2019/0168035 | A1 | 6/2019 | Conboy | |
| 2019/0262637 | A1 | 8/2019 | Satter | |
| 2020/0159397 | A1 | 5/2020 | Tohidi | |
| 2020/0242916 | A1 | 7/2020 | Krstanovic | |
| 2021/0308507 | A1 * | 10/2021 | Johnson | A62C 3/0264 |
| 2022/0001222 | A1 | 1/2022 | Dor | |
| 2023/0092407 | A1 | 3/2023 | Statter | |
| 2023/0186744 | A1 | 6/2023 | Statter | |
| 2023/0293924 | A1 | 9/2023 | Statter | |
| 2024/0216736 | A1 | 7/2024 | Statter | |

* cited by examiner

NETWORKS, SYSTEMS AND METHODS FOR WILDFIRE MITIGATION

This application: (i) claims priority to, and under 35 U.S.C. § 119(e)(1) the benefit of, U.S. provisional application Ser. No. 63/493,734 filed Apr. 1, 2023; (ii) claims priority to, and under 35 U.S.C. § 119(e)(1) the benefit of, U.S. provisional application Ser. No. 63/421,949 filed Nov. 2, 2022; (iii) claims priority to, and under 35 U.S.C. § 119(e)(1) the benefit of, U.S. provisional application Ser. No. 63/397,891 filed Aug. 14, 2022; (iv) claims priority to, and under 35 U.S.C. § 119(e)(1) the benefit of, U.S. provisional application Ser. No. 63/396,162 filed Aug. 8, 2022; (iv) and, is a continuation-in-part of U.S. application Ser. No. 17/979,716 filed Nov. 2, 2022, which application claims priority to, and under 35 U.S.C. § 119(e)(1) the benefit of, U.S. provisional application Ser. No. 63/274,900 filed Nov. 2, 2021, the entire disclosure of each of which is incorporated herein by reference.

BACKGROUND OF THE INVENTION

Field of the Invention

The present inventions relate to networks, control systems, and multivariable component systems and activities for the management, mitigation, and suppression of wildfires.

As used herein, unless specified otherwise, the terms "multivariable component system", "multivariable component activities", "multivariable components" and similar such terms are to be given their broadest possible meanings, and would include, for example, the flow of motorized vehicle traffic in a traffic pattern, a particular area or location, or highway system; the movement of people in a particular area, location or within a structure; the movement and location of emergency response equipment and personnel including fire trucks, police, rescue, medical, ambulances, heavy equipment, and flight equipment (e.g., air planes and helicopters); the location and path of a wildfire; and, the status of hydration levels of areas and locations, the status of fire suppression systems, internal to a structure and external to the structure, (e.g., armed, operating, standby, available water pressure, etc.) and the water pressure or line pressure of areas and locations.

The term "wildfire" as used herein, unless specified otherwise should be given its broadest possible meaning and would include any outdoor fire, and any fire that is located outside of a structure, this would include for example brush fires, forest fires, and grass fires. The term wildfire, however, as used herein, unless specified otherwise, would further include structure fires that were caused directly or indirectly by a wildfire.

In a wildfire, and in particular in situations where the fire is threatening or active in a populated area, there are highly complex and unpredictable multi-variable, multi-actor events that can take place. These wildfire related multi-variable, multi-actor events are further complicated by a loss of visibly that typically occurs at, near and in a wildfire. These wildfire related multi-variable, multi-actor events, could include, for example, events and variables, such as temperature, humidity, hydration level of areas, water pressure of areas, status of internal and external fire suppression systems wind speed, location of the fire, available fuel for the fire, terrain, movement and location of fire crews, road closures, traffic conditions, movement and location of people and private vehicles, as well as, evolving strategies to combat the wildfire and protect life and property. These wildfire related multi-variable, multi-actor events can be at times, and typically are managed by several different agencies or emergency response groups creating difficulty to effectively and efficiently manage the wildfire, the people and property involved with the wildfire, and determine, implement and adapt the most effective integrated strategy and response to protect life and property from the wildfire. Although emergency response and fire management agencies and groups do an admirable, commendable and heroic job in response to a wildfire, there still exist a long standing and increasing need for better, more efficient, more effective and safer integrated strategies and responses. Thus there is a continuing need for integrated and comprehensive, solutions, predictions regarding trends and conditions relating directly to the fire, e.g., fire intensity, wind, humidity, fire direction, persons at risk in the fire and directly in the path of the fire, structures in the fire and directly in the fires path, fuel sources in fire path; as well as, peripheral matters to the fire, such as evacuation routes, traffic, occupancy, type of structure, static fire protections systems (i.e., structure or areas with their own fire protection system such a sprinklers, foam, flowing water), access to the active fire area and predicted path of the fire for response teams, the movement of response teams, logistics of supplies, the status of hydration levels of areas and locations, the status of fire suppression systems, internal to a structure and external to the structure, (e.g., such as armed, operating, standby, available water pressure, etc.) and the water pressure or line pressure of areas and locations. These continuing needs occur, in spite of the fact, and perhaps because of the fact, that there is a large amount of real time raw data and historic raw data available about a fire, fire conditions, traffic, logistics, etc.

This large stream, or amount, of raw data provides little or no determinative information or predictive value. Further, and in general, the trend in the art of data management, media and public information has been to provide more and more data, and to present this data in fancier packaging, images and graphics. While this more visually stimulating presentation of raw data may be entertaining to some, its large volume may be confusing to others. Thus, in spite of the direction of the art to provide larger and larger amounts of raw data, and to do so in more visually stimulating ways, there exists a long felt and unmet need for determinative information of predictive value in wildfire mitigation and management, either or both: (i) directly related to the fire, for example, fire intensity, wind, humidity, fire direction, predicted path of the fire, location of embers, direction of embers, persons at risk in the fire and directly in the path of the fire, structures in the fire and directly in the path of the path, fuel sources in the fire path, water supply and usage in the fire area, power grid in the fire area; and, (ii) peripherally associated with or indirectly related to the fire, for example, evacuation routes, traffic, occupancy, type of structure, static fire protections systems (e.g., structure or areas with their own fire protection system such a sprinklers, foam, flowing water), access and egress for the active fire area, access and egress for the area in the predicted path of the fire, response team (e.g., ambulance, fire, medical, evacuation, heavy equipment, air support, police) movement, response team location, power grid operability, water availability, logistics of supplies, the status of hydration levels of areas and locations, the status of fire suppression systems, internal to a structure and external to the structure, (e.g., such as armed, operating, standby, available water pressure, etc.) and the water pressure or line pressure of areas and locations. It being understood that in fast moving and evolving wildfire situations, indirectly related matters can, and often do, become directly related matters, and can be at are as important as directly related matters.

This long felt and unmet need is exacerbated further by the rapidly increasing channels and access that professionals, public agencies, and the public (i.e., individuals) have through cable, radio, satellite radio, web pages, applications, television (cable and broadcast), mobile devices, laptops, iPads, cell phones, smart phones, watches, vehicle systems (e.g., navigation systems, self-driving systems, and interactive systems such as ONSTAR), and other portable and fixed data interfaces. Portable or mobile devices such as vehicle systems, phones, smart phones, tablets, iPads, laptops, watches and other portable devices are often unified by their ability to process data and structure and present content in the core internet technology of HTML5, whereas previous generation displays could be fragmented with heavier, less responsive, and generally more clunky platforms. These portable data interfaces present an even larger challenge to reducing the clutter, confusion, and general data overload to a user because often value-added data must be presented in more constrained visual real estate such as a mobile device screen and other portable data interface screens.

Furthermore, the clutter, confusion, and general data overload to a user can obscure desired user engagement mechanisms such as evacuation route planning, where an individual cannot easily determine their standing in real-time relative to the fire, traffic conditions and fire response teams.

There continues to be a need for improved and enhanced mechanisms to create and operate integrated, including fully integrated, systems for wildfire mitigation, management including direct and peripheral matters and activities. Further, for the purpose of planning and developing emergency plans, prior to the present inventions there exists no mechanism to create fully integrated, based upon historic data, hypothetical data, and both, virtual wildfire scenarios for the purpose of, by way of example, creating emergency response plans and training exercises.

As used herein, unless specified otherwise, the terms "actual data", "actual information", "raw data", "raw information", and similar such terms are to be given their broadest possible meaning and would include information obtained from direct and indirect observation, monitoring, measuring, sensing and combinations and variations of these. Actual data would include, for example: data from external fire suppression systems; global positioning satellite (gps) data; traffic sensor data; traffic camera data; traffic and map application data (such as WAZE, google maps); atmospheric temperature data, atmospheric wind data; atmospheric humidity data; weather data; transponder data, fire systems sensor data; sensors located in the environment data; data from individuals and professionals; cell phone data, such as location, speed, direction); and data from other devices, such as optical switches, laser radar, laser range finding and laser tracking, magnetic sensors such as those which may be embedded in a road surface, visual data; telemetry, such as when sensor, probe and monitor data is transmitted to a receiver, and radar measurement and monitoring systems. Actual data may also be logged on-board vehicle data, or data at a monitoring station that is stored and downloaded after fire management or emergency activity to become historic data. Actual data and information may be provided, received or obtained real-time, it may be provided, received or obtained as historic data or stored actual information from a prior event, and combinations and variations of these. Actual data and information may be in compilations of data, which may further be sorted, indexed, tagged or otherwise categorized.

As used herein, unless specified otherwise, the terms "derived data", "derived information" and similar such terms are to be given their broadest possible meaning and would include raw data upon which a calculation or operation has been performed. For example, if water consumption rate, e.g., gallons used per hour, is calculated by performing the operation of obtaining raw data for the amount of water present $w_1$, and $w_2$ at time $t_1$ and $t_2$; then calculating the amount of water used over time interval $t_2$-$t_1$, the resultant value, e.g., gals/hour, would be an example of derived data. Alternatively, if a flow sensor is installed on the water line or tank that directly measures the amount of water flowing from the line or tank, the data from that flow sensor would be actual data, not derived data. Accordingly, values such as averages are considered derived data, because they are derived from one or more operations on raw data. Although examples of simple (one, two or three) operations are provided above, it should be understood that tens, hundreds, thousands, and hundreds of thousands of operations or calculations, or more, may be performed on data to obtain derived data.

When derived data is stored, it becomes historic data, but also remains derived data, i.e., historic derived data. Derived data can be subjected to operations and calculations with the resulting information being derived data. Further, derived data, for example from real time raw data, can be combined with historic data, raw or derived, e.g., how a wildfire in a similar geographic setting behaved under similar environmental conditions, and used in operations and calculations to render additional derived data.

Derived data, from real time raw data, from historic data, and from combinations and variations of these, may be determinative information of predictive value to a multivariable component system, and in particular predictive value to a wildfire.

As used herein, unless specified otherwise, the terms "predictive data", "predictive information", "determinative information" and "determinative data" are to be given there broadest possible meanings and would include derived data and information that provides, for example, information about trends, information leading to future outcome, future events, predicted events, trends leading to further events, normalized real time performance as an indicator of future actions or events, and similar mathematically derived and predictive values that are, or are at least in part based upon, derived data. Predictive data and information would include derived data in the form of probabilities of likely outcome, windows of likely outcome and similar types of values. Predictive data may be micro in nature, macro in nature, cumulative in nature, and combinations and variations of these. Thus, for example, predicting that a particular fire crew will be positioned at a certain location at a certain time would be predictive information that is micro in nature. Using this micro predictive information with other predictive information, derived data, and raw data to predict that X homes need to be evacuated at time $t_1$ X' homes need to have external fire management systems turned on at time $t_1$, and Y fire response teams need to be at the area where the X homes are located at time $t_2$ would be an example of predictive information that is macro in nature. Predictive information about progression of a wildfire, embers, the evacuation of residents, traffic flow on ingress and egress routes, the activation of external fire management systems, and the positing of fire response teams would be a further example of predictive information that is macro in nature, and would also be comprehensive macro predictive information, and integrated macro predictive information.

As used herein, unless specified otherwise, the terms "external fire management system" ("EFMS"), "external fire suppression system", "static fire protection system", "fixed fire protection system", "structure fire protection system" and similar such terms, should be given their broadest possible meaning, and would include systems that provide a fire suppressant medium (e.g., water) on the outside of structures, to the adjacent grounds and both. The adjacent grounds would include land area, vegetation, and materials located in contact with, adjacent to, near and around the structure, e.g., as far as about 10 feet, about 20 feet, and about 50 feet, from 10 feet to 30 feet, from 5 feet to 75 feet, or more from the exterior walls of the structure. These systems can for example provide water in the form of sprays, mists, streams, sheets and combinations and variations of these to the structures and adjacent grounds. The systems can provide fire suppressant foam to the outside of structures and to the adjacent grounds. These systems can provide combinations of water and foam. These systems can, and typically do have, sensors and monitors, that provide data about the system, its activation, its rate of use of fire suppression medium (e.g., water or foam), the temperature(s) in and around the structure. It is understood that the exterior or outside of the structure includes one or more of the roof, exterior walls, outer surfaces of outside walls, gutters, garage doors, or any portion or part of the structure that is exposed to the outside environment, and thus likely to be exposed to the wildfire and embers. An example of a fixed fire protection system would be those provided by Frontline Fire Protection LLC., in Casper Wyoming.

As used herein, unless specified otherwise, the term "internal fire suppression system" and similar such terms, should be given its broadest possible meaning, and would include any automated sprinkler system or other fire suppression system that is located inside of a structure and configured to manage and suppress a fire that is inside of that structure. Typically, these internal fire suppression systems are static systems.

As used herein, unless specified otherwise, the terms "virtual data", "virtual entity" and similar such terms are to be given their broadest possible meaning and would include any types of data that are generated from, capture, result from, or relate to virtual activities. Thus, for example, if raw data, derived data and predictive data are used to conduct a virtual wildfire response, the information and data regarding that virtual response would be considered virtual data and information. Thus, it can be seen that there may be historic virtual data (e.g., last year's emergency virtual drill) and real time virtual data (e.g., a virtual drill being conducted real time). There may also be raw virtual data, derived virtual data, and predictive virtual data. Essentially, it is contemplated that all of the data, computations and predictions from the real world, may be used in a similar manner in a virtual world for planning, drilling and practicing purposes. It is further contemplated that these virtual activities can be used by professionals, as well as, private individuals, much as flight simulators can be used by pilots for training purposes, and amateurs for entertainment purposes.

As used herein, unless specified otherwise, the terms "node", "communication node", "point on a network", "communication point", "data point", "network address" and similar such terms are to be given their broadest possible meanings, and would include for example, sensors, processors, data receiving assemblies, data transmitting assemblies, data receiving/processing/transmitting assemblies, GUI, satellite dishes, cable boxes, transmitters, TVs, computers, gaming stations, gps transmitters, cellular devices, cellular phones, tablets, iPhones®, iPad®, I/O (input/output) devices, and data storage devices. A node may also be a structure or location where other nodes may be present, for example a structure with an external fire management system, having its own control network of sensors, activators, cell phone applications, and I/O devices.

As used herein, unless specified otherwise, the term "GUI" (graphic user interface) is to be given its broadest possible meaning and would include for example devices that are fully interactive, partially interactive and not interactive, it would include all types of displays and monitors (both with and without keyboards), it would include touch screen monitors and even heads up displays and Google Glass. Braille devices, and other devices for assisting in and communicating with the visually impaired, or persons with other disabilities, are considered herein to be a GUI.

As used herein, unless specified otherwise, the terms "network", "network pathway", "pathway" and similar terms are to be given there broadest meaning and would include any wires, optical, wireless, fibers, light waves, magnetic wave, or other medium over which data can be transmitted, combinations of various types of different types of these mediums, which would include for example, satellite broadcasts, conventional television signals, cable networks, telephone networks, DSL networks, the internet, the world wide web, intranets, private networks, local networks, cellular, Ethernet, node to node links, radio, telegraph, power lines, and other presently known or later developed technologies for transmitting, receiving and/or sharing data and information.

As used herein, unless specified otherwise the terms "adaptive strategy", "automated adaptive strategy", "responsive adaptive strategy" mean instructions, plans and strategies that are based upon predictive data, derived data or both, and that change (e.g., are updated) over a period of time during a wildfire event, based upon predictive, derived and both data that is obtained after the start of the wildfire event, after the initial implementation of a strategy, and both. Adaptive strategies can be updated once, twice, tens of times and thousands of times. The updates can occur in any time interval from days, to hours to minutes to seconds to fractions of a second.

Generally, the term "about" and the symbol "~" as used herein, unless specified otherwise, is meant to encompass the greater of a variance or range of +10%, or the experimental or instrument error associated with obtaining the stated value.

As used herein, unless expressly stated otherwise terms such as "at least", "greater than", also mean "not less than", i.e., such terms exclude lower values unless expressly stated otherwise.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard temperature and pressure.

As used herein, unless specified otherwise, the recitation of ranges of values, a range, from about "x" to about "y", and similar such terms and quantifications, serve as merely shorthand methods of referring individually to separate values within the range. Thus, they include each item, feature, value, amount or quantity falling within that range. As used herein, unless specified otherwise, each and all individual points within a range are incorporated into this specification, and are a part of this specification, as if they were individually recited herein.

This Background of the Invention section is intended to introduce various aspects of the art, which may be associated with embodiments of the present inventions. Thus, the foregoing discussion in this section provides a framework for better understanding the present inventions, and is not, and should not be viewed as, an admission of prior art.

SUMMARY

There has been a long standing, ever increasing need for systems, networks and methods that can integrate and control methods and systems for wildfire mitigation, management and suppression. This need, among others, includes a longstanding, ever-increasing need for the management and coordination of multiple EFMS, internal fire suppression systems, and both, during a wildfire event. This long standing and ever increasing need is believed to be present across all aspects of wildfire mitigation, management and suppression, including for example: coordination of external fire management systems, coordination of internal fire suppression systems, activation of external fire management systems; activation of internal fire suppression systems, coordination and management of water pressure, or line pressure, management of ingress and egress routes; evacuations, including notices and plans; response team deployment and supplies, to name a few. The present inventions meet these and other needs.

There has been a long standing, ever increasing need for systems, networks and methods that can provide for the automated control of interrelated systems and apparatus used for the mitigation, management and suppression of wildfires, and internal structure fires. This long standing and unmet need is believed to be present across all aspects of wildfire and internal structure fire mitigation, management and suppression, including for example: activation of external fire management systems; activation of internal fire management systems, management of available water resource systems, e.g., public water supply, including pressure, flow rate and location, during a fire emergency, and coordination of one or more and all of these systems, to name a few. The present inventions meet these and other needs.

Thus, there is provided a system for mitigating fire risks, the system having: an external fire management system (EFMS); a graphic user interface (GUI) device; a control system in control communication with the EFMS and the GUI device; the control system having an operation control command plan for performing an operation plan; and, the operation control command plan for performing an operation plan having an auto-activation notice with default activation plan.

In addition, there is provided a system for mitigating fire risks, the system having: a first external fire management system (EFMS) associated with a first structure; and, a control system having a lockout plan; wherein the lockout plan is configured to lockout the activation of the first EFMS upon the occurrence of a first event.

Further, there is provided a system for mitigating fire risks, the system having: an external fire management system (EFMS); a control system in control communication with the EFMS and a GUI device; the control system having an operation control command plan for performing an operation plan; and, an interlock, wherein the interlock is configured to perform an operation on one or more peripheral system associated with a structure protected by the EMFS.

Moreover, these systems, devices and methods can have one or more of the following features: wherein the operation control system is cloud-based; wherein the operation control system is at least in part contained in a local controller for the EFMS; and having a hydration plan; having a lockout plan; and having two or more of an interlock, a hydration plan, a lockout plan, a low line pressure plan, and an adjacent structure based plan.

Moreover, these systems, devices and methods can have one or more of the following features: wherein the auto-activation notice with default activation plan is configured to upon a predetermined event: start a time to activation countdown; send an automatic activation notice to the GUI device; and activate the EFMS upon an end of the countdown, unless the control system receives a deactivation instruction.

Moreover, these systems, devices and methods can have one or more of the following features: wherein the auto-activation notice causes the GUI device to display a first screen; wherein the first screen contains the time to activation countdown; wherein the first screen is configured to link to a second screen for display on the GUI device; wherein the second screen has a display for receiving a user input to activate the EFMS immediately; and wherein the second screen has a display for receiving a user input to deactivate the EFMS immediately.

Moreover, there is provided a system for mitigating fire risks, the system having: an external fire management system (EFMS); a control system in control communication with the EFMS and configured for control communication with a GUI device; the control system having an operation control command plan for performing an operation plan; the operation control command plan for performing an operation plan having an auto-activation notice with default activation plan; and, wherein the auto-activation notice with default activation plan is configured to upon a first event: determine a time to activation; start a countdown to activation based upon the determined time to activation; send a first automatic activation notice to the GUI device; and, activate the EFMS upon an end of the countdown, unless the control system receives a deactivation instruction from the GUI device.

Yet further, these systems, devices and methods can have one or more of the following features: wherein the auto-activation notice with default activation plan is configured to upon a second event adjust the time to activation to provide an adjusted countdown; send a second automatic activation notice to the GUI device, based upon the adjusted countdown; and activate the EFMS upon an end of the adjusted countdown, unless the control system receives a deactivation instruction from the GUI device; wherein the auto-activation notice with default activation plan is configured to upon a third event adjust the time to activation to provide a second adjusted countdown; send a third automatic activation notice to the GUI device, based upon the second adjusted countdown; and activate the EFMS upon an end of the second adjusted countdown, unless the control system receives a deactivation instruction from the GUI device; wherein the first even is based upon predictive data; wherein the first even is based upon derived data; wherein the first even is based upon real time data; wherein the first even is based upon at least two of: a location of a wildfire, a wind speed, a hydration levels, a location of smoke, a location of embers, a direction of movement of a wildfire, and a temperature; wherein the time to activation is predetermined; wherein the time to activation is at least 5 minutes; wherein the time to activation is at least 10 minutes; wherein the time to activation is from about 5 minutes to about 15 minutes; wherein the first auto-activation notice causes the GUI device to display a first screen; wherein the first screen contains the time to activation; wherein the first auto-activation notice causes the GUI device to display a first screen; and, wherein the first screen is configured to link to a second screen for display on the GUI device; wherein the second screen has the time to activation and a display for receiving a user input to activate the EFMS immediately; wherein the first auto-activation notice causes the GUI device to display a first screen; and, wherein the first screen is configured to link to a second screen for display on the GUI device; wherein the second screen has the time to activation and a display for receiving a user input to deactivate the EFMS; wherein the control system is cloud-based; wherein the control system is at least in part contained in a local controller for the EFMS; having a hydration plan; having a lockout plan; and having two or more of an interlock, a hydration plan, a lockout plan, a low line pressure plan, and an adjacent structure based plan.

In addition there is provided a GUI device for mitigating fire risks, the GUI device serving as a node on an emergency management control network and system, the GUI device having: the GUI device in communication with a control system, wherein the control system is a part of the emergency management control network and system; and, the GUI device configured to receive and display a first auto-activation notice; wherein the auto-activation notice is configured to cause the GUI device to display a first auto-activation field on the GUI device; wherein the first auto-activation filed provides a first notice that an external fire management system is set to automatically activate.

Further, these systems, devices and methods can have one or more of the following features: wherein the first auto-activation field is a window; wherein the first auto-activation field is a popup window; wherein the first auto-activation field is linked to a second auto-activation field; wherein the first auto-activation field is linked to a second auto-activation field, and the first, the second or both auto-activation fields display a time to activation; wherein the first auto-activation field is linked to a second auto-activation field, and the first, the second or both auto-activation fields display a time to activation; wherein the first auto-activation field is linked to a second auto-activation field, and the first, the second or both auto-activation fields display a time to activation, and field for receiving a user input to activate the EFMS immediately; wherein the first auto-activation field is linked to a second auto-activation field, and the first, the second or both auto-activation fields display a time to activation, and a field for receiving a user input to deactivate the EFMS; wherein the first auto-activation field is linked to a second auto-activation field, and the first, the second or both auto-activation fields display a time to activation, a field for receiving a user input to deactivate the EFMS and a field for receiving a user input to activate the EFMS immediately; and wherein the GUI is device is a cell phone; wherein the GUI is device is tablet; wherein the GUI is device is monitor and key pad.

Additionally, there is provided a method of operating an external fire management system (EFMS) located at a structure; wherein the EFMS is in control communication with a control system, the control system configured to receive information, send information, and evaluate information; the method including: the control system receiving an event information; the control system, based at least in part upon the event information: (i) configuring the EFMS for automatic activation at an activation time; and (ii) causing a first notice to be transmitted to a GUI device, wherein the GUI device is located a distance from the structure; the GUI device, upon receipt of the first notice, displaying a first message that the EFMS will be automatically activated; and, automatically activating the EFMS at the activation time, if no user input is provided to the control system.

Further, these systems, devices and methods can have one or more of the following features: wherein the control system determines the activation time based upon the event information; wherein the control system determines the activation time is predetermined; wherein the predetermined time is from about 5 minutes to about 15 minutes; wherein the predetermined time is from about 5 minutes; wherein the predetermined time is from about 10 minutes; wherein the event information has at least two of: a location of a wildfire, a wind speed, hydration levels, and a temperature; wherein the distance is from about 1 mile to about 2,000 miles; wherein the distance is from greater than 0.5 miles; wherein the distance is from greater than 1 mile; wherein the distance is from greater than 5 miles; wherein the distance is from greater than 10 miles; wherein the distance is from greater than 15 miles; wherein upon receipt of the first notice the GUI device provides one or more of a visual, a mechanical or an audible alarm; wherein the mechanical alarm is vibrating; wherein the first notice is linked to a second notice; wherein the first notice is linked to a second notice; and proceeding from the first notice to the second notice; wherein the first, the second or both notices display the time to activation; wherein the first notice is linked to a second notice and the first, the second or both notices display a countdown to the activation time; wherein the first notice is a popup window that is linked to a second notice; and proceeding from the first notice to the second notice; wherein the first, the second or both notices display a countdown to the activation time; wherein the first notice displays a field for receiving a user input; wherein the first notice displays a field for receiving a user input; and inputting into that display a field for receiving an instruction to immediately activate the EFMS; wherein the first notice displays a field for receiving a user input; and inputting into that display an instruction to immediately activate the EFMS, whereby the EMFS is activated; wherein the first notice is linked to a second notice and proceeding from the first notice to the second notice; and the second notice displays a field for receiving a user input to deactivate the EFMS; wherein the first notice is linked to a second notice; wherein the first notice, the second notice or both has a display that shows a countdown to the activation time, a field for receiving a user input to immediately activate the EMFS, and a field to receive a user input to deactivate the EFMS; and wherein upon activation the EFMS operates a hydration plan.

Furthermore, there is provided a system for obtaining, evaluating and displaying in a predictive manner, information and data regarding fire emergencies, and using that information to automatically activate an external fire management system, the system having: a plurality of units configured to provide raw data regarding a fire; wherein each unit has a communication node on a communication network; wherein at least one of the plurality of units is a mobile unit, having a processor and a GUI device; and, wherein at least one of the plurality of units is a fixed unit having a processor and a GUI device; a source of derived data regarding one or more of the fire location, an hydration level of combustible materials, a weather condition, a fire movement, a path of a fire, a traffic condition, available water, water usage, a power grid, and electrical usage; wherein the source of derived data has a communication node on the communication network; a processor having a communication node on the communication network, thereby placing the processor in communication with the source of derived data and at least one of the plurality of units; the processor capable of performing a first predictive computation to determine a change of state event from the raw data and the derived data; whereby the processor determines predictive information having a probability for the change of state event, and wherein the processer communicates the predictive information to the network, for display by one or more of the units; and wherein the system is configured to automatically activate the EFMS, and send an automatic activation notice to an external GUI device, wherein upon receipt of the notice, the GUI device displays the time to automatic activation, and one or more of an input command to activate the system and deactivate the system In addition there is provided a system for obtaining, evaluating and displaying information and data regarding wildfires, EFMSs and mobile units, and using that information to automatically activate an external fire management system, the system having: a plurality of mobile units configured to receive and transmit information, data or both regarding a wildfire, an EFMS or both, and over a network; wherein the units comprise a node on the network; wherein the units comprise a means to determine the location of the unit;

Further, these systems, devices and methods can have one or more of the following features: wherein the unit having a processor, a memory device and a GUI device; wherein the information or data has one or more of a location of a fire, a location of smoke, a location of embers, a direction of movement of a fire, and an evacuation route; a plurality of fixed units configured to receive and transmit information and data over the network; wherein each unit has a node on the network; wherein each units having a processor and a memory device; and, wherein each unit is a component of an EFMS; wherein at least one of the mobile units is in control communication with at least one of the fixed units; and wherein the system is configured to send an automatic activation notice to an external GUI device, and automatically activate the EFMS if the GUI does not send a deactivation instruction.

Moreover, there is provided these system, devices and methods having one or more of the following features: wherein the control system is configured to receive an instruction from an emergency management system to activate the lockout plan; wherein the control system is configured to receive an instruction from a user to deactivate the lockout plan; wherein the first event has one or more of: an activation of a first interior sprinkler system at the first structure; an activation of a second interior sprinkler system at a second structure, wherein the second structure is adjacent the first structure; and, an activation of a second EFMS at the second structure, wherein the second structure is adjacent the first structure; wherein the first event has one or more of: an activation of a first interior sprinkler system of the first structure; an activation of a second interior sprinkler system at a second structure; and, an activation of a second EFMS at the second structure; wherein the first event has one or more of a detection of a line pressure at or below a low line pressure limit in a water line feeding the first structure; and, a detection of the line pressure in a water line feeding a second structure; wherein the low line pressure limit is a pressure that is required for the operation of first responder firefighting equipment; wherein the first event has a balancing of factors; and the control system is configured to balance the factors; wherein the factors comprise at least two of a location of a wildfire, a wind speed, a hydration levels, a location of smoke, a location of embers, a direction of movement of a wildfire, and a temperature; wherein the factors comprise the status of a plurality of EFMSs in a predetermined area; wherein the status has a locked out status, an activated status, and a standby status; wherein the area has at least a one mile radius from the first structure; wherein the factors comprise at least three of a location of a wildfire, a wind speed, a hydration levels, a location of smoke, a location of embers, a direction of movement of a wildfire, a temperature, and the status of a second EFMS; and wherein the control system is configured to lift the lockout of the EFMS upon the occurrence of a second event.

Still further, there is provided a system for mitigating fire risks, the system having: a plurality of external fire management systems (EFMSs) each of the EFMS associated with a structure; and, a control system having a lockout plan; wherein the lockout plan is configured to lockout one or more of the plurality of EFMSs from activating upon the occurrence of one or more events.

Furthermore, there is provided these system, devices and methods having one or more of the following features: wherein the control system is configured to receive an instruction from an emergency management system to activate the lockout plan; wherein the control system is configured to receive an instruction from an emergency management system to activate the lockout plan for all of the EFMS in a predetermined area; wherein the event has one or more of: an activation of a first interior sprinkler system at the first structure; an activation of a second interior sprinkler system at a second structure, wherein the second structure is adjacent the first structure; and, an activation of a second EFMS at the second structure, wherein the second structure is adjacent the first structure; wherein the event has one or more of: an activation of a first interior sprinkler system of the first structure; an activation of a second interior sprinkler system at a second structure; and, an activation of a second EFMS at the second structure; wherein the event has one or more of a detection of a line pressure at or below a low line pressure limit in a water line feeding the first structure; and, a detection of the line pressure in a water line feeding a second structure; wherein the low line pressure limit is a pressure that is required for the operation of first responder firefighting equipment; wherein the first event has a balancing of factors; and the control system is configured to balance the factors; wherein the factors comprise at least two of a location of a wildfire, a wind speed, a hydration levels, a location of smoke, a location of embers, a direction of movement of a wildfire, and a temperature; wherein the factors comprise the status of a plurality of EFMSs in a predetermined area; wherein the status has a locked out status, an activated status, and a standby status; wherein the area has at least a one mile radius from the first structure; wherein the factors comprise at least three of a location of a wildfire, a wind speed, a hydration levels, a location of smoke, a location of embers, a direction of movement of a wildfire, a temperature, and the status of a second EFMS; and wherein the control system is configured to lift the lockout of the EFMS upon the occurrence of a second event.

Additionally, there is provided a system for mitigating fire risks, the system having: a plurality of external fire management systems (EFMSs) each of which is associated with a structure; and each of which has a local controller; a control system having a lockout plan; the control system in control communication with the local controllers; wherein the lockout plan is configured to provide a lockout instruction to the local controls; whereby upon receipt of the lockout instruction the local control will lockout the EFMS and thereby prevent the activation of the EFMS; and, wherein the local controllers are configured such that the lockout will remain in place until the local controller receives an instruction lifting the lockout.

Further, there is provided these system, devices and methods having one or more of the following features: wherein the control system is configured to provide the instruction lifting the lockout upon a second event; wherein the system is configured whereby the second event is an instruction from the user; wherein the control system is configured to provide the lockout instruction based upon a balancing of factors; wherein the factors comprise one or more of: an activation of one or more interior sprinkler systems; and an activation of one or more EFMSs; wherein the factors has one or more of a detection of a line pressure at or below a low line pressure limit in a water line; wherein the low line pressure limit is a pressure that is required for the operation of first responder firefighting equipment; wherein the factors comprise at least two of a location of a wildfire, a wind speed, a hydration levels, a location of smoke, a location of embers, a direction of movement of a wildfire, and a temperature; wherein the factors comprise the status of a plurality of EFMSs in a predetermined area; wherein the status has a locked out status, an activated status, and a standby status; wherein the area has at least a one mile radius from the first structure; wherein the factors comprise at least three of a location of a wildfire, a wind speed, a hydration levels, a location of smoke, a location of embers, a direction of movement of a wildfire, a temperature, and the status of the status of the plurality of EFMSs, wherein the factors are located in or based upon a predetermined area; wherein the area is at least one square mile; wherein the area is at least two square miles.

In addition, there is provided a method of locking out an external fire management system (EFMS), the method including: a control system receiving an event information; and, the control system, based at least in part upon the event information, locking out the EFMS, and thereby preventing the EFMS from activating, a condition.

Still further, there is provided these system, devices and methods having one or more of the following features: wherein the event information has an instruction from an emergency management system; wherein the event has one or more of: an activation of an interior sprinkler system; an activation of a first EFMS; and activation of a second EFMS; wherein the event has one or more of a detection of a line pressure at or below a low line pressure limit in a water line feeding a first structure; and, a detection of the line pressure in a water line feeding a second structure; wherein the low line pressure limit is a pressure that is required for the operation of first responder firefighting equipment; wherein the first event is determined by the control system balancing a plurality of factors; wherein the factors comprise at least two of a location of a wildfire, a wind speed, a hydration levels, a location of smoke, a location of embers, a direction of movement of a wildfire, and a temperature; wherein the factors comprise the status of a plurality of EFMSs in a predetermined area; wherein the status has a locked out status, an activated status, and a standby status; wherein the area is at least one square mile; wherein the factors comprise at least three of a location of a wildfire, a wind speed, a hydration levels, a location of smoke, a location of embers, a direction of movement of a wildfire, a temperature, and the status of a second EFMS.

Moreover, there is provided a method of operating an external fire management system (EFMS), the method including: a control system receiving a first event information; the control system, based at least in part upon the first event information, locking out the EFMS, and thereby preventing the EFMS from activating; the control system receiving a second event information; and the control system, based at least in part upon the second event information, lifting a lockout of the EFMS; and thereby permitting the EFMS to activate.

In addition, there is provided a method of installing a control system to protect a structure from a wildfire, the method including: identifying a structure having an irrigation system associated with an area adjacent to the structure; installing a local controller and a means for connecting the irrigation system to a control system; wherein the local controller is configured to operate the means for connecting; and, connecting the local controller to a control system; wherein the control system has an operation control command plan for performing an operation plan having one or more of an interlock, a lockout plan, a low line pressure plan, and an adjacent structure based plan.

Moreover, there is provided these system, devices and methods having one or more of the following features: wherein the local control is configured to operate a foam system, and wherein the foam system is integrated into the irrigation system.

Still further, there is provided an external fire management system (EFMS), the EFMS in control communication with a control system, the control system having: an operation control command plan for performing an operation plan; wherein the operation control command plan for perform an operation plan, has at least two of: an auto-activation notice with default activation plan; a lockout plan, a hydration plan; and an interlock plan.

Moreover, there is provided these system, devices and methods having one or more of the following features: having at least three of an auto-activation notice with default activation plan; a lockout plan, a hydration plan; and an interlock plan; having an auto-activation notice with default activation plan; a lockout plan, a hydration plan; and an interlock plan.

In addition, there is provided a method of installing a control system to protect a structure from a wildfire, the method including: identifying a structure having an irrigation system associated with an area adjacent to the structure; the irrigation system having a local controller; connecting a control system to the local controller via a communication means; and, wherein the control system has an operation control command plan for performing an operation plan having one or more of an interlock, a lockout plan, a low line pressure plan, and an adjacent structure based plan.

Yet further, there is provided these systems, methods and devices, having one or more of the following features: wherein the control system is cloud-based; wherein the control system is at least in part contained in a local controller for the EFMS; having a hydration plan; having two or more of a hydration plan, a lockout plan, a low line pressure plan, and an adjacent structure based plan; wherein the operation control command plan has a lockout; wherein the lockout has a software component; wherein the interlock is configured to automatically perform the operation on the peripheral system upon activation of the EFMS; wherein the control system is configured to determine a time period in which the interlock will automatically perform the operation on the prereferral system, wherein the time period is based upon an event; wherein the even is based upon one or more of a location of a wildfire, a wind speed, a hydration levels, a location of smoke, a location of embers, a direction of movement of a wildfire, and a temperature; wherein peripheral system is a heating ventilation air-conditioning system (HVAC); wherein peripheral system is a natural gas system; wherein peripheral system is an electric power system; wherein peripheral system is a lighting system; wherein peripheral system is a password requirement for a communication network; wherein peripheral system is a fire blanket system; wherein peripheral system is a fire shudder system; wherein peripheral system is an interior sprinkler system; wherein peripheral system is a security alarm system; wherein peripheral system is a heating ventilation air-conditioning system (HVAC) and the operation is activating the HVAC to vent the building.

Still further there is provided these systems, methods and devices having one or more of the following features: wherein peripheral system is natural gas and the operation is turning off the natural gas to the structure; wherein peripheral system is electric power and the operation is turning off the electrical power to the structure; wherein peripheral system is lighting and the operation is turning on lighting at the structure; wherein peripheral system is a password requirement for a communication network and the operation is turning off the password requirement; wherein peripheral system is a fire blanket system and the operation is deploying the fire blanket system; wherein peripheral system is a fire shudder system and the operation is closing the fire shudder system; wherein peripheral system is an interior sprinkler system and the operation is activating the interior sprinkler system; wherein peripheral system is an interior sprinkler system and the operation is locking out the interior sprinkler system; wherein peripheral system is a security alarm system and the operation having arming the security alarm system; wherein peripheral system is a garage door and the operation having closing the garage door; and, wherein the operation control command plan for performing an operation plan is an auto-activation notice with default activation plan.

Still further there is provided these systems, methods and devices having one or more of the following features: wherein the auto-activation notice with default activation plan is configured to upon a predetermined event: start a time to activation countdown; send an automatic activation notice to the GUI device; activate the EFMS upon an end of the countdown, unless the control system receives a deactivation instruction.

In addition, there is provided an external fire management system (EFMS) for mitigating a fire risk for a structure associated with the EFMS, the EFMS having: a local controller; the local controller configured for control communications with an emergency management control network and system; the local controller configured for control communications with a control system; the control system having an operation control command plan for performing an operation plan; and, an interlock, wherein the interlock is configured to perform an operation on one or more peripheral system associated with a structure protected by the EMFS.

Moreover, there is provided these systems, devices and methods having one or more of the following features: wherein the control system is cloud-based; wherein the control system is at least in part contained in the local controller; having a hydration plan; having two or more of a hydration plan, a lockout plan, a low line pressure plan, and an adjacent structure based plan; wherein the operation control command plan has a lockout; wherein the lockout has a software component; wherein the interlock is configured to automatically perform the operation on the peripheral system upon activation of the EFMS; wherein the control system is configured to determine a time period in which the interlock will automatically perform the operation on the prereferral system, wherein the determination is based upon an event; and wherein the even is based upon one or more of a location of a wildfire, a wind speed, a hydration levels, a location of smoke, a location of embers, a direction of movement of a wildfire, and a temperature.

Further, there is provided these systems, methods and devices: wherein the auto-activation notice with default activation plan is configured to: upon a predetermined event: start a time to activation countdown; send an automatic activation notice to the GUI device; activate the EFMS upon an end of the countdown, unless the control system receives a deactivation instruction.

In addition, there is provided a system for mitigating fire risks, the system having: an external fire management system (EFMS); a control system in control communication with the EFMS and configured for control communication with a GUI device; the control system having a control command plan for performing an operation plan; the control command plan for performing an operation plan having an interlock plan; and, wherein the interlock plan is configured to automatically perform an operation on a peripheral system associated with a structure protected by the EFMS; wherein the automatic performance of the operation is at a determined time, based upon an event.

Still further, there is provided these systems, methods and devices having one or more of the following features: wherein the determined time is a predetermined time period; wherein the predetermined time period is 5 minutes; wherein the predetermined time period is 10 minutes; wherein the predetermined time period is less than 15 minutes; wherein the event is the activation of the EFMS; and wherein the determined time is calculated by the control system.

Additionally, there is provided a method of operating an external fire management system (EFMS) located at a structure; wherein the EFMS is in control communication with a control system, the control system configured to receive information, send information, and evaluate information; the method having: as step a) the control system receiving an event information; as step b) the control system activating an interlock; as step c) wherein the interlock performs an operation on a peripheral system associated with a structure protected by the EMFS; and, as step d) activating the EFMS.

Moreover, there is provided these systems, devices and methods having one or more of the following features, wherein steps a) and c) occur simultaneously wherein step a) occurs before step and c); wherein step a) occurs after step c); further having determining a time period between steps a) and step c) and performing steps a) and c) based upon that time period; wherein the time period is determined based upon one or more of a location of a wildfire, a wind speed, a hydration levels, a location of smoke, a location of embers, a direction of movement of a wildfire, and a temperature; wherein peripheral system has a heating ventilation air-conditioning system (HVAC); wherein peripheral system has natural gas; wherein peripheral system has electric power; wherein peripheral system has lighting; wherein peripheral system has a password requirement for a communication network; wherein peripheral system has a fire blanket system; wherein peripheral system has a fire shudder system; wherein peripheral system has an interior sprinkler system; wherein peripheral system has a security alarm system; wherein peripheral system has a heating ventilation air-conditioning system (HVAC) and the operation includes activating the HVAC to vent the building; wherein peripheral system has natural gas and the operation includes turning off the natural gas to the structure; wherein peripheral system has electric power and the operation includes turning off the electrical power to the structure; wherein peripheral system has lighting and the operation includes turning on lighting at the structure; wherein peripheral system has a password requirement for a communication network and the operation includes turning off the password requirement; wherein peripheral system has a fire blanket system and the operation includes deploying the fire blanket system; wherein peripheral system has a fire shudder system and the operation includes closing the fire shudder system; wherein peripheral system has an interior sprinkler system and the operation includes activating the interior sprinkler system; wherein peripheral system has an interior sprinkler system and the operation includes locking out the interior sprinkler system; wherein peripheral system has a security alarm system and the operation includes arming the security alarm system; wherein peripheral system has a garage door and the operation includes closing the garage door; and further including sending an auto-activation notice with default activation to a GUI, and wherein step d) occurs if no user input is received by the control system.

Yet further, there is provided a system for obtaining, evaluating and displaying in a predictive manner, information and data regarding fire emergencies, and using that information to automatically activate an external fire management system, the system having: a plurality of units configured to provide raw data regarding a fire; wherein each unit has a communication node on a communication network; wherein at least one of the plurality of units is a mobile unit, having a processor and a GUI device; and, wherein at least one of the plurality of units is a fixed unit having a processor and a GUI device; a source of derived data regarding one or more of the fire location, an hydration level of combustible materials, a weather condition, a fire movement, a path of a fire, a traffic condition, available water, water usage, a power grid, and electrical usage; wherein the source of derived data has a communication node on the communication network; a processor having a communication node on the communication network, thereby placing the processor in communication with the source of derived data and at least one of the plurality of units; the processor capable of performing a first predictive computation to determine a change of state event from the raw data and the derived data; whereby the processor determines predictive information having a probability for the change of state event, and wherein the processer communicates the predictive information to the network, for display by one or more of the units; and the system having an interlock, wherein the interlock is configured to perform an operation on one or more peripheral system associated with a structure protected by an external fire management system.

Still further, there is provided these systems, methods and devices, wherein the EFMS at a structure has, components of an existing irrigation system located at the structure.

Moreover, there is provided these system, methods and device wherein the EFMS is associate with a public utility structure and configured to protect the public utility structure from a wild fire risk.

Additionally, there is provided these system, methods and device wherein the EFMS is associate with a communications tower and configured to protect the communications tower from a wild fire risk.

Further, there is provided these system, methods and device wherein the the EFMS is associate with a transform, an electrical sub-station or both, and configured to protect the transform, the electrical sub-station or both from a wild fire risk.

Moreover, there is provided these systems, devices and methods wherein the operation control command plan for performing an operation plan optimizes the operation of the EFMS in a predetermined area, on a parcel-by-parcel basis.

Moreover, there is provided these systems, devices and methods wherein where the operation control command plan for performing an operation plan contains PIN information for the parcels having an EFMS.

DESCRIPTION OF THE PREFERRED EMBODIMENTS

Figure 1A:
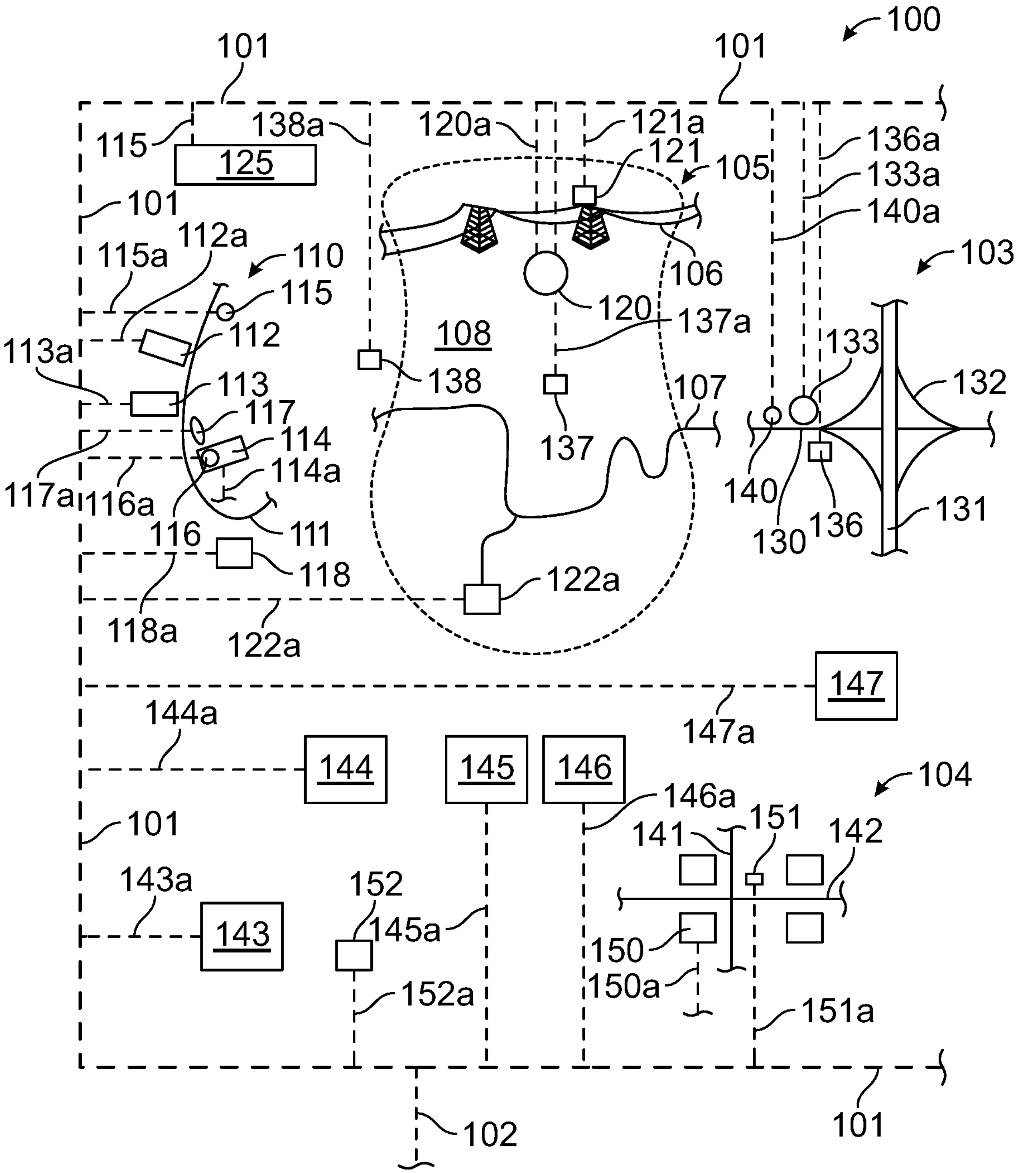
FIG. 1A is a schematic of an embodiment of an emergency communications system in accordance with the present inventions.

The present inventions, in general, relate to networks, systems and methods for mitigating, managing and address wildfires and risks of wildfire. In general, in embodiments of the present invention there is provided emergency management control network and system, having a control system, that is in control communication with one or more local controllers. In these embodiments, the control system, the local controller and both, have one or more operation control command plan for performing an operation plan. In embodiments, these operation plans can be, one or more of, a hydration plan, a lockout plan, a low line pressure plan, an adjacent structure based plan, and an auto-activation notice with default activation plan.

Embodiments of the present inventions relate to relate to networks, systems and methods for mitigating, managing and address wildfires and risks of wildfire that utilize and interface with components, including software, of irrigation system (e.g., agriculture watering system, lawn sprinklers, etc.) that are typically used for providing water to the land surrounding the structure as a part of the emergency management control network and system. Thus, in these embodiments the irrigation system components become a part of, or are used and controlled by, the external fire management system (EFMS), such as being controlled by the control system for the EFMS, the local controller for the EFMS, or both.

More particularly, in embodiments, the present inventions relate to emergency management control network and systems, having a control system, that is in control communication with one or more local controllers associated with an EFMS. The control system has one or more operation control command plan for performing an operation plan. In embodiments, these operation plans can be, one or more of, a hydration plan, a lockout plan, a low line pressure plan, an adjacent structure based plan, and an auto-activation notice with default activation plan. In embodiments the control system executes, or carries out these various plans based upon raw data, derived data, predictive data, adaptive strategies, virtual data, and combinations and variations of this data.

Embodiments of the present inventions relate to systems, equipment and methods for the monitoring, control and management of hydration levels in the area surrounding a structure for the prevention, mitigation and management of wildfires. In preferred embodiments, the hydration levels are determined, established or maintained for predetermined areas surrounding a structure. Further, embodiments of the present inventions include predetermined hydration plans, including, plans based upon raw data, derived data, predictive data, adaptive strategies, virtual data, and combinations and variations of this data.

Embodiments of the present inventions relate to systems, equipment and methods for the monitoring, control and management of nearby EFMSs and internal fire management systems, in larger areas and smaller areas, including down to adjacent parcels, based upon raw data, derived data, predictive data, adaptive strategies, virtual data, and combinations and variations of this data. surrounding a structure for the prevention, mitigation and management of wildfires.

Embodiments of the present inventions relate to systems, equipment and methods for the monitoring, control and management of peripheral systems to EFMS and an internal fire management system, based upon raw data, derived data, predictive data, adaptive strategies, virtual data, and combinations and variations of this data.

In general, in embodiments of the present invention, the EFMS is part of, or on a network, and receive information, e.g., data, about conditions around and near the structure that EFMS is associated with and protects. This information could come from any number of sources, for example, external moisture or hydration sensors, optical sensors and devices, other EMFSs, emergency networks, user input, first responder input, and water pressure sensors. This information can be provided to the control system, and based upon the algorithms and programing of the control system the control system can shut down a particular EFMS. This embodiment would be a local controller having a lockout program for its specific EFMS.

In general, embodiments of the present systems and methods inventions relate to EFMS and networks having interlocking control systems and methods that control the operation of individual EFMS based upon events and conditions of an entire area or zone of a plurality of EFMSs.

Figure 1B:
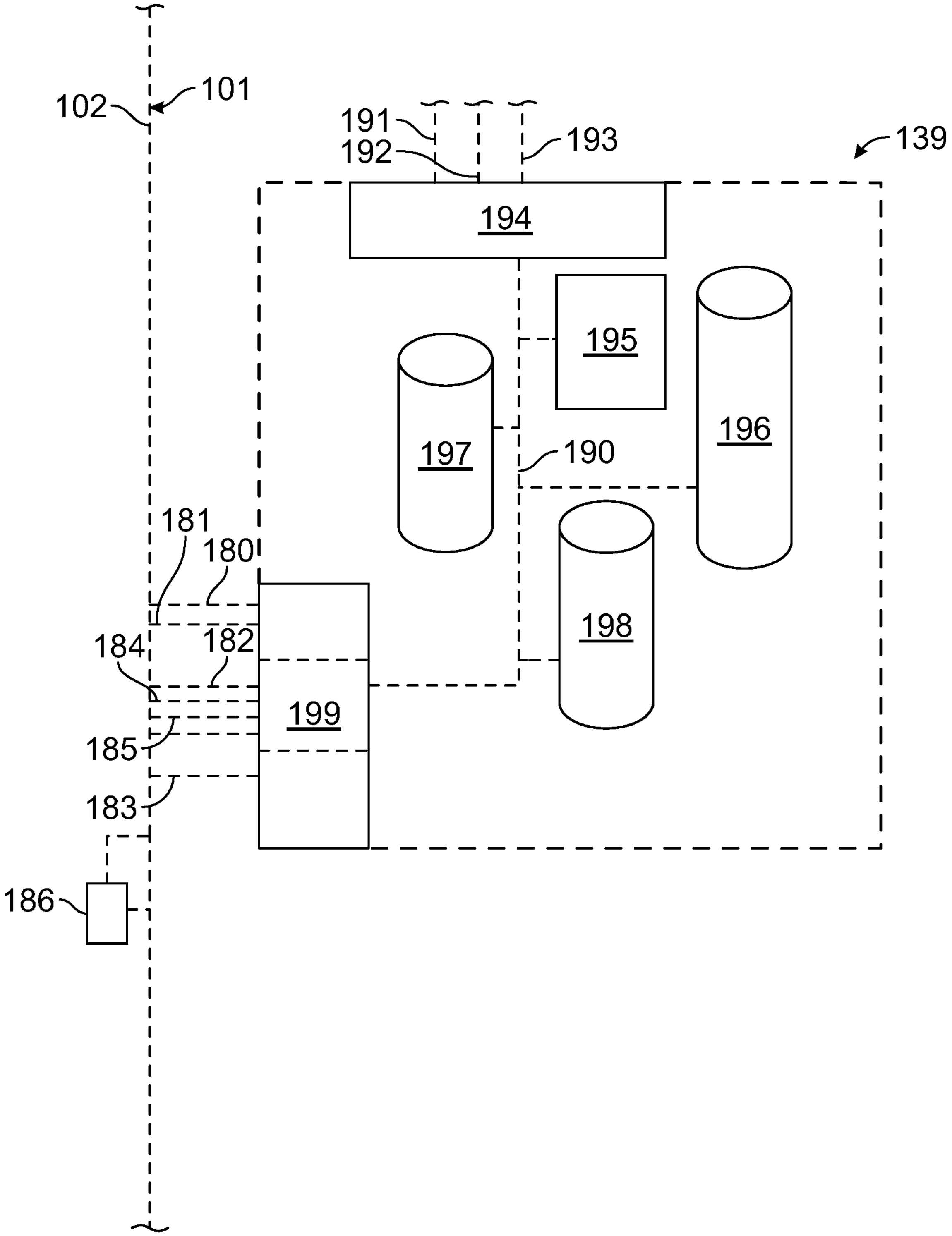
FIG. 1B is a detailed schematic of an embodiment of a data processing assembly of the system of FIG. 1A, in accordance with the present inventions.

Turning to FIGS. 1A and 1B, there is provided a general example of an embodiment of an emergency communication systems, which is an emergency management control network and system for a geographic area or location, such as a community. The communication system 100, has a network 101. The network 101 may be any type or combination of types of communication and data networks. Thus, for example, the network 101 can be a distributed network, a direct communication network, a control network, the internet, the world wide web, a wireless network, a cellular network, a Wi-Fi network, a hard-wired network, an Ethernet network, a satellite network and combinations and variations of these, and other data and information communicate equipment and process that are presently known and may become known in the future.

The fire emergency communication system 100 has several nodes or communication points, each node or communication point having one or more receiving device, monitoring device, transmitting device and combinations and variations of these. There is a node 110 that is associated with a residential area, e.g., a nodal area. There is a node 105 that is associated with a rural area, e.g., a nodal area. There is a node 103 that is associated with an area having access to a limited access highway, e.g., an intersection nodal area. There is a node 104 that is associated with an urban area, e.g., an urban nodal area. Each of these nodes, also has a number of individual nodes within, or associated with them.

The individual nodes within a node, form a nodal area, nodes that are mobile can move from one nodal area to another nodal area.

It is understood, that one, tens, and hundreds of nodal areas, each having one, tens and hundreds of nodes, can be associated with the communication system 100, and network 101. Moreover, multiple networks, such as network 101, can be associated with, or a part of, the communication system 100.

The number and types of nodal areas may vary, from situation to situation, community to community, from public services team/organization to public services team/organization and may vary before, during and after a wildfire.

The number and types of individual nodes, in any given nodal area, may vary, from situation to situation, community to community, from public services team/organization to public services team/organization and may vary before, during and after a wildfire.

In the embodiment of FIG. 1A, the network 101 of fire emergency communication system 100 has as individual nodes: dwelling (house, apartment building, condo building, hotel) 112, dwelling (house, apartment building, condo building, hotel) 114, mobile device (cell phone, On-star, apple watch, etc.) 115, mobile device (cell phone, On-star, apple watch, etc.) 116, First Responder (police, Ambulance, EMS (emergency medical services), Red Cross, National Guard, etc.) 117, school 118, first responder unit 120, fixed location monitoring station, data collection and transmission device (positioned on, e.g., cell town, power line pole, etc.) 121, dwelling (e.g., ranch, etc.) 122, airport 125, first responder 133, fixed location monitoring station, data collection and transmission device (positioned, e.g., on a traffic light, associated with a traffic camera, etc.) 136, cell tower (fixed data collection and transmission device) 137, monitoring station, fixed data collection and transmission device 138, mobile device (cell phone, On-star, apple watch, etc.) 140, Emergency Management (head quarter, command center, etc.) 143, police department 144, fire department 145, Ambulance 146, Hospital 147, business (office, retail shop, restaurant, manufacturing, etc.) 150, traffic camera/red light camera (fixed data collection and transmission device) 151, and fixed data collection and transmission device (e.g., positioned on or with a cell tower 152).

Further these nodes may be viewed as sub-nodes of a larger node. For example, fire emergency communication system 101 could be included as a sub-node in a larger communication network, having one, tens, hundreds of similar fire emergency communications systems.

The individual nodes typically and preferably have GUI. They may have associated keyboards, key pads, touch screens, voice control, etc., and combinations and variations of these. The GUI have displays that among other things have graphics for providing information about traffic, fire location, evacuation, evacuation routes, location of gas stations, location of first responders, as well as, the ability to have user input of real time data, e.g., user location, presence of ambers, visibility, proximity to fire, traffic conditions. Preferably, icons, windows or screens are provided on the GUI by an application (app) that is loaded onto a mobile device, such as a smart phone, tablet or vehicle GPS/navigation system. The GUI may also be configured to provide real time, historic, derived, predictive, and virtual data. The GUI may be configured to have private access on the then network to another node on the network. For example, mobile device 140 may have a private communications path with dwelling 112, enabling mobile device to display real time raw data (e.g., images, temperature) of the conditions around dwelling 112 and send instruction to dwelling 112. For example, to activate a fire suppression system for dwelling 112. The monitoring unit of dwelling 112 may also have a processor, or be in communication (control communication) with the processing system to automatically activate the fire suppression system for dwelling 112, sent notifications to mobile device 140 recommending activation of the fire suppression system for dwelling 112, as well as, sending notice that the fire suppression system has been activated. The notices may also be broadcast over the entire network, only to the area where the node or dwelling is located, only to first responders (e.g., emergency services, fire, police, ambulance etc.) and combinations and variations of these.

The network 101, has several communication pathways. These pathways may be over the same routes, or portions of the network 101, they may share some but not all routes, they may be totally separate, and combinations and variations of these. Each route or pathway may have its own proprietary communication protocol, it may use a publicly available protocol. The protocols may include, but are not limited to CoAP, MQTT, AMQP, WAMP, LORAWAN, LoRa, IPv4, or IPv6. The communication, e.g., the data and information set over the pathway may be encrypted, protected, or otherwise encoded, such that only an intended recipient can receive it, for example a predetermined recipient, e.g., an individual who has taken the necessary steps to rightfully receive information and data from the data processing assembly 139.

Each individual node preferably has the ability to receive and transmit data and information. However, a node only needs the ability to receive or transmit data or information. For example, in some embodiments of monitoring stations they may only transmit data and information.

Turning to the residential area 110, there is shown a schematic representation of an example of a residential area. (The residential area may be a part of, adjacent or far removed from the other areas in the system.) The residential area 110 has street 111. The various node in this area each have communication pathways: dwelling 112 has communication pathway 112*a*, mobile device 115 has communication pathway 115*a*, mobile device 116 (which is in dwelling 114) has communication pathway 116*a*, first responder 117 has communication pathway 117*a*, school 118 has communication pathway 118*a*. In addition, dwelling 114 has a private security system that has a communication pathway 114*a* to a private security provider. As discussed below, such nodes, e.g., 114, can be brought into the system 100, by the private security provider feeding, i.e., providing or transmitting, data and information from its network or customers to the processing system 139.

Turning to the rural area 105, there is shown a schematic representation of an example of a rural area. (The rural area may be a part of, adjacent or far removed from the other areas in the system.) The rural area 110 has winding, narrow country road 107, a large area 108 (shown by dotted line) that contains significant fuel sources for a wildfire, and power lines 106. The various nodes in this area each have communication pathways: first responder unit 120 has communication pathway 120*a*, monitoring station 121 has communication pathway 121*a*, dwelling 122 has communication pathway 122*a*, cell tower fixed data collection and transmission device 137 has communication pathway 137*a*, and monitoring station 138 has communication pathway 138*a*. And, airport 125, which is adjacent to residential area 110 and rural area 105 has communication pathway 125*a*, Turning to the limited access highway area 103, there is shown a schematic representation of an example of a limited access highway and its surroundings. (The limited access highway area may be a part of, adjacent or far removed from the other areas in the system.) The limited access highway area 103 has a multilane limited access highway 131 having multiple on and off ramps, e.g., 132, and a street 130. The various nodes in this area each have communication pathways: monitoring station 136 has communication pathway 136*a*, mobile device 140 has communication pathway 140*a*, and first responder 133 has communication pathway 133*a*.

Turning to the urban area 104, there is shown a schematic representation of an example of an urban area. (The urban area may be a part of, adjacent or far removed from the other areas in the system.) The urban area 104 has a street 141 that intersects street 142. The various nodes in this area each have communication pathways: traffic camera/red light camera 151 has communication pathway 151*a*. And a fixed data collection and transmission device (e.g., positioned on or with a cell tower 152) adjacent to the urban area 104, has communication pathway 152*a*. In addition, business 150 has a private security system that has a communication pathway 150*a* to a private security provider. As discussed below, such nodes, e.g., 150, can be brought into the system 100, by the private security provider feeding, i.e., providing or transmitting, data and information from its network or customers to the processing system 139.

Emergency Management (head quarter, command center, etc.) 143, has communication pathway 143*a*, police department 144 has communication pathway 144*a*, fire department 145 has communication pathway 145*a*, ambulance service 146 has communication pathway 146*a*, and hospital 147 has communication pathway 147*a*.

The network 101 has pathway 102 that connects the network to processing system 139 (as shown in greater detail in FIG. 1B). Here one path way is shown, it being understood that multiple pathways to the processing system 139, multiple processing systems and combinations and variations of these can be used.

The network 100 can have multiple private pathways. For example, a dwelling can have an external fire protection system that has a control system, sensors, actuators and communication pathway. This external fire protection system has a private communication pathway with processing system 139, as well as, with one or more mobile devices that also connect to processing system 139 and directly or through the processing system to the control system of the dwelling's fire protection system. There may be tens, hundreds or more of these private pathways. As the processing system 139 receives more data and information it can determine if recommendations to start a particular dwelling's fire protection system should be sent, or if the command to start the system should be sent. This can also be done on an area by area basis.

Thus, for example, the processing system 139 is receiving real time raw data from multiple nodes in the network that provide real time information about, for example traffic patterns, location of fire, speed of fire, direction of movement of the fire, wind speed and direction, humidity, number and location of persons, location of first responders. The processing system 139 also has access to historic data, such as prior weather, prior fire patterns, prior traffic patterns, surveys of fuel sources for the fire, and geographic terrain. The processing system using the real time raw data, and preferably, but not necessarily, the historic data can provide derived data about fire movement, traffic patterns, resource allocation, preferably this derived data can be predictive data. Different forms, and types of this derived data and predictive data can then be transmitted out onto the network to different nodes. For example, the information a mobile device may receive could be limited to the status of a fire suppressions system linked to that device, the proximity of the fire, the predicted path of the fire, traffic and suggested evacuation routes. The information provided to first responders and emergency management HQ could be far more extensive. For example, historic data about the number of dwellings having external fire suppression systems in a particular area, the fuel sources in that area, coupled with real time raw data about the number of people in that area, could be used to determine the placement of first responders, and the need for evacuations.

Nodes, nodal areas, individual nodes may be organized and configured into various sub-nodes. These sub-nodes can be private or semi-private or public. For example, a company could have a private sub-node for its employees, and within that a sub-node for its fleet of vehicles. Similarly, a school could have a sub-node for its children and parents. A sub-node could include all of the nodes that are external fire management systems, and then have sub-nodes for particular types of system, e.g., by provider, level of services, etc.

Turning to FIG. 1B, there is shown a schematic of an embodiment of a data processing system or assembly 139. The data processing system 139 has a network 190 that provides communication pathways to the components of the data processing system 139. The data processing system has a network 190 for transferring information and data between the various components. Incoming information, from pathways 191, 192, 193, is received by unit 194. Pathways 191, 192 and 193 are other sources of raw data, historic data and even predictive and derived data. Processor 195, which may be a computer, has the algorithms and programs to provide the derived data and predictive information, as well as, provide adaptive responsive strategies. Processor 195 also preferably controls the network traffic with and between storage devices 196, 197, 198 and unit 199. Unit 199 is for sending and receiving information to and from the network 101. It should be understood that system 139 may itself be distributed over a network, or reside on the cloud. Unit 194 and 199 may be the same unit, or they may be multiple separate or distributed units, and combinations and variations of these.

Unit 199 receives and provides information, data and control communication to and from the data processing system 190 to the network 101. Data to individuals is sent along pathways 180 for standard data and content, and along path 181 for premium data and content. For example, standard data may show only public service announcements and other official information from the authorities. Premium data, can show predicted fire movement, number and location of external fire management systems (and their status over time).

Both of these individual data streams, sets or packets, e.g., data for individuals, travels along pathway 102 of network 101. This data for individuals travels along pathway 102 to a smart phone, tablet, such as an iPad®, a GUI in an automobile (dash display), or other GUI, where one or more of raw data, derived data, adaptive strategy information and predictive data are presented on the display. Thus, for example, data may travel along pathway 181 to pathway 102 to one or more individual pathways (e.g., 113*a*) or to a nodal area, e.g., 110, or the entire network. The data is then displayed on the GUI associated with the node (e.g., 113)

and information may be input into the GUI and then transmitted along the individual pathway to the network pathway 102, to a pathway, e.g., 181.

The other pathways from unit 199, e.g., pathway 182, 184, 186, etc., are for other custom or special communication or sub-networks. Thus, by way of example, pathway 182 can be for controlled communication for external fire management systems. Realtime raw data, derived data, adaptive strategy information and predictive data may be sent to a user's mobile node, a fixed node on the external fire management system and both. The user can then monitor the information and elect to send a command to the external fire management system to, for example, become read, to operate, or to operate upon a certain set of conditions. The system 139 can send predictive data, e.g., recommending that the external fire management system is activated. The system 139 can also send information, data, or a command to one or more external fire management systems that cause the system(s) to operate.

In this manner the system 139 can provide derived data and adaptive strategies, to individuals and entire areas, in a direct response to changing fire conditions. This provides the ability to save fire suppression resources (i.e., water, foam) until they are absolutely needed, to use them in the most efficient manner, both on a micro level (each individual system, or structure) and on a macho level, (most efficient use of systems, and activation/operation strategy to protect an area).

By way of example, pathway 184 can be non-public and exclusive to fire response teams. Pathway 185 can be non-pubic and exclusive to all first responders. Pathway 183 is for communication with network television and social media. This pathway allows specified data and information from the system 139 to be broadcast to a GUI 186, e.g., a TV or computer monitor, on public networks and social medial.

Generally, the sources for incoming raw data for use in, or to form a basis for, the algorithms and mathematical computations that a processor performs to provide derived data and predictive information and adaptive strategies, can come from various sources, including for example: individual mobile devices (e.g., input from persons, first responders, emergency services, satellites), fixed monitoring devices (e.g., cell tower mounted devices, external fire suppression system, fire services, weather services, traffic monitors, first responders, emergency services, etc.).

Because of the complexity and unpredictability of wild fires, fire emergency and the reactions of persons, although a single approach may be used, in an embodiment a multi-approach system approach is used, the multi-approach having two, three, four or more approaches performed at the same time to determine a set of approach values for a given event at a given point in the fire emergency. These approach values, e.g., probability of event occurring, are then given weightings based upon their individual accuracy for a particular point in the fire emergency, e.g., rural fire, fire size, population levels, population density in relation to ingress and egress routes, start (activation) of an external fire management system, number of EFMSs in a location, etc. The weighted approach values are then combined to provide a predicted value, i.e, derived data of a predictive nature, such as for example an adaptive strategy, a recommendation to activate a particular EFMS, a warning to evacuate, etc.

Figure 2:
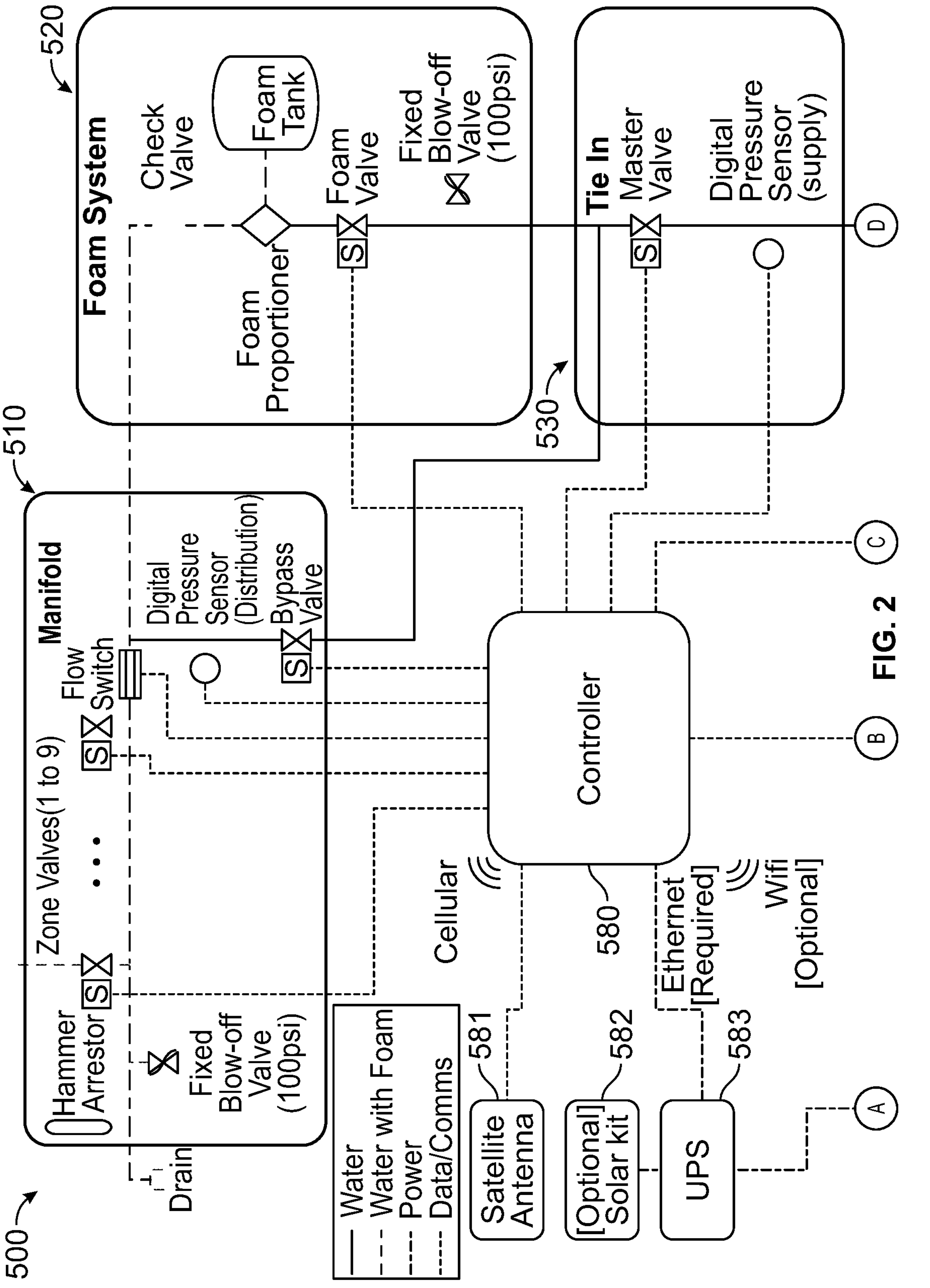
FIG. 2 is a schematic of an embodiment of a EFMS in accordance with the present inventions, which can form a node on embodiments of an emergency communications systems in accordance with the present inventions.
Figure 2:
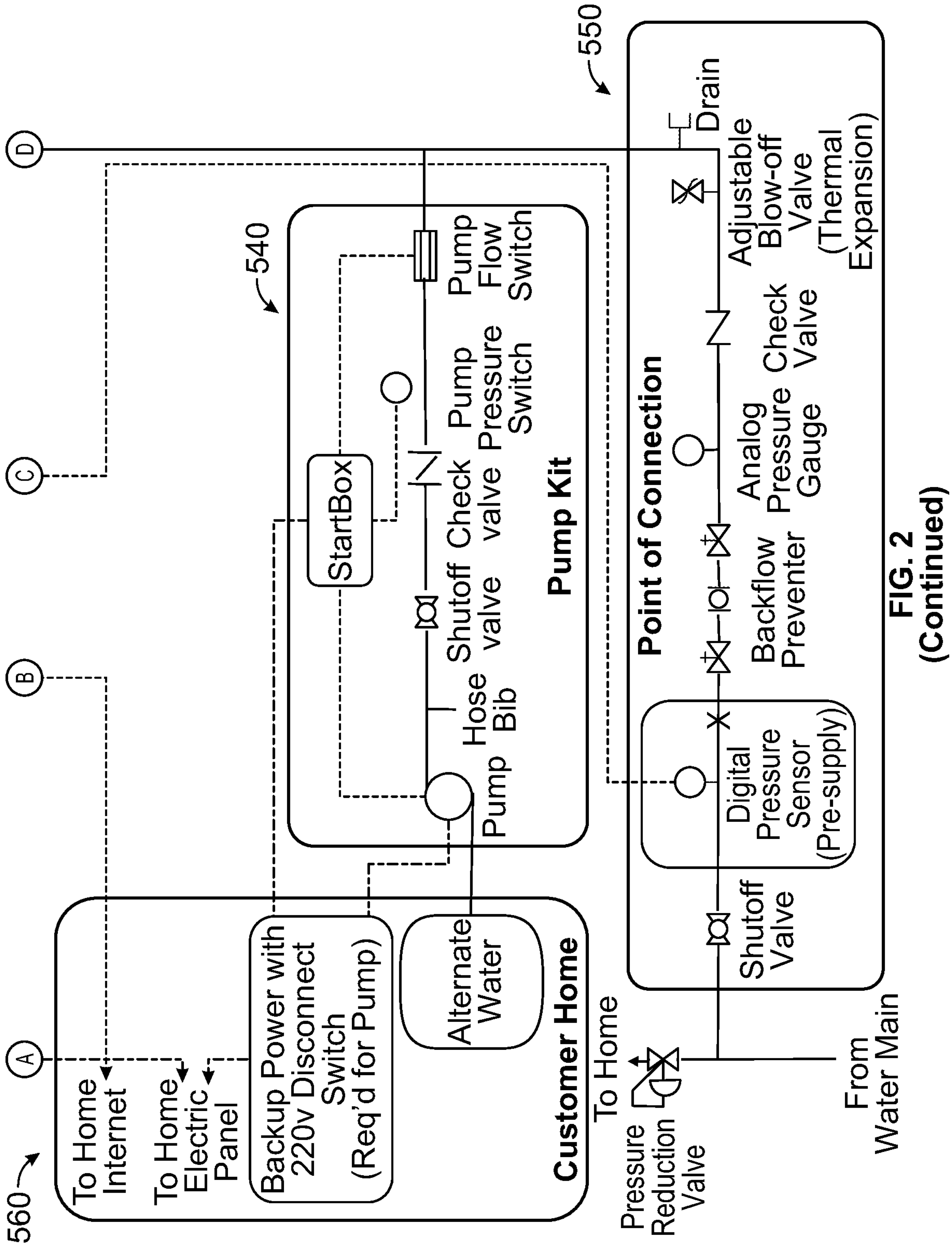

Turning to FIG. 2 there is shown a schematic of a general embodiment of an EFMS 500. The controller 580 is connected to the network of a fire emergency communications system by one of two or both path ways, i.e., cellular and WiFi to home internet. One, two, ten or more structures in an area can have these EFMS 500. The network can have EFMS of other configurations as well, such as the types generally provided in this Specification. The EFMS can include a manifold 510, a foam system 520, a tie in 530, a pump kit 540, a point of connection 550, a satellite antenna 581, an solar kit 482, and a UPS (universal power supply). These components are associated with a structure (e.g., a house) 560. The system can also have a GUI that is wall mounted or otherwise located at the structure, the GUI is in control communication with the controller 580 and also can be in control communication with a remote GUI, as well as other nodes on a network.

The controller 580 can be in control communication with an operation control command plan (e.g., a determined, including a predetermined, course of action based upon certain inputs, data or both). These control commands can reside entirely in the controller 590 (e.g., the memory associated with the controller and be executed by the processor in the controller), they can reside in a control system in the cloud and be executed by a cloud-based processor, they can be distributed between the cloud and the controller 580, i.e., between the cloud-based control system and the local controller.

In general, the EMFS 500 can be a node on a fire emergency communication system, like system 100, and these fire emergency communication systems can have 5, 10, tens, hundreds, thousands of EFMS as nodes on the system.

The control commands, including the operation control command plans, can be updated, deleted, replaced and managed, for example, via the cloud, via the network, locally and combinations and variations of these.

In general, a control system sends control commands to activate and operate the EMFS, sends commands to a local controller 580 to activate and operate the EMFS and combinations and variations of these depending upon the network and controller configuration. These control commands, among other things, start and stop the operation of the EMFS, thus these commands determine, among other things, the number of cycles, time between cycles, duration of a cycle, as the operation control command plan is carried out through the operation of the EFMS. The stop commands, e.g., deactivate and stop operation of the EFMS, lockout the EFMS, can be based upon a timer, monitored hydration levels, communications from a control system, a GUI, or another notice on the network, as well as, other factors.

Internal fire suppression systems, such as the type having interior sprinkler heads that are activated upon the detection of condition indicating a fire, e.g., increased heat, smoke, can be a node on the network, they can be in communication with an EMFS, either directly (e.g., local controller to local controller), through a GUI, through a control system (e.g., cloud or network controller), and combinations and variations of these, as well as, other control communications configurations. The internal fire suppression systems, would directly protect interior walls, and floors, as well as, furniture, appliances and occupants (such as to facilitate evacuation from the effective structure or room, or to assist in fighting the interior fire).

Generally, the EFMS is in control communication with a control system that has control commands. These control commands can be as simple as an activation signal, a valve open or shut signal, and include more complex or detailed control commands. These more detailed control commands include an operation control command plan for performing an operation plan, such as a hydration plan, a lockout plan, a low line pressure plan, an auto-activation notice with default activation plan, an adjacent structure based plan, etc. These control commands can reside: entirely in local controllers (e.g., data storage and memory associated with a controller at an EFMS of a structure and be executed by the processor in that controller); they can reside in the cloud (e.g., storage and memory associated with a cloud-based controller and be executed by a cloud-based processor); they can reside on the GUI, or, they can be distributed between the cloud, the GUI, the local controllers and combinations and variations of these configurations. In general, the control commands, e.g., the operation control command plans, are programs having, or based upon, algorithms, for executing the operation of the systems, including particular operation plans. The operation control command plan provides for the system to operate and implement an operation plan. The operation plan can be any of the types of plans, disclosed or suggested in is specification, such as a hydration plan, a lockout plan, a low line pressure plan, an auto-activation notice with default activation plan, and an adjacent structure based plan. The operation control command plan can be any multi-operation or multi-step plan for operating the EFMS, the internal fire suppression system and both. The operation control command plan can be based upon data, information and user input, such as, hydration levels, cycle times, wetting rates, fire risk, wind speed and direction, adjacent systems status, other systems status, an activation command, water line pressure, etc.

In embodiments the control system is configured to interface, and thus be in control communication, with the control system for an irrigation system. These irrigation systems can be any system for providing water to agriculture, e.g., lawn, plants, trees, vegetation near or around a structure or in a particular area. Typically, these irrigation systems have a network of pipes or tubing that is connected to a series of sprinklers, or other water distribution devices. Typically, these irrigation systems have a controller that is capable of being a node on a network, or otherwise capable of being in control communication with other devices, such as embodiments of the present control system, e.g., a cloud based control system. If, however, the controller for the irrigation system does not have communication capabilities, it can be modified to provide such capabilities. Such modification includes the addition of a cellular, WiFI or hard wire (e.g., ethernet) communication device. In general, the irrigation system will already be installed at a structure (e.g., a preexisting irrigation system), prior to the installation of the EFMS. However, it is to be understood, that both systems could be installed at the same time (e.g., with new construction) or the EFMS may be installed first with the irrigation system being added later. Thus, in an embodiment the local controller from the EFMS, the control system for the EFMS, or both, are in control communication with the irrigation system. In this manner the water supply, the tubing and the sprinklers of the irrigation system can be specifically used for wildfire mitigation and management. In particular, in an embodiment, the water supply, the tubing and the sprinklers of the irrigation system, can be used, controlled by the operation control command plan for performing an operation plan, of the EFMS, to perform the operation plan.

In an embodiment of the present control system, the control system is configured to have the ability to be control communication with different types of local controllers. These local controllers can be for an EFMS, an irrigation system, an internal sprinkler system, an HVAC system, a security system, a lighting system or other systems. In addition to being configured for communication with these different types of local controllers, the control system is configured for communication with different types of communication protocols, e.g., as used by different manufactures, for each of these different types of systems. Thus, the control system can be configured to be capable of control communication with one, two, three, four, five or more different types of systems. Further, for each of these different types of systems, the control system can be configured to be in control communication with one, two, three or more different communication protocols. In an embodiment, the control system has one or menus, e.g., a series of menus, that are presented on a GUI to guide a user to select predetermined configurations to establish such control communications, and in this manner connect the local controller to the control system.

The operation control command plan can be "predetermined", in which case the operation plan, and the steps or processes for that plan are fixed, and cannot be changed by the control systems itself. Recognizing of course, that such predetermined operation control commands can be updated, upgraded or otherwise managed, by manufactures, systems providers, systems managers, users (although not preferably) and the like. The operation control command plan can be "determined", in which case the operation plan, has steps or processes that are established, however, the frequency, timing, magnitude (e.g., amount of flow), duration, sequence, etc., can be changed by the control system (as well as the local controller or both) upon receipt of data or information, preferably real time data and information about environmental conditions (e.g., hydration levels, cycle times, wetting rates, fire risk, wind speed and direction, adjacent systems status, other systems status, water line pressure, etc.). In an embodiment, the determined operation control command plan could be an adaptative strategy control command.

The control system sends control commands to activate and operate the EMFS, sends commands to a local controller to activate and operate the EMFS and combinations and variations of these depending upon the network and controller configuration. The control system, in some embodiments, can also send control commands to activate and operate internal fire suppression system, sends commands to a local controller to activate and operate the internal fire suppression system and combinations and variations of these depending upon the network and controller configuration. The control commands, among other things, start and stop the operation of the EMFS, thus these commands determine, among other things, the number of cycles, time between cycles, duration of a cycle, as the hydration plan is carried out through the operation of the EFMS. The stop commands (e.g., deactivate and stop operation of the EFMS, and lockout the EFMS), can be based upon a timer, monitored hydration levels, the status of hydration levels of areas and locations, the status of fire suppression systems, internal to a structure and external to the structure, (e.g., armed, operating, standby, available water pressure, etc.) and the water pressure or line pressure of areas and locations., as well as, other factors.

In general, embodiments of the EMFS can be made up, in whole or in part, of irrigation system components; and in particular, one or more of: the water line into the irrigation system, the manifolds or distribution headers for the irrigation system, the tubing or piping connecting the irrigation system to the water distribution devices, e.g., sprinkler heads, the local controller for the irrigation system, and the water distribution devices, e.g., sprinkler heads, for the irrigation system.

In a general, embodiments of an EMFS can have hydration plan control commands, for carry out the hydration plan, the EMFS can have and can receive input from devices that directly or indirectly monitor the hydration levels of combustible materials in predetermined areas, i.e., zones, that surround the structure. The devices for monitoring the hydration levels of combustible materials, can include for example: soil moisture sensors; moisture sensors on, or in, vegetation; visual sensors (e.g., color of vegetation); humidity sensors; temperature sensors; data input, memory and processors that can predilect or determine hydration levels and hydration trends, and combinations and variations of these and other devices. The zones are primarily configured based upon a predetermined distance from the structure. The zones may also be configured based upon natural fire breaks, fire risk and other geographic or environmental factors.

Thus, there is typically a first, or inner zone, which is adjacent to the structure and extends out from the structure a few feet to yards (meters). There is typically a second zone, which is adjacent to the first zone (or which can be overlapping) and extends outwardly from the first zone further away from the structure by a few feet to a few yards (meters). In the two-zone embodiment, the second zone would be the outer zone. There can also be a third zone, in which case, the second zone would be considered the middle zone, and the third zone would be considered the outer zone. The third zone would be adjacent to the second zone (overlapping or not over overlapping) and extends outwardly from the second zone further away from the structure by a few feet to a few yards (meters). Additional, zones extending further away from the structure may also be used.

Generally, the hydration plan, and hydration plan control commands, can have predetermined, derived or both, hydration levels for each zone, and then operate the EFMS to maintain those hydration levels. The hydration levels for each zone can be the same or different. The hydration levels can be varied based upon for example: season, weather conditions, and wildfire information and data. Thus, for example, the hydration levels for each zone can be: (i) predetermined, e.g., a higher level of hydration during fire season, e.g., higher hydration level in inner zone, or both zones; (ii) they can be determined by the control system based upon incoming data, e.g., active fire near structure, which would increase hydration levels in both inner and outer zones, or inner zone first, then outer zone, if/as fire approached; (iii) user input, e.g., setting a desired hydration level, e.g., higher, hydration level for one or more zones; (iv) local zoning, water use requirements, including water use requirements during an active fire event; (iv) based upon derived data, e.g., fire risk conditions calculated based upon real time raw data; and (v) combinations and variations of these, as well as other factors.

In general embodiments of these EMFS having a hydration plan and the hydration plan method, e.g., the hydrating of the surrounding combustible materials in the areas or zones surrounding the structure, can be configured to remotely protect structures during a wildfire. The system has a source of data that identifies or defines an area around a structure and provides the hydration level of combustibles around that structure and in the area.

The area can be a series of areas, with each area having a periphery that extends out further from the structure. In this manner the amount of hydration of the combustible material in each of these areas is provided.

These areas could be concentric, e.g., concentric circles, squares, ovoids or rectangles. These areas can be based upon the shape, e.g., foot print, of the structure, and thus extend outwardly from that foot print by a set distance, and thus the shape of the area would be a larger but similar shape foot print to the structure. These areas can be any geometric shape with one being located inside the other and having a common center point, or different center points. These areas could be overlapping, and partially overlapping (e.g., along the lines of Venn diagrams). These areas could follow the exact shape of the foot print of the structures, thus being a set distance from each wall. The areas can take into account multiple structures, e.g., garage, shed or coach house. These areas may also be based upon, or shaped, to take into consideration the natural contours of the land around the structure, fire breaks such a highway or rivers, and likely wind patterns, among other natural factors, to further define the shape and size of the areas. These areas can use one or more, and combinations and variations of the foregoing shapes and arrangements.

The areas can also be determined based primarily upon the amount of hydration of the combustibles around the structure. Thus, in periods when the combustibles are very dry, i.e., low levels of hydration (less than 50% water content, less than 25% water content, less than 10% water content, and less than 5% water content) the area can be expanded to provide a large area around the structure for mitigation and monitoring purposed.

The areas can be hydrated based upon specific amounts of water being applied to the area or zone. Thus, Home Ignition Zone 0 (HIZ0), which is adjacent to the structure, i.e., the inner zone or area, can have a primary hydration amount of: about 2" of water per 24 hour period; about from 1" to about 2" of water per 24 hour period; about 0.7" to 1.2" of water per 24 hour period; and, preferably for an HIZ0 having distance from the structure of 5 feet, 1" of water per 24 hour period.

The next zone away from HIZ0, and adjacent to HIZ0, which is HIZ1, (outer zone for two zone embodiment, middle zone for three zone embodiment) can be hydrated based upon specific amounts of water being applied to the area or zone. Thus, Home Ignition Zone 1 (HIZ1), which is adjacent to HIZ0 can have a primary hydration amount of: about 1" of water per 24 hour period; about from 0.5" to about 1.2" of water per 24 hour period; about 0.3" to 0.8" of water per 24 hour period; about 0.1" to 0.3" of water per 24 hour period; and preferably for an HIZ1 having distance from the structure that is adjacent to HIZ0 (e.g., 5 feet from the structure) and extends out to 30 feet from the structure, 0.25" of water per 24 hour period.

After the primary hydration amount is applied, it is preferable that a replenish amount of water is applied to the area or zone, and that this is applied daily during dry conditions, red flag warnings, high fire risk conditions, and combinations and variations of other factors.

Thus, for HIZ0, for each 24 hour period following the primary hydration, a replenishment hydration amount of: about 1" of water per 24 hour period; about from 0.3" to about 0.8" of water per 24 hour period; about 0.4" to 0.9" of water per 24 hour period; and preferably for an HIZ0 having distance from the structure of 5 feet, 0.5" of water per 24 hour period. These others factors can be received, determined or both from data and information provided to the control system for the EFMS having a hydration plan.

Thus, Home Ignition Zone 1 (HIZ1), which is adjacent to HIZ0 can have a replenishment hydration amount of: about 0.4" of water per 24 hour period; about from 0.1" to about 0.4" of water per 24 hour period; about 0.10" to 0.25" of water per 24 hour period; and preferably for an HIZ1 having distance from the structure that is adjacent to HIZ0 (e.g., 5 feet from the structure) and extends out to 30 feet from the structure, 0.13" of water per 24 hour period.

The level of hydration that is maintained in the various zones, e.g., HIZ0, HIZ1, HIZ2, etc. can be measured by Fuel Moisture Content ("FMC"). Fuel moisture content is the percentage of a given fuel's weight, represented by water, based on the dry weight of the fuel. Thus, it is: Percent Moisture Content=Weight of Water/Oven-dry Weight of Fuel×100. It is noted that moisture content can be greater than 100 percent because the water in a fuel particle may weigh considerably more than the dry fuel itself. For example, a green leaf may contain three times as much water as there is dry material, leading to a moisture content of 300 percent. Moisture content of duff and organic soil can be over 100 percent. In embodiments the EFMS establishes and maintains a FMC in HIZ0 from about 100% to about 400%, from about 200% to about 300%, about 100% or more, about 200% or more and about 300% or more. The EFMS establishes and maintains an FMC in HIZ1 from about 100% to 300%, from about 70% to about 150%, about 75% or more, about 100% or more, and about 150% or more. The EFMS establishes and maintains an FMC in HIZ2 from about 25% to 100%, from about 30% to about 50%, about 50% or more, about 60% or more, and about 100% or more. Combination and variations of these established and maintained FMCs may be utilized, as well as, higher and lower amounts.

Further, the hydration plan, and the hydration plan control commands, can be configured to keep combustibles wet enough so that an ember attach will not ignite them. For example, the ignition point for dry grass and leaves is about 13.6 MJ/m$^2$, the ignition point for dry cushions and dry fabric (e.g., yard furniture) is about 7.5 to 19.7 MJ/m$^2$, and the ignition point for dry pine wood is about 18.1 MJ/m$^2$. The energy from a typical ember attack is about 52.2 MJ/m$^2$. In general, a preferred hydration plan will keep these materials saturated. The plan will account for hydration time (e.g., about 20 hours for wood to become saturated) amount of water needed for saturation, and evaporation. For example, about 43 gallons/100 sq ft (e.g., 62 inches of water) can be used to keep these materials saturated, under certain conditions. However, it is preferred to have a safety factor and thus use 62 gal/100 sq ft (e.g., 1 inch of water) By saturating these materials, as well as, other materials, their ignition point is raised, i.e., it takes more energy for them to ignite. It requires about 65.9 MJ/m$^2$ to heat and evaporate 1 inch of water. Thus, when these materials are saturated their ignition points are above the energy from an ember attack, and thus the amber attack will not ignite them. For example, saturated pine wood has an ignition point of 62.6 MJ/m$^2$, which is well above the 52.2 MJ/m$^2$ from a typical amber attack Moreover, if the area surrounding the structure is saturated, any spot fires that may occur should be self-extinguishing.

The control system can receive information about evaporation, calculate evaporation rates based upon data, used historic data, use real time data, and combinations and various of these to determine the amount of water needed in the hydration plan to compensate for evaporation. In extreme conditions materials can lose 0.5 inches of water per day. Typical California summers see water loose from evaporation of about 0.25 inches per day. Thus, the hydration plan can be based upon, e.g., designed to compensate for, these typical evaporation rates, preferably with a safety factor added in, e.g., 50%.

Embodiments of the hydration plans can limit the flow rate to about 24 gpm. Generally, the hydration plan will provide for periods on operation, e.g., cycles, and then periods on no operation. In embodiments hydration maintenance cycles can use about 2.5 gpm, and initial hydration cycles can use about 5 gpm.

In an embodiment the primary (e.g., initial) and replenish (e.g., maintenance) amounts of hydration for HIZ0 and HIZ1 are such that there is no need to apply water to HIZ2.

The data and information about the amount of hydration in the combustibles surround the structure can come from any available source. Moisture sensors can be located around the structure. The moisture sensors and hydration system can be of the type used for agriculture to monitor crops. It can contain moisture sensors located in the ground, or at or near the ground to determine moisture levels, and hydration levels of combustibles.

The data and information about the amount of hydration in the combustibles can also come from historic data. In this manner hydration levels based upon prior weather conditions can be analyzed and used to predict, and provide a derived hydration levels based upon current conditions. Optical sensors may also be employed to determine hydration level based upon color or visual condition of the combustibles.

The data and information about the amount of hydration in the combustibles can also come from publicly available sources, such as the depart of agriculture, local fire management systems, and weather and climate services.

The data and information about the amount of hydration in the combustibles can come from adjacent structures and other monitoring systems.

The data and information about the amount of hydration, from one, more than one, and all of these as well as other sources, is used by the EMFS for several purposes. The EMFS system, using the hydration plan control commands, can determined the amount of water needed to increase the hydration level in one or more of the areas around the house to an acceptable level. The EMFS can evaluate, one or more of, the amount of available water, predicted weather patterns, fire hazard level and other factors, to determine and implement a hydration plan, e.g., amount, time, duration, and location, of sprinkler usage to obtain an optimum hydration level based upon one or more and all of these factors.

The evaluation of the hydration data and information, and the formulation of hydration plans can be done by the EMFS systems at a local control and processing system, it can be done by a remote control and processing system, it can be done by a distributed control and processing systems and combinations and variations of these.

The hydration data and information can also be used by the EMFS system to determine the amount, duration and time of the application of fire suppressions materials, e.g., water, foam, when a fire is detected. In this manner, the minimal amount of fire suppression material can be used that are necessary, based upon hydration data and information, to suppress the fire and protect the structure.

Figure 8:
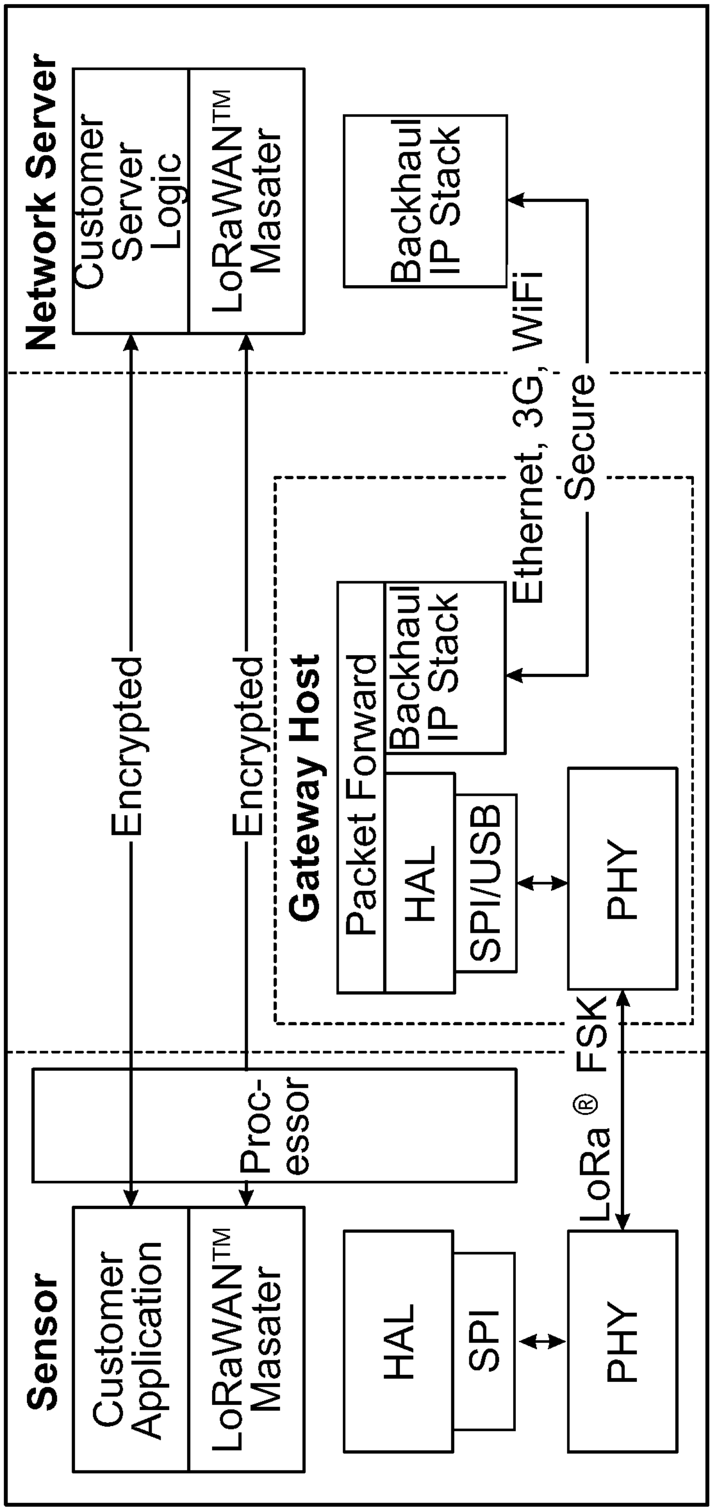
FIG. 8 is a schematic of an embodiment of a LoRa type system in accordance with the present inventions.

In an embodiment, enhancements in speed can be achieved by inter controller communication on the network. For example, one controller can let another controller know that it has activated, and if a second controller lets other controllers know it has been activated, then there is logic that can be applied to activate the controller receiving the activate information. The communication path for communicating between controllers does not need to be via the cloud, but rather through radio communication, such as a LoRa type system, including LoRaWAN®. FIG. 8 provides a schematic of an example of an architecture for LoRa type system. In an embodiment this architecture is deployed in a star-of-stars topology in which gateways relay messages between end-devices and a central network server. The gateways are connected to the network server via standard IP connections and act as a transparent bridge, simply converting RF packets to IP packets and vice versa. The wireless communication takes advantage of the Long Range characteristics of the LoRaO physical layer, allowing a single-hop link between the end-device and one or many gateways. All modes are capable of bi-directional communication, and there is support for multicast addressing groups to make efficient use of spectrum during tasks such as Firmware Over-The-Air (FOTA) upgrades or other mass distribution messages.

An emergency management control network and system, e.g., the embodiment of FIG. 1, can have one, two, five, tens, hundreds and more EFMS that are on the emergency management control network and system. The network can have EFMS of the types generally show in this Specification, as well as other configurations. The data processing assembly (e.g., 139), based upon raw data received from various nodes on the network, processes that raw data to provide predictive information about the location and movement of a wildfire. The predictive information is communicated over the network. The predictive information can be a control command to a particular EFMS system, such as to arm, to operate, and to stop operations. This control command information can be sent to a group of EFMS in a nodal area, e.g., a predetermined nodal area.

Figure 3:
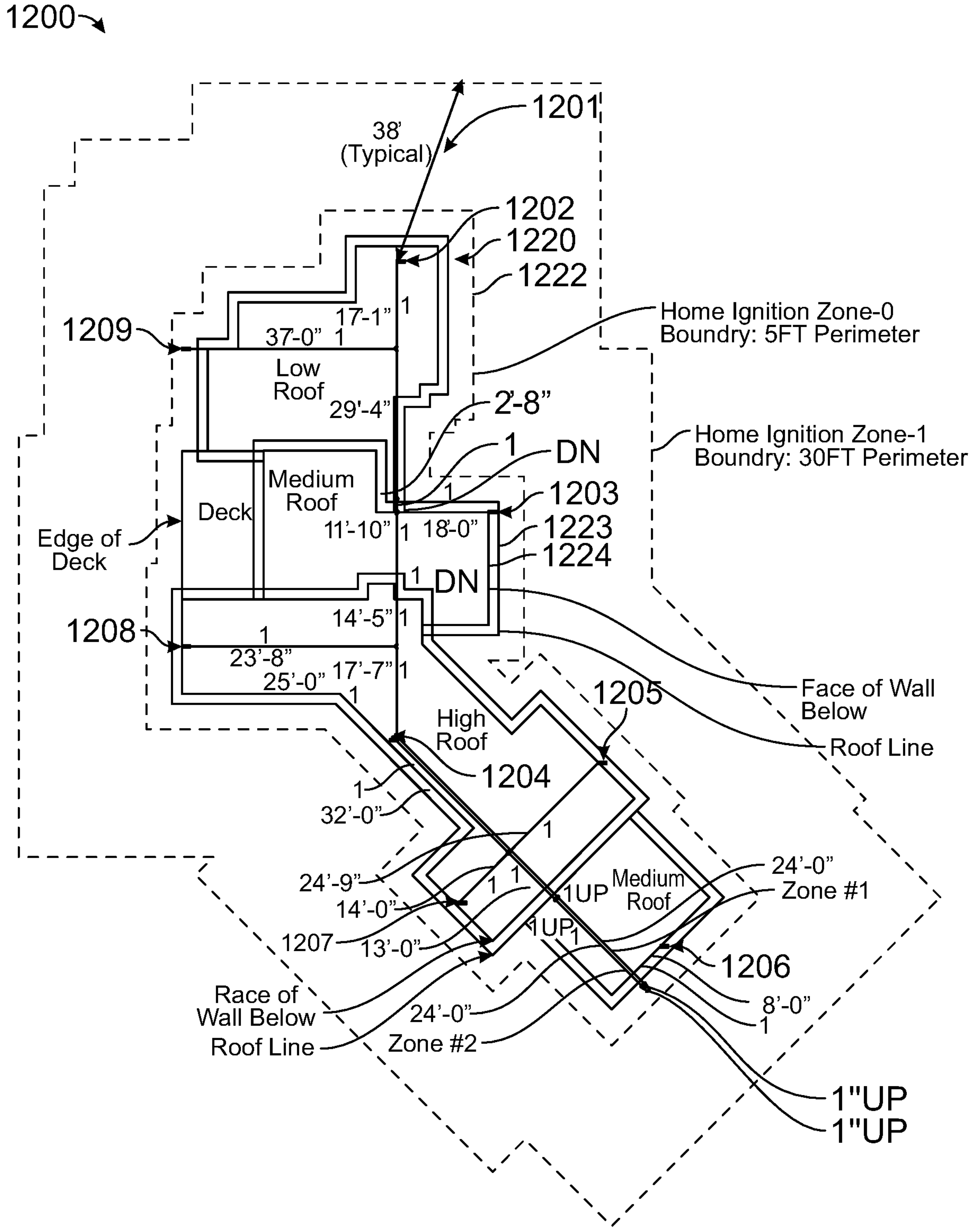
FIG. 3 is a schematic plan view of an embodiment of an EFMS, which can form a node on embodiments of an emergency communications systems, such as the system of FIG. 1B, in accordance with the present inventions.

Turning to FIG. 3 there is shown a schematic of a general embodiment of an EFMS 1200. One, two, five, tens, hundreds and more can be part of an emergency management control network and system. The network can have EFMS of other configurations as well, such as the types generally provided in this Specification. The data processing assembly based upon raw data received from various nodes on the network processes the raw data to provide predictive information about the location and movement of a wildfire. The predictive information is communicated over the network. The predictive information can be a control command to a particular EFMS system, to arm, to operate, and to stop operations. This control command information can be sent to a group of EFMS in a nodal area.

System 1200 provides an outer coverage zone 1201 that has an outer boundary 1221. The outer boundary 1221 is 30 ft from the walls 1224 of the house. The system 1200 provides an inner coverage zone 1220, that has an inner boundary 1222. Boundary 1222 is 5 ft from the walls 1224. The system 1200 has distribution heads 1202, 1203, 1204, 1205, 1206, 1207, 1208, 1209. When the system is activated, these distribution heads provide foam, water and combinations of foam and water to zone, 1220, zone 1201, and combinations and variations of these zones. The system is installed in a house that has an outer roof line 1203, that extend outwardly from the outer walls 1224, and thereby defines an eave. The zones 1201 and 1220 can be further subdivided into sub-zones. In this manner the system can be operated to provide water, foam, etc. to various sub-zones and combinations of sub-zones.

In an embodiment the inner boundary 1222 can be about 4 feet or about 3 feet from the walls 1224, as well as, more than 5 ft, about 6 ft, and less than 8 ft from the walls 1224. In an embodiment the outer boundary can be about 25 feet or about 20 feet from the walls 1224, as well as, more than 30 ft, about 35 ft, and less than 50 ft from the walls 1224.

Figure 4:
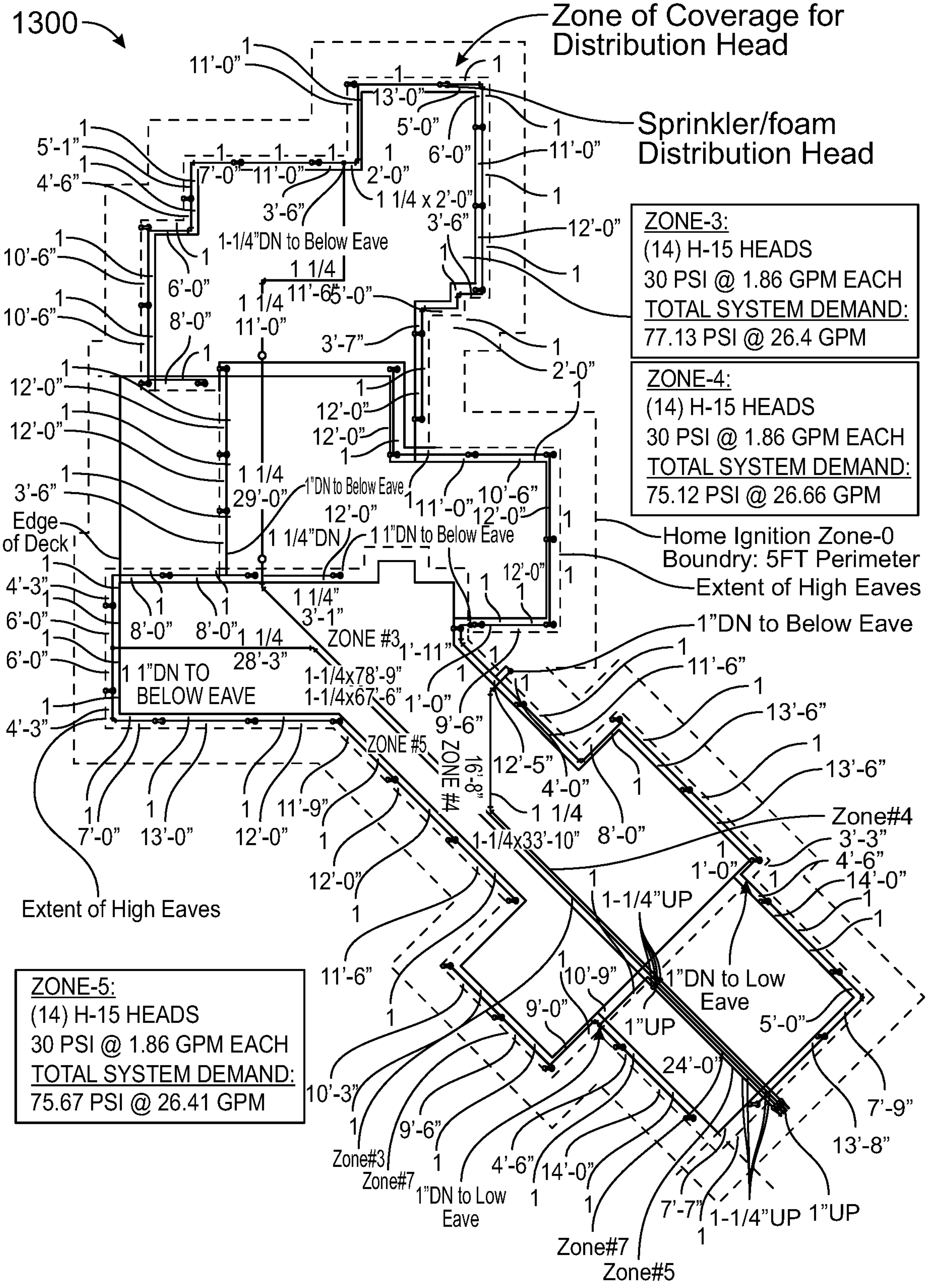
FIG. 4 is a schematic plan view of an embodiment of an EFMS, which can form a node on embodiments of an emergency communications system, such as the system of FIG. 1A, in accordance with the present inventions.

Turning to FIG. 4 there is shown a schematic of a general embodiment of an EFMS 1300. One, two, five, tens, hundreds and more can be part of an emergency management control network and system. The network can have EFMS of other configurations as well, such as the types generally provided in this Specification. System 1300 provides a coverage zone that has an outer boundary. The boundary is 5 ft from the walls of the house. The system 1300 has plurality of distribution heads. When the system is activated, these distribution heads provide foam, water and combinations of foam and water to the coverage zone and combinations and variations of these zones. The system is installed in a house that has an outer roof line, that extends outwardly from the outer walls, and thereby defines an eave. The zone can be further subdivided into sub-zones. In this manner the system can be operated to provide water, foam, etc. to various sub-zones and combinations of sub-zones.

Figure 5:
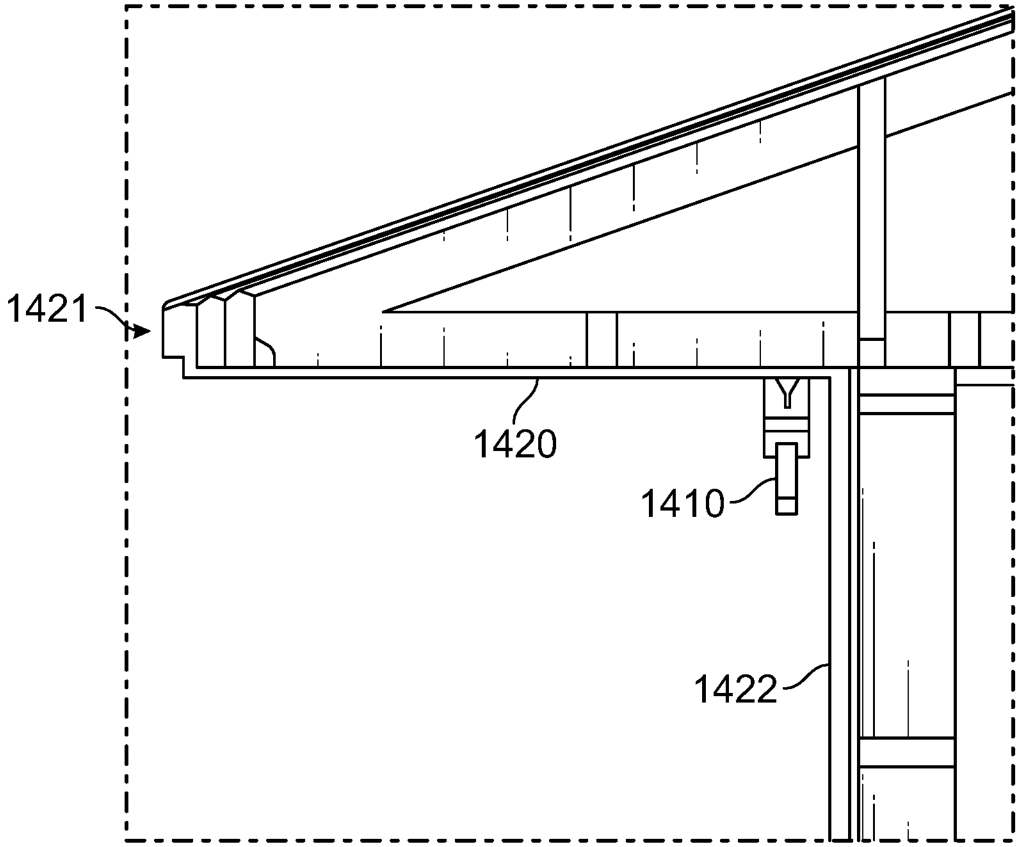
FIG. 5 is a schematic side view of an embodiment of an under eave distribution head configuration of an EFMS in accordance with the present inventions.

Turning to FIG. 5 there is a cross sectional schematic of a general embodiment of a distribution head 1410 installed under an eave 1420. There is also shown the outer roof line 1421, and a portion of the outer wall 1422. The embodiment of FIG. 5 can be used with any EFMS, including the various embodiments of EFMS of the present Specification Turing to FIG. 6 there is shown a schematic flow diagram of a general embodiment of an EFMS, such as the types generally provided in this Specification. In this system there are two controllers. A first controller (e.g., motor controller) having I/O connected to pumps valves and other sensors and device for the operation of the sprinklers and water, foam and both distributions. This first controller has a control program or control logic that controls the operation of the mechanical devices and sensors. The first control is in control communication with a second controller (e.g., Network Communication Device). This controller has a control program or control logic that can be an operating system. The second controller is configured for network communication to the cloud, peer to peer communication to other controllers in other EFMS, to make determinations based on fire, humidity, etc. sensors or other sources of data, and to provide instructions to the first controller. Thus, for example, the second controller based upon received information can make a determination to send an activation instruction to the first controller.

Figure 7:
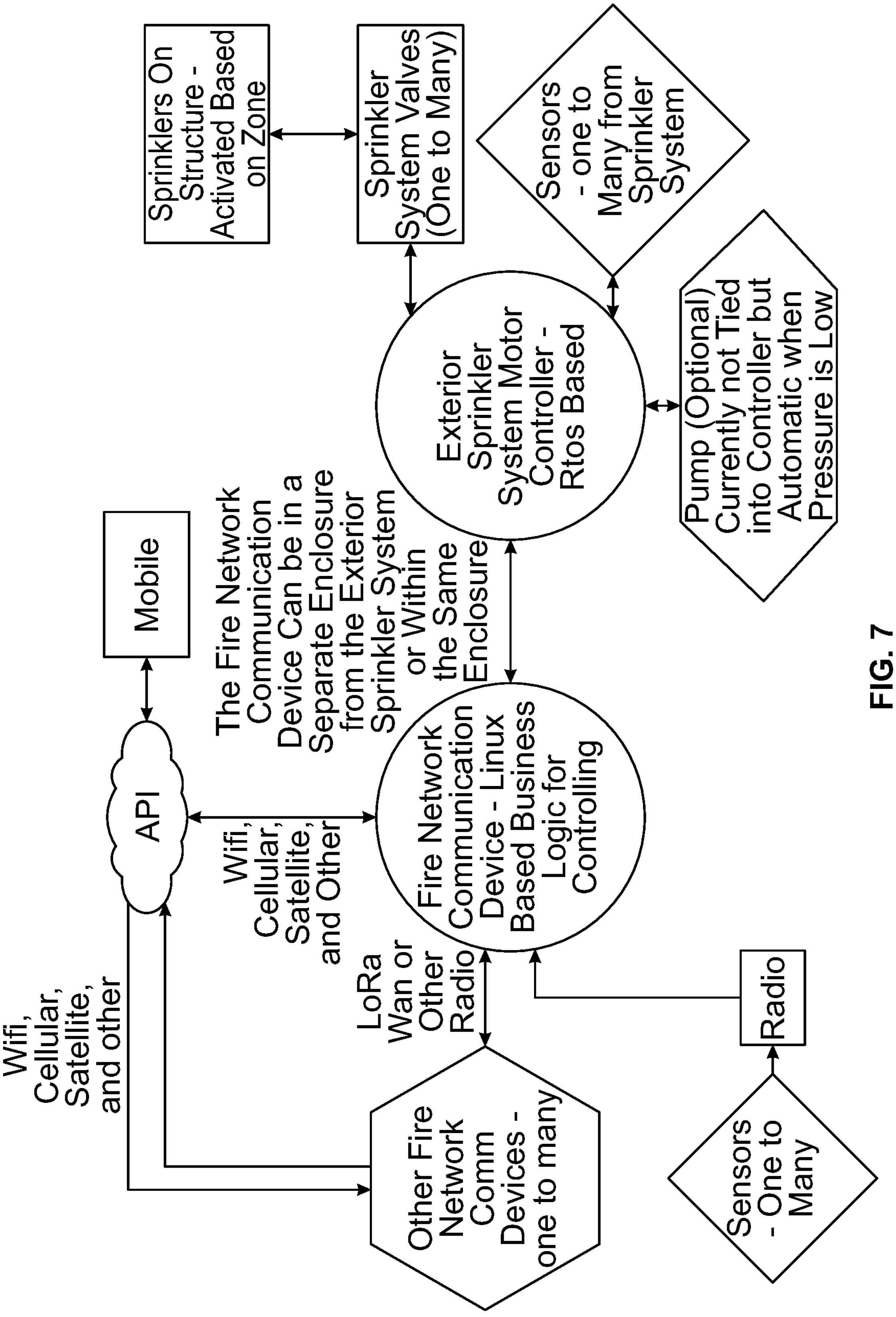
FIG. 7 is a flow diagram schematic view of an embodiment of an EMFS and its operation in accordance with the present inventions.

Turing to FIG. 7 there is shown a schematic flow diagram of a general embodiment of an EFMS, such as the types generally provided in this Specification. In this system there are two controllers. A first controller (e.g., motor controller) having I/O connected to pumps valves and other sensors and device for the operation of the sprinklers and water, foam and both distributions. This first controller has a control program or control logic that controls the operation of the mechanical devices and sensors. The first control is in control communication with a second controller (e.g., Network Communication Device). This controller has a control program or control logic that can be an operating system. The second controller is configured for network communication to the cloud, peer to peer communication to other controllers in other EFMS, to make determinations based on fire, humidity, etc. sensors or other sources of data, and to provide instructions to the first controller. Thus, for example, the second controller based upon received information can make a determination to send an activation instruction to the first controller.

Figure 6:
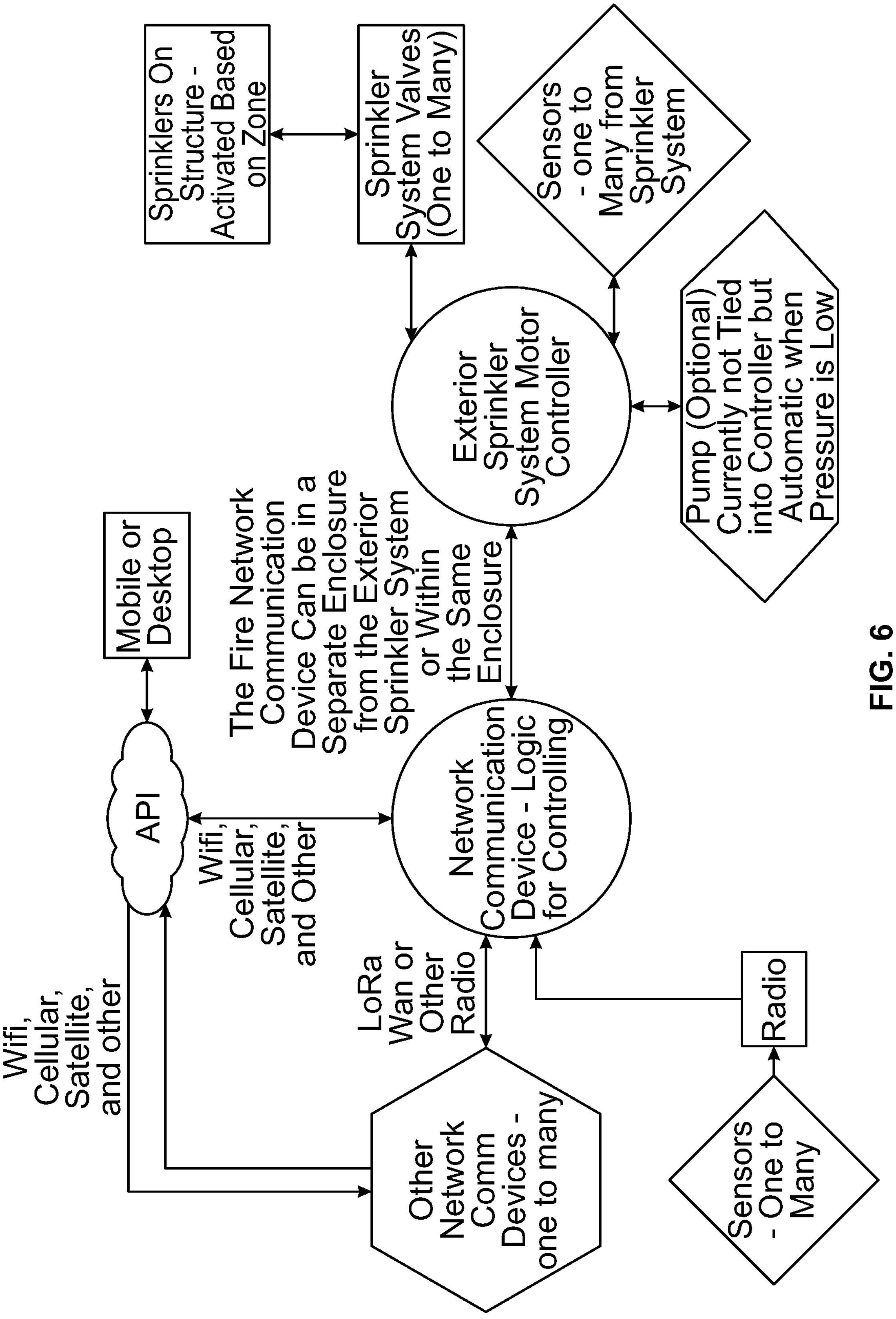
FIG. 6 is a flow diagram schematic view of an embodiment of an EMFS and its operation in accordance with the present inventions.

The embodiments of the operation of EMFS systems as shown in the schematic flow diagrams of FIGS. 6 and 7, as well as combinations and variations of these can be implemented by any EFMS, including the various embodiments of EFMS of the present Specification. These embodiments of the operation of EMFS systems can have an operation control command plan for performing an operation plan. The operation plan, for example, can be one or more of a hydration plan, a lockout plan, a low line pressure plan, an auto-activation notice with default activation plan, and an adjacent structure based plan.

Figure 9:
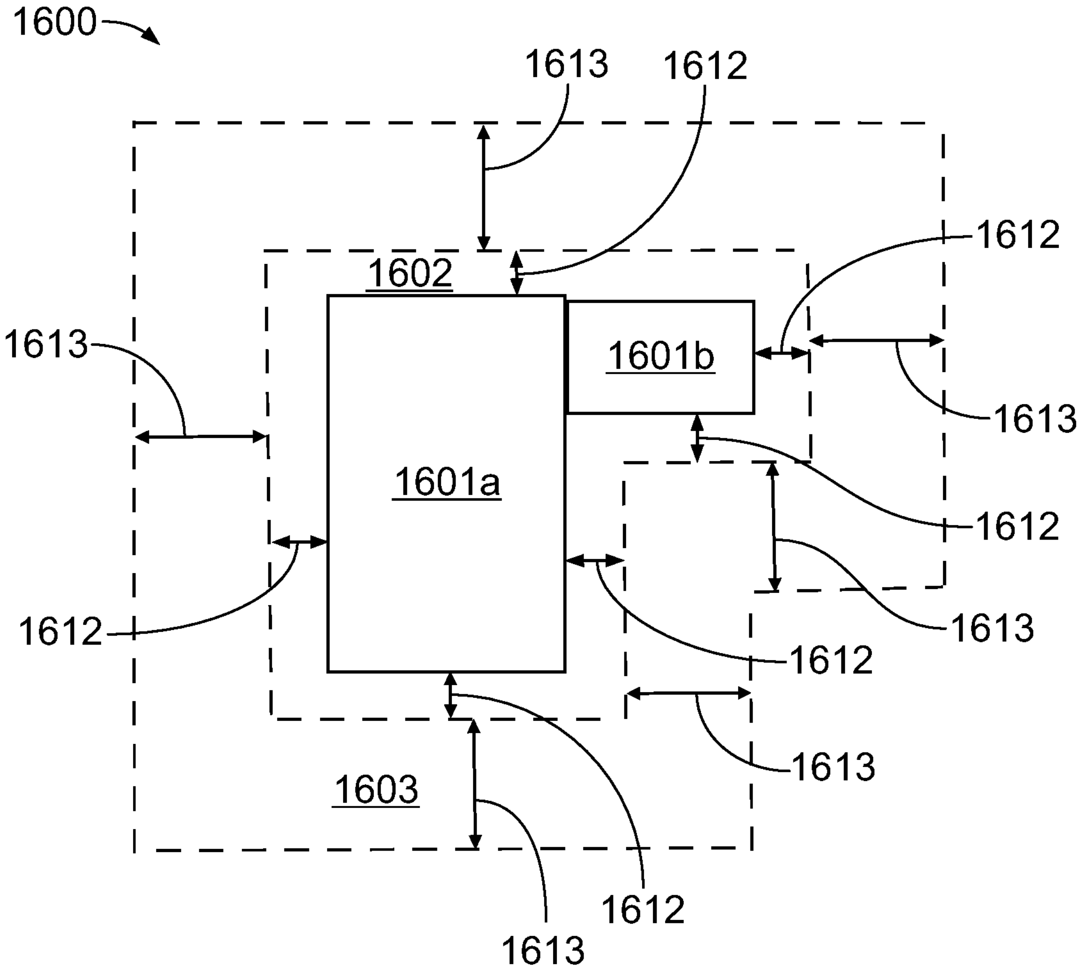
FIG. 9 is a schematic of an embodiment of an EFMS hydration system, plan and method in accordance with the present inventions.

Turning to FIG. 9 there is shown a schematic of a general embodiment of an EFMS 1600 having an operation control command plan for performing an operation plan. In this embodiment the zones around the structure exactly follow the shape of the structure, including having sharp corners. Thus, the shape, e.g., the foot print, of the zones follow and enlarge, and preferably exactly follow and enlarge, the foot print of the structure. The system 1600 having an operation control command plan is associated with a structure 1601*a*, having an ancillary structure 1601*b* (e.g., patio, outdoor kitchen, garage) to be protected from wild fire. The structures 1601*a*, 1601*b*, have an EFMS. The EMFS system and its operation control command plan a first area (HIZ0) 1602 (Home Ignition Zone ("HIZ") 0 (zero). The distance 1612 for the permitter of HIZ0 1602 from the outer walls of the structures 1601*a*, 1601*b*, can be from about 1 to 20 feet, 10 feet or less, 5 feet or less, and preferably the distance 1612 is about 5 feet. It being understood that HIZ0 is adjacent to, and can include the outer surface of, the outer wall of the structures 1601, 1601*b*.

The EMFS system and its operation control command plan establishes a second area (HIZ1) 1603. The distance 1613 for the permitter of HIZ1 1603 from the end of H1Z), can be from about 5 to 50 feet, 40 feet or less, 30 feet or less, and preferably the distance 1613 is about 25 feet. It being understood that HIZ1 is adjacent to HIZ0 (slight overlap with HIZ0 can occur). Thus, the distance for the permitter from HIZ1 from the structure outer walls is typically the sum of distances 1613+1612.

Embodiments of this EMFS have an operation control command plan for performing an operation plan. The operation plan, for example, can be one or more of a hydration plan, a lockout plan, a low line pressure plan, an auto-activation notice with default activation plan, and an adjacent structure based plan. Thus, for example, the EMFS is in control communication with the operation control command plan, which can be part of a control system, on the cloud, a local controller and combinations and variations of these, as well as the other configurations discussed in this Specification.

Figure 10:
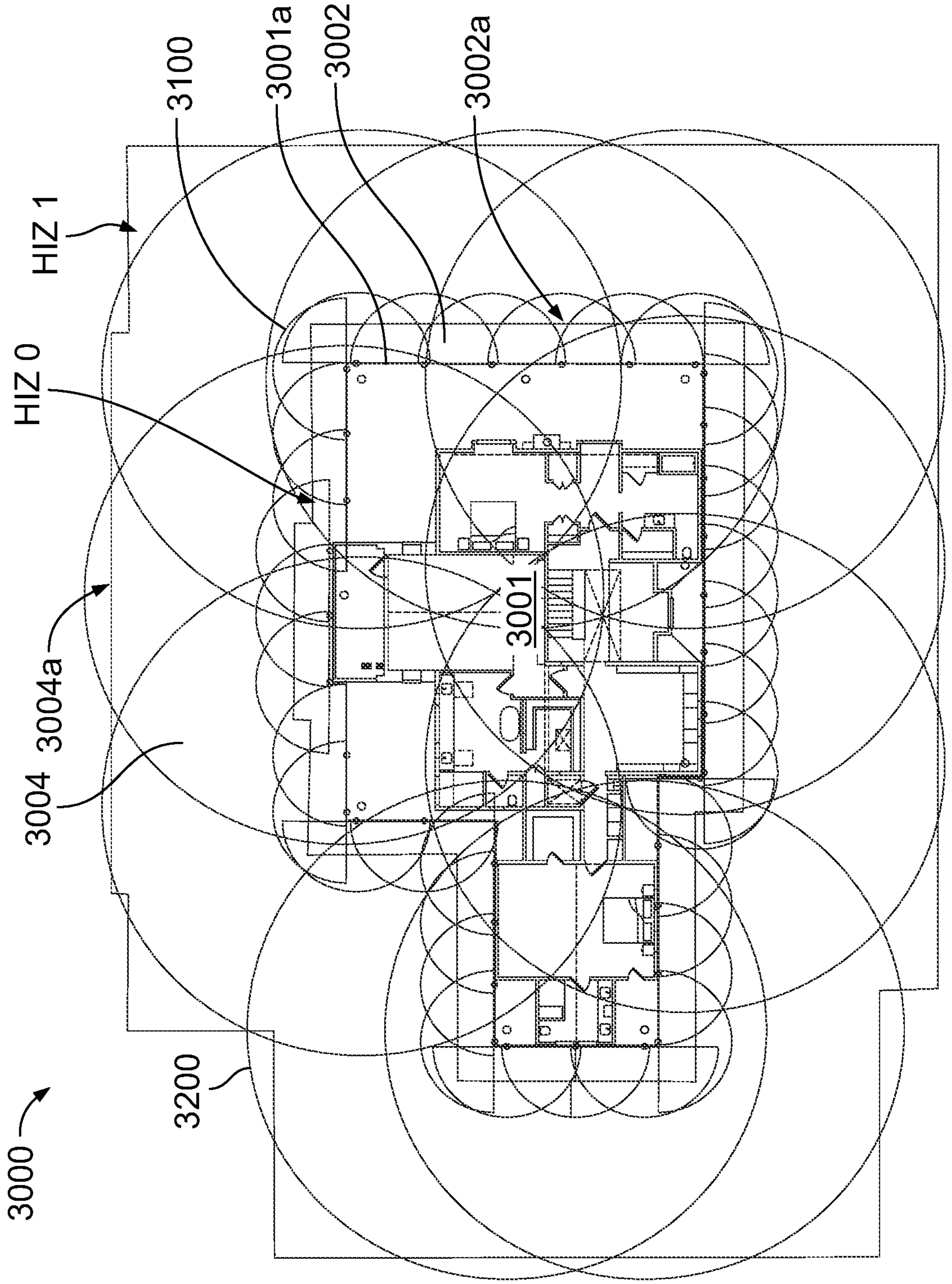
FIG. 10 is a schematic of an embodiment of an EFMS hydration system, plan and method in accordance with the present inventions.

Turning to FIG. 10 there is shown a schematic of a general embodiment of an EFMS 3000 having an operation control command plan. The system 3000 has an EFMS that is associated with structure 3001. The EFMS has a series of sprinkler heads on or near the structure that provide sprinkler patterns, e.g., area where the sprinkler head delivers water, fire suppressant, or combinations of these. The sprinkler patterns are overlapping, with the smaller patterns, e.g., 3100 being overlapped by the larger patterns, e.g., 3200. The EFMS establish two zones HIZ0, 3002 and HIZ1, 3004. HIZ0 is adjacent to the outer wall 3001*a* of the structure 3001. HIZ0 has a footprint 3002*a*. HIZ1 is adjacent to HIZ0 and extends outwardly from HIZ0 away from the structure 3001 and has footprint 3004*a*. As can be seen in the figure, the footprints 3002*a* and 3004*a* have a larger but otherwise identical shape to the shape of structure 3001, and in particular the outer walls 3001*a*. It can also be seen that the smaller sprinkler patterns, e.g., 3100, completely cover HIZ0 (i.e., 100% of the area of HIZ0 is covered by the patterns, e.g., 3100) and that the larger patterns, e.g., 3200, overlap the smaller patterns, and cover substantially all of HIZ0, as well as HIZ1. The lager patterns can be configured to cover all of the area of HIZ0, as well as all of the area of HIZ1.

In embodiments, the larger sprinkler patterns cover at least 95%, at least 98%, at least 99% and 100% of the area of HIZ0. In embodiments, the smaller pattern covers at least 98% of the area of HIZ0, at least 99% of the area of HIZ0 and 100% of the area of HIZ0. In embodiments, the larger sprinkler patterns cover at least 95%, at least 98%, at least 99% and 100% of the area of HIZ1. Combinations and variations of these coverages can implement, and can be implemented based upon the exposure of the property, e.g., risk.

Embodiments of this EMFS have an operation control command plan for performing an operation plan. The operation plan, for example, can be one or more of a hydration plan, a lockout plan, a low line pressure plan, an auto-activation notice with default activation plan, and an adjacent structure based plan. Thus, for example, the EMFS is in control communication with the operation control command plan, which can be part of a control system, on the cloud, a local controller and combinations and variations of these, as well as the other configurations discussed in this Specification.

Figure 11:
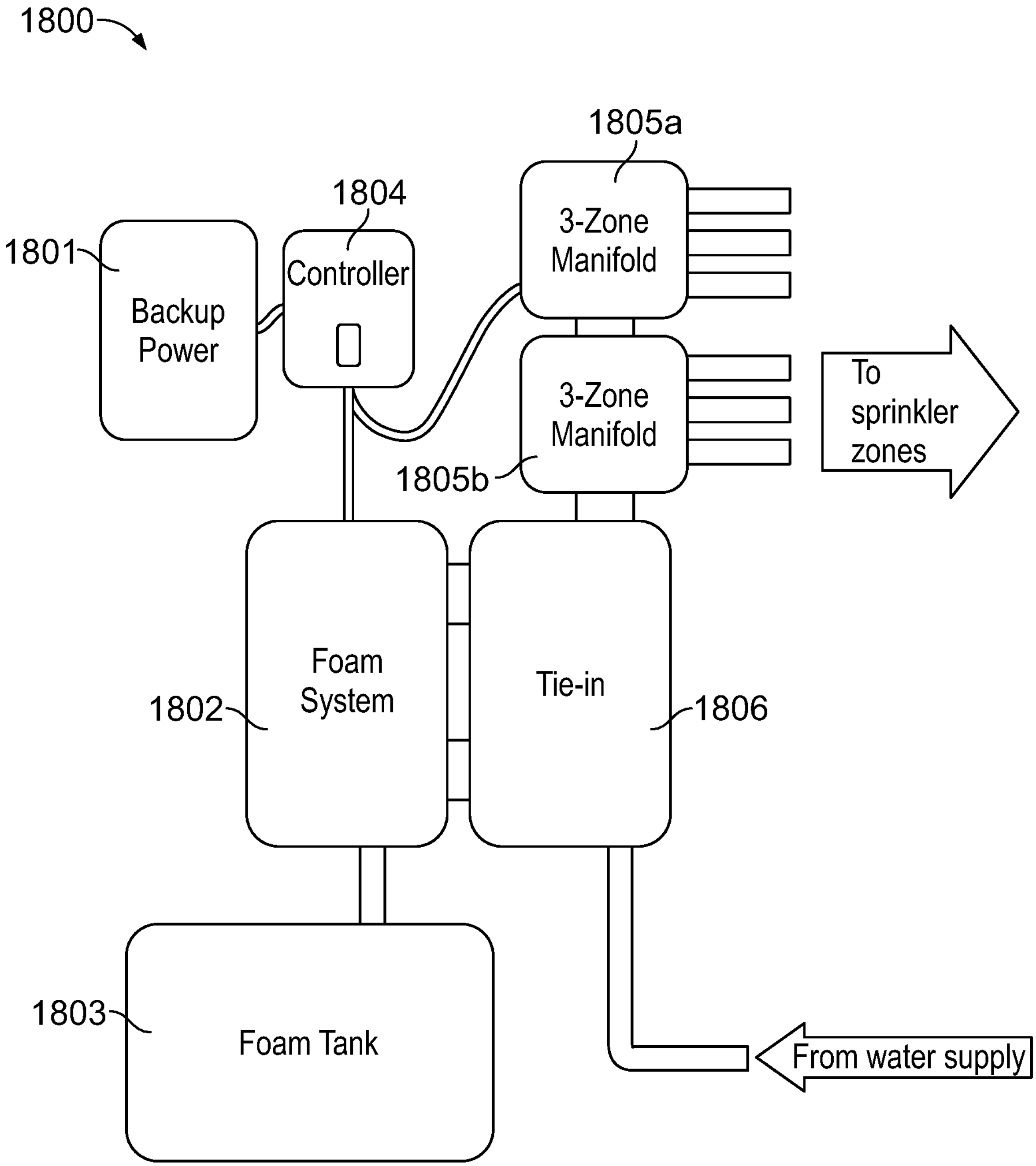
FIG. 11 is a schematic of an embodiment of an EFMS system in accordance with the present inventions.

Turning to FIG. 11 there shown a schematic of a general embodiment of an EFMS 1800. The EFMS 1800 has a power back up 1801, a controller 1804, a foam system 1802 and a foam tank 1803. Water from a water source, e.g., city water, public utility water is connected via a pipe to a tie-in unit 1806, that is in fluid communication with the foam system 1802. Water or a water-foam mix is flowed through a pipe from the tie-in unit 1806 to a first manifold 1805*b* and a second manifold 1805*a*. The manifolds distribute the water, or water-foam mixture through pipes to sprinkler heads. (The reference to "zones" in this figure refers to a group of particular sprinkler heads in the system, i.e., a zone of sprinkler heads, such as for example 5 sprinkler heads under the eve of the north side of the structure, and not the hydration zones as discussed with respect to an hydration plan.) The manifolds are modular, so that a system can have one, two (as shown), three, four or more modules depending upon the number of sprinkler heads used in the system. This EMFS can perform one or more, and all of the various functions of EMFS set forth in this Specification.

Embodiments of this EMFS have an operation control command plan for performing an operation plan. The operation plan, for example, can be one or more of a hydration plan, a lockout plan, a low line pressure plan, an auto-activation notice with default activation plan, and an adjacent structure based plan. Thus, for example, the EMFS is in control communication with the operation control command plan, which can be part of a control system, on the cloud, a local controller and combinations and variations of these, as well as the other configurations discussed in this Specification.

Figure 12:
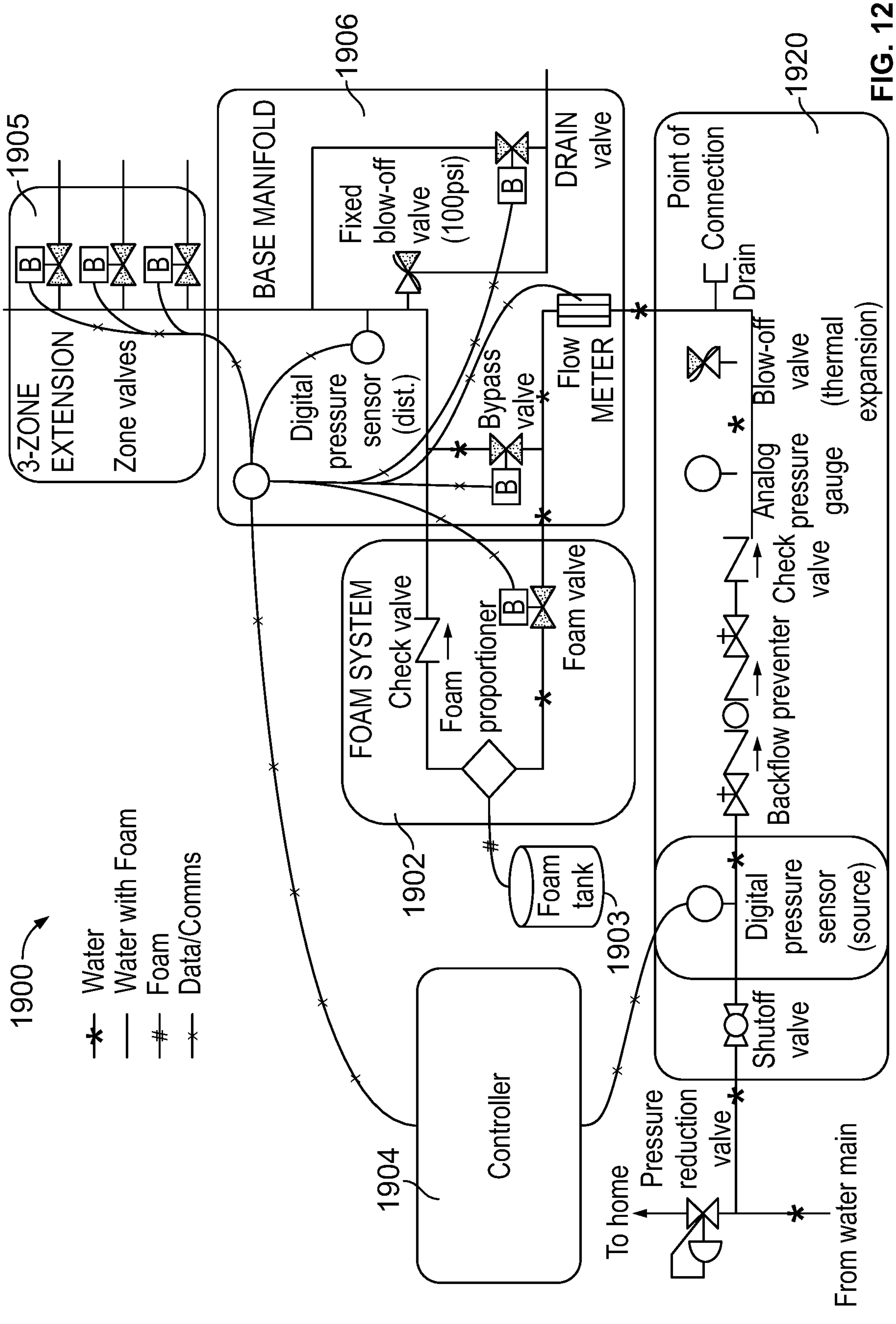
FIG. 12 is a schematic of an embodiment of an EFMS system in accordance with the present inventions.

Turning to FIG. 12 there is shown a schematic of a general embodiment of an EFMS 1900. The system 1900 has controller 1904 that is in control communication with various components of the system as shown by the Data/comms lines. The system 1900 has a foam system 1902, with a foam tank 1903. The system 1900 has a base manifold 1906 (e.g., a tie-in), that integrates the foam system with the incoming water. The system 1900 has an incoming water system 1920. The system has a first manifold 1906 that distributes the water, or water-foam mixture to the sprinkler heads. (The reference to "zones" in this figure refers to a group of particular sprinkler heads in the system, i.e., a zone of sprinkler heads, such as for example 5 sprinkler heads under the eve of the north side of the structure, and not the hydration zones as discussed with respect to a hydration plan.)

The manifolds are modular, so that a system can have one, two (as shown), three, four or more modules depending upon the number of sprinkler heads used in the system. This EMFS can perform all of the various functions of EMFS set forth in this Specification.

Embodiments of this EMFS has an operation control command plan for performing an operation plan. The operation plan, for example, can be one or more of a hydration plan, a lockout plan, a low line pressure plan, an auto-activation notice with default activation plan, and an adjacent structure based plan. Thus, for example, the EMFS is in control communication with the operation control command plan, which can be part of a control system, on the cloud, a local controller and combinations and variations of these, as well as the other configurations discussed in this Specification.

In general, one or more, and preferably all of the EFMS have a lockout, an interlock plan, and both plans, as well as, combinations and variations of these. The lockout preferably is a control command operation plan for performing an operation lockout plan. Thus, the EFMS that are part of, or on a network, receive information, e.g., data, about conditions around and near the structure that EFMS is associated with and protects. This information could come any number of sources, for example, external moisture or hydration sensors, optical sensor and devices, other EMFSs, emergency networks, user input, first responder input, and water pressure sensors. This information can be provided to the control system, and based upon the algorithms and programing of the control system the control system, the local controller and combinations and variations of these, can shut down a particular EFMS.

In a preferred embodiment of lockout systems and methods, the control system having the lockout program resides on a cloud-based network system, and receives information and data from the EFMS that it is in control communication with the network, as well as, other sources of information. The network based control system having the lockout program is configured, based at least in part upon the received data and information, to perform one or more of and preferably all of the following functions: (i) lockout one or more EFMSs, and thus prevent that system from operating or stopping on going operation; (ii) remove the lockout from one or more of the locked out EFMSs, and thus allow that system's normal activation protocols to control the operation of that system; (iii) activate a locked out system. It is noted that in addition to the command control lockout control program, the control system can and preferably does have one or more of the other features of the network and control systems described in this Specification.

In an embodiment both the local controller and the cloud-based control systems have the lockout control command operation plan, i.e., the lockout programs and capabilities.

Thus, the control system, the local controller or both can receive one or more of the following information or data and balance this information to make a determination to automatically shut down and EFMS, i.e., lock the system out.

For example, the control system, the local controller or both, can receive information or data about the hydration level of combustibles, or moisture in the area adjacent to a first structure that an EFMS is associated with and protecting. The control system, the local controller or both, can receive information or data about the line pressure of the water line going into the first structure. The control system, the local controller or both, can receive information about the line pressure of other structures further removed from the first structure, but closer to an active fire. The control system, the local controller or both, can receive information about wind direction and wind speed. The control system, the local controller or both, can receive information about other EFMSs systems that are operating and that are closer to an active fire. The control system, the local controller or both, can also receive any of the other sources of information or data set forth in this Specification. Based on one or more of these types of information or data, the control system, the local controller or both, determine if the EFMS for the first structure should be shut down and locked out.

Examples of factors that the control system, the local controller or both may consider (e.g., the computer code, program or algorithm in the control command operation plan for performing an operation plan, such as a lock out plan, an interlock plan, or others, evaluates these factors using a processor and memory). This consideration in a preferred embodiment is conducted a balancing of the factors, based upon the risk or benefits presented by the presence or absence of various factors. In this manner the control system balances these factors as part of a multivariable component systems and activities for the management, mitigation, and suppression of wildfires. For example, these factors would include:

Hydration levels.

Water line pressure.

Status of internal fire suppression systems.

Status of the EFMS in an adjacent structure, and status of the EFMS in further away or more distance structures.

Status of internal fire suppression systems in an adjacent structure, and status of the internal fire suppression system in further away or more distant structures.

Status of peripheral systems, such as HVAC, lighting, security systems.

Increased hydration (e.g., at or above the level wetting that won't burn) of the area immediately around the first structure supports a lock out of the system.

Water pressure of the incoming water line falling below a pressure that is required for the operation of first responder's fire fighting equipment, supports a lock out of the system. If the pressure falls below a critical level, this factor may mandate a lock out, regardless of the other factors.

Operation of adjacent EFMSs and EFMSs that are located between the first structure and an active fire supports a lock out of the system.

Low hydration levels (e.g., dry conditions) around the first structure weighs against a lock out of the system.

A low number of, or the absence of any, EMFSs adjacent to or between the first structure and active fire weighs against a lock out of the system.

The proximity of the first structure to an evacuation route, e.g., the first structure is adjacent to, or on, an evacuation route, weighs against a lock out of the system.

The direction of the wind, moving the fire toward the first structure, weighs against a lock out of the system.

The activation of the EFMS in one or more adjacent or nearby structures.

The activation of an internal fire suppression system in one or more adjacent or nearby structures.

The detection of embers, by the EFMS, or by an EFMS in an adjacent structure, and by an EFMS in further away or more distance structures.

The activation of EFMS, an interior sprinkler system, or both, in structures directly adjacent to the first structure supports a lockout of the first structure's system, as the first structure will receive a cooling effect from the operation of the adjacent EFMSs.

The activation of interior fire sprinkler systems of the first structure supports a lockout of the system, this will assure that the internal system has sufficient water to operate properly.

The duration of time after that an adjacent structure EFMS, interior fire suppression system or both remains operation, could weigh in favor of lifting a lockout.

The detection of off gassing (which is a precursor to ignition) from materials in an area around the structure, by the EFMS at an adjacent structure, or by the EFMS at structure further away from the first structure.

The balancing of these and other factors can be based upon several factors, such as public policy, emergency management plans, rules or ordnances (state, local or federal), establish industry guidelines, and the capacity and nature of local infrastructure, e.g., the capabilities of the public water system.

The lock out of a system preferably is only for a limited time, and the lockout will be automatically lifted by the control system, the local controller or both, as conditions change, or the balance of the factors change. Further, the control system for the network of EFMSs can be configures so that the balancing of these factors takes place across an entire area, e.g, 10 Structures with EFMSs, 100 Structures with EFMSs, 500 Structures with EFMSs, 1,000 Structures with EFMSs, 2,000 Structures with EFMSs, and 10,000 structures with EFMSs. The network control system can thus, turn on and turn off individual EFMS based, at least in part upon, the received information and data and the predetermined balancing of these different factors.

Once the determination to lock out a particular EFMS is made by the control system, the control system automatically sends a control command to that EFMS, causing the local controller to lock out that system.

Preferably, the control system that makes these determinations, is based in the cloud. This control system can then send and receive control communication and information or data from the local controllers associated with each EFMS, as well as, external sensors, and other inputs, e.g., first responder, users, emergency management authorities.

The lock out could also be limited to switching the EFMS to an alternative water source, such a tank, or swimming pool.

In embodiments the individual user, e.g., the owner or residence of a structure, receives notices that the EFMS may be locked out, the likely time to such lock out, and that the EFMS is locked out. The user will also receive notice that the lockout has been lifted. (Note, preferably the control system having the lock out program, has or is associated with a control system having one or more of features of the systems in this Specification.) Under certain conditions, and based upon policy, rules and regulations, the user may have the capability to override a lock out command from the control system. In other conditions, this user override capability may not be available, e.g., water line pressure drops below a critical level determined for example by emergency management services or a local or state agency.

It is understood that the embodiments of the Figures, as well as the various examples, and their components, can be used in whole or in part, with each other and with systems having an operation control command plan for performing an operation plan. The operation plan, for example, can be one or more of a hydration plan, a lockout plan, a low line pressure plan, an auto-activation notice with default activation plan, and an adjacent structure based plan. Further, these systems and components can be in communication with, and control communication with, one or more internal fire suppression systems.

EXAMPLES

The following Examples are provided to illustrate various embodiments of systems, devices, methods, and uses of the present inventions. These Examples are for illustrative purposes, may be prophetic, and should not be view as, and do not otherwise limit the scope of the present inventions.

Example 1

As part of the control commands for one or more EFMSs, the commands include an auto-activation notice with default activation plan ("auto-activation plan"). In general, this control command plan is configured to operate generally with three steps. 1) Upon an event (e.g., the detection of an initial threat from a wild fire, a determination of a risk factor, a change in a risk factor, etc.) the control system sends an automatic activation notice to one or more GUIs, the automatic activation notice includes a notice providing a time to activation. 2) The time to activation is counted down by the control system. 3) If the control system has not received an instruction to not activate the system by the end of the time to activation, e.g., the end of the countdown, the system will activate. The operation control command plan for the EMFS, can also include one or more of a hydration plan, a lockout plan, a low line pressure plan, and an adjacent structure based plan. In this manner one or more of these plans can be implement upon automatic activation.

Example 2

An EFMS that is associated with a structure, e.g., a house, dwelling or business, and is in control communication with one or more GUI devices. The EFMS is part of an emergency management control network and system. The GUI device, that can be for example a cell phone, tablet, automobile displace monitor, or computer monitor. The GUI device is preferably external to the EFMS, e.g., it is not fixed to the wall of the structure, it is not physically attached to the components of the EFMS. More preferably the external GUI device is a remote device, located, or capable of being located any distance from the structure. (e.g., 100 ft, 1,000 yards, 1 mile, 2, miles, 500 miles, etc.) It being noted that the GUI device, preferably a second or additional device to the remote device, can be located on the structure.

The control system, which is in control communication with the EFMS has an auto-activation plan.

Upon a predetermined event (e.g., the detection of an initial threat from a wild fire, a low hydration level, a determination of a risk factor, a change in a risk factor, etc.) the control systems send to a GUI a notification signal (e.g., information, command) from the EMFS directly (e.g., radio, satellite, landline, cell phone), via the network, or both. The GUI receives the signal and the received information causes the GUI to display a first event notice, which can be, for example, a popup notice on a cell phone or tablet. The GUI is configured so that the first popup notice links to, and thus, displays when accessed, for example by touching or swiping the notice, a first detailed event screen. This first detailed event screen provides information about the event, and relevant fire conditions, and is configured to request and receive input from the user. The first popup notice, the first detailed event screen, and preferably both, in the notice provide information, among other things, that the EMFS will activate within a predetermined period of time (e.g., 5 min, 10 min, 15 min) if no action is taken by the user. Thus, upon sending of the first event popup notice the EMFS is configured to activate at a predetermined time, and will activate at that time, unless it receives a command to the contrary.

Thus, the EFMS upon, or simultaneously with, sending the notification signal, e.g., the signal causing the first popup notice, is in, or has been automatically set to, a default condition that the EFMS will activate and has set a time to activation, i.e., the countdown. The sources of information or data that constitute the event that the EFMS receives to cause the sending of the notification signal, determining and setting the time to activation, and setting the default activation condition can come from one or more sources. For example, the information or data can come from the network, from direct monitoring by sensors that are a part of the EFMS, historic data, derived data, predictive data and combinations and variations of these as well as other sources. The control system, using an control command auto-activation notice with default activation plan determined the time to activation based upon this information and data. Various factors based upon this information, are then used by the control system, which can be resident on the EFMS, remote, in the cloud, and combinations and variations of these, to automatically determine, set and start the time period countdown. Moreover, as events change, and new data and information are received by the control system the time period can be changed, a second notification signal, with a new count down time (either longer or shorter) can be sent to the GUI. One, two, three or more notification signals can be sent depending upon the nature of the changes to events. Each new, or update, popup from these notifications will preferably have a new, or updated, detailed event screen.

If the user does not advance to the first detailed event screen, e.g., the user does not take any action in response to the pop screen, the EFMS will automatically activate at the end of the count down. If the user advances to the first detailed event screen, but takes no action, i.e., does not input any command, the EFMS will also automatically activate.

Preferably, the first detailed event screen provides for the input of an activate now command (which will turn the EFMS on when received, and before the predetermined activation time), and a turn off activation. The detailed event screen can have other relevant or pertinent information as well.

Example 3

Figure 13:
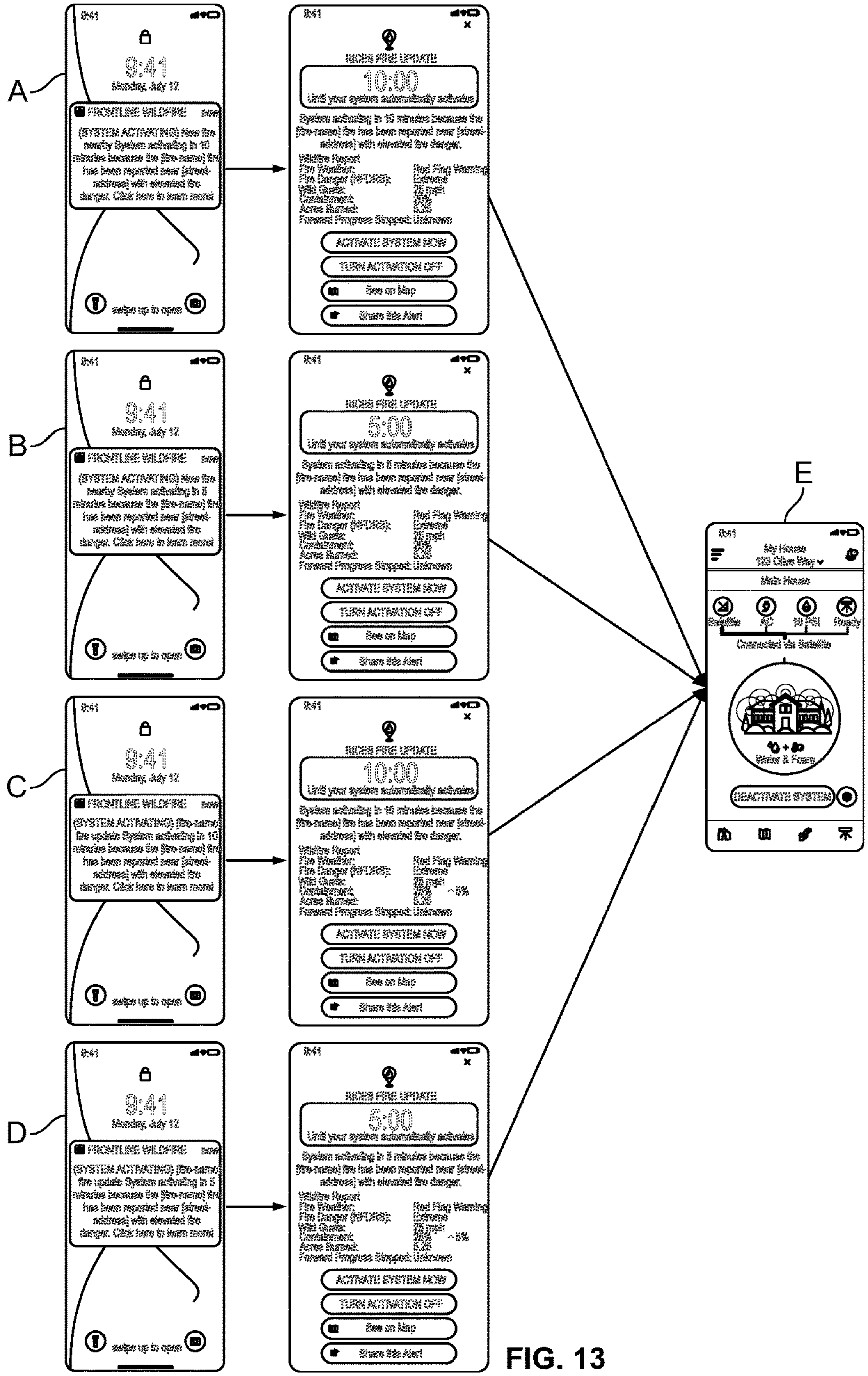
FIG. 13 is a schematic flow chart of an embodiment of notices displayed on a GUI as a result of an embodiment of an auto-activation notice with default activation plan in accordance with the present inventions.
Figure 13A:
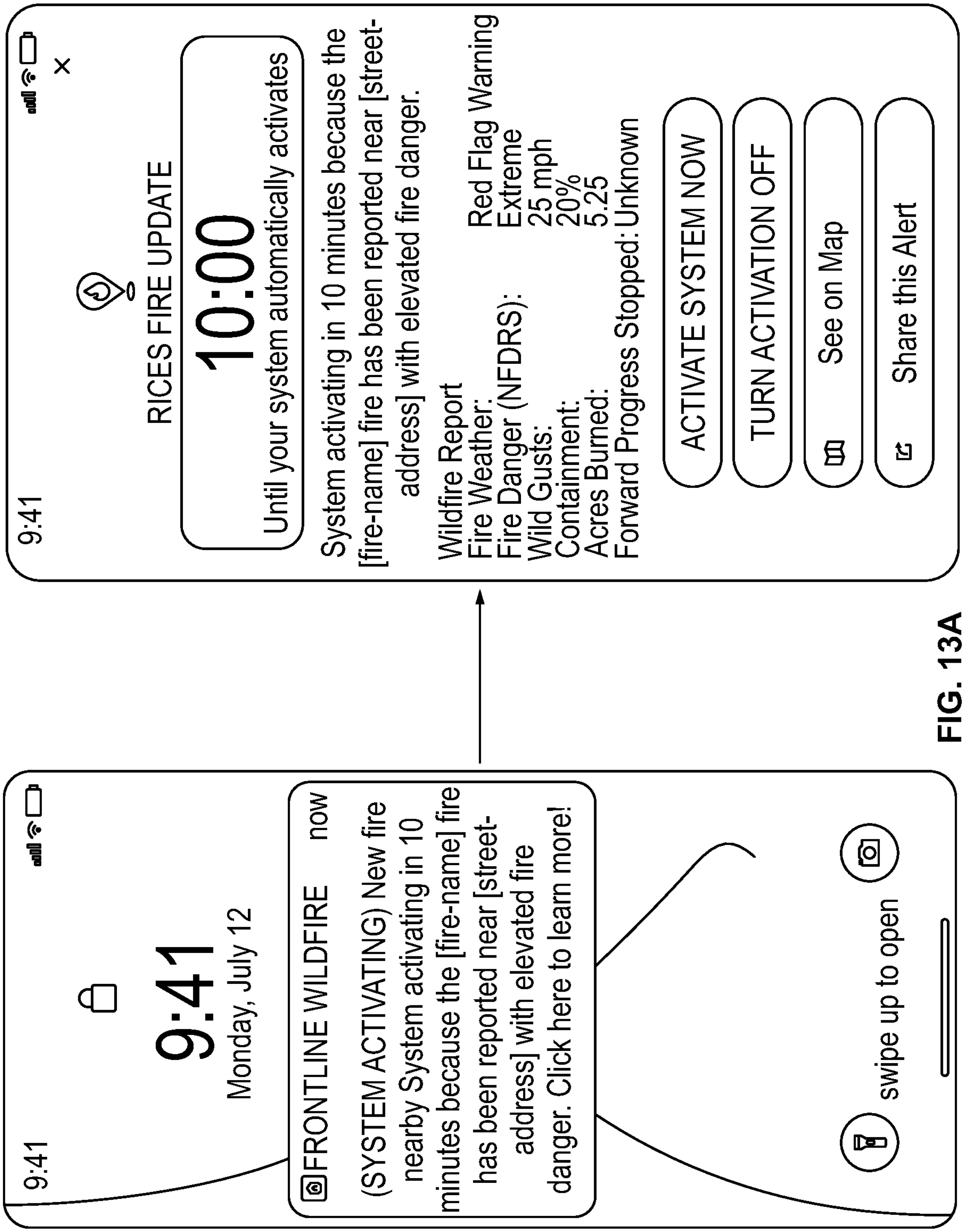
FIGS. 13A to 13E are detailed, enlarged, screen shots of the popup notices, detailed event notices and home screen of FIG. 13.
Figure 13B:
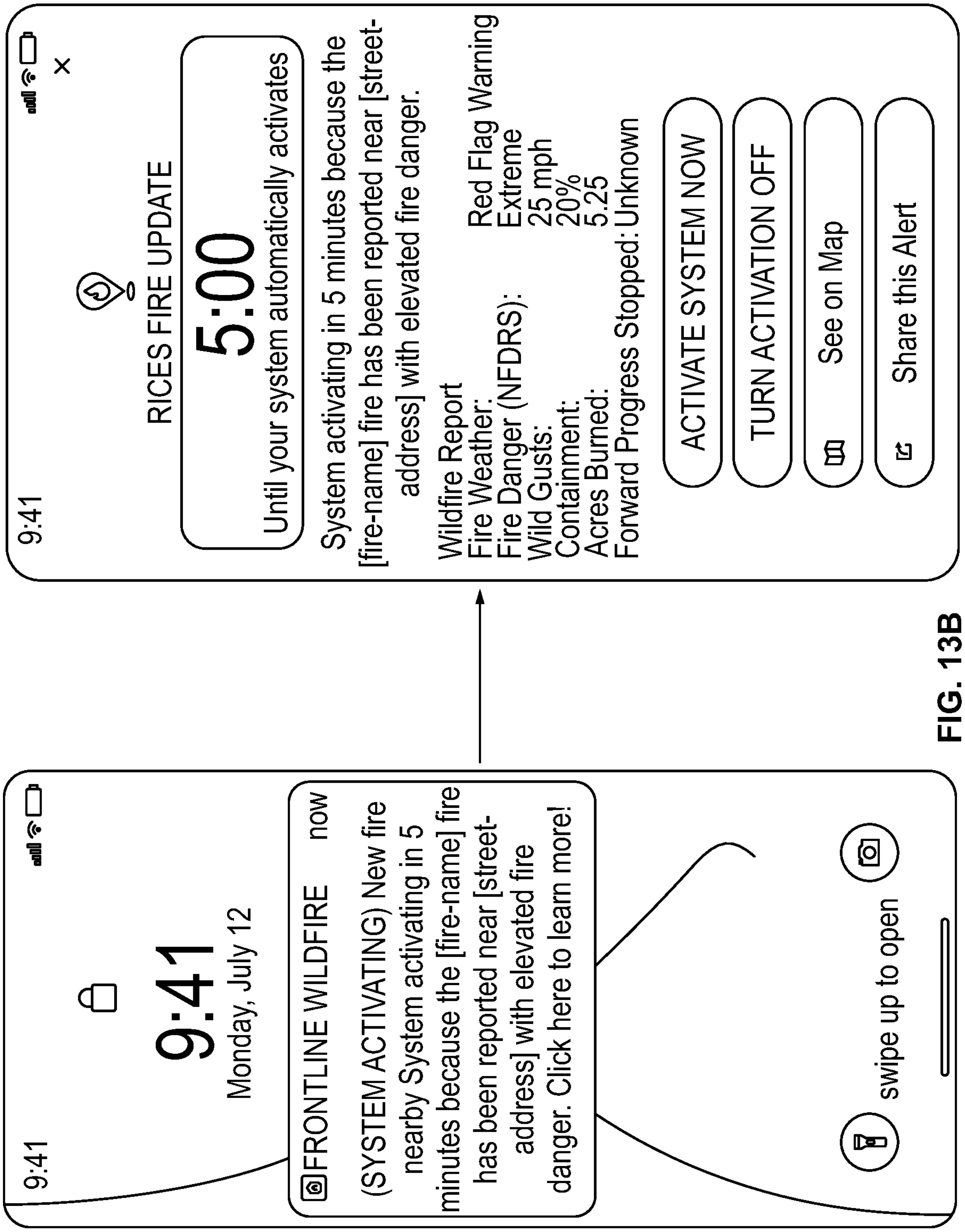
Figure 13C:
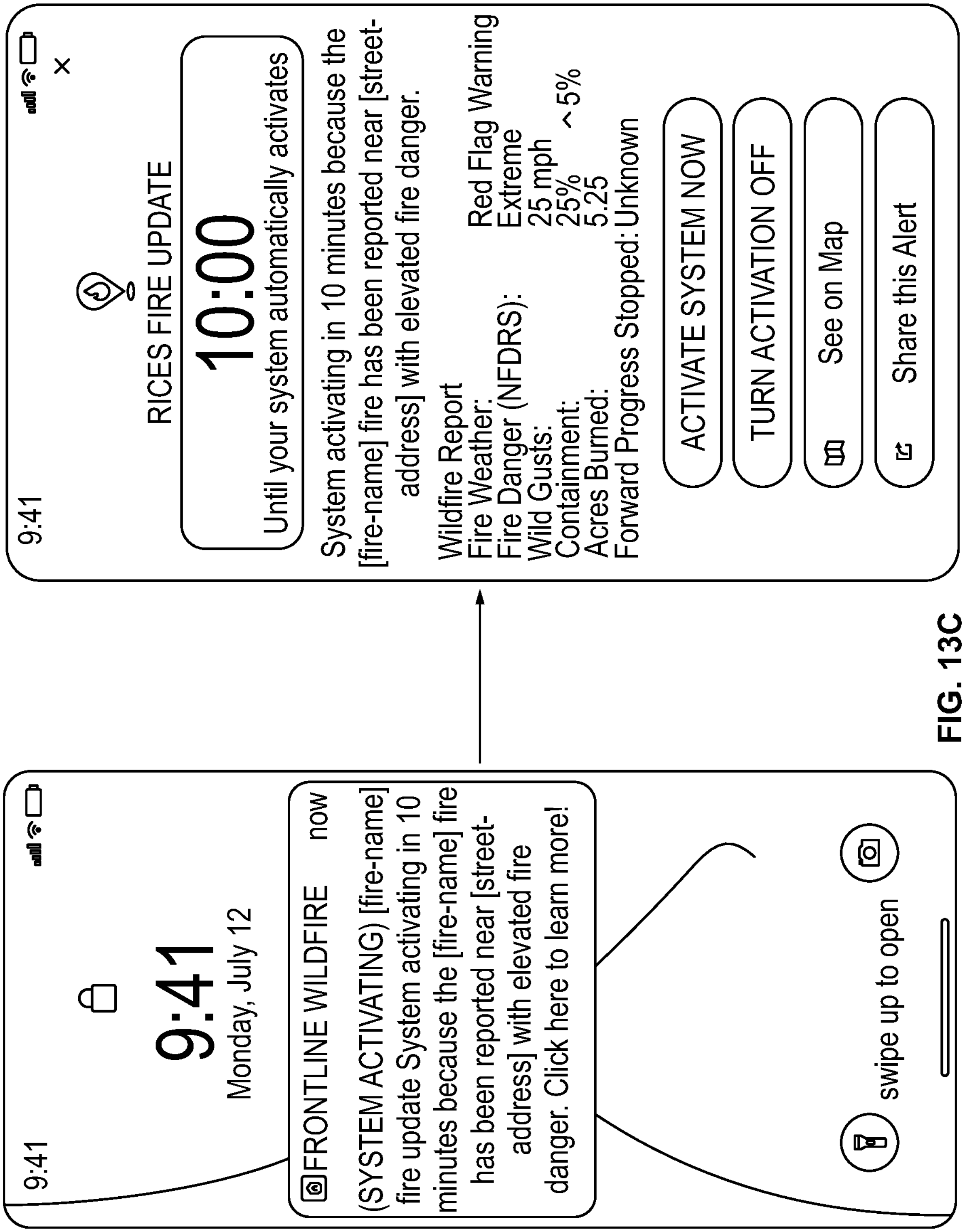
Figure 13D:
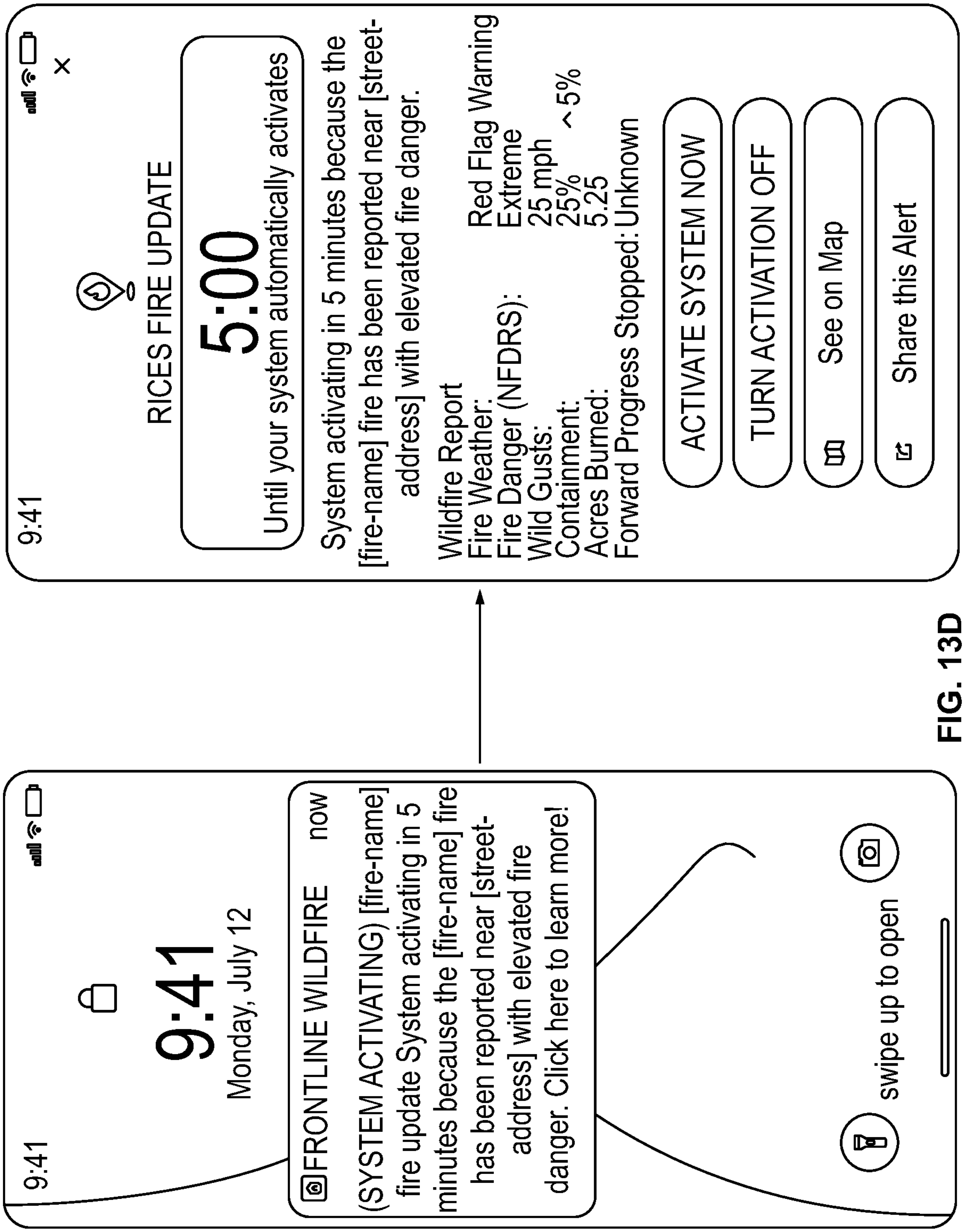
Figure 13E:
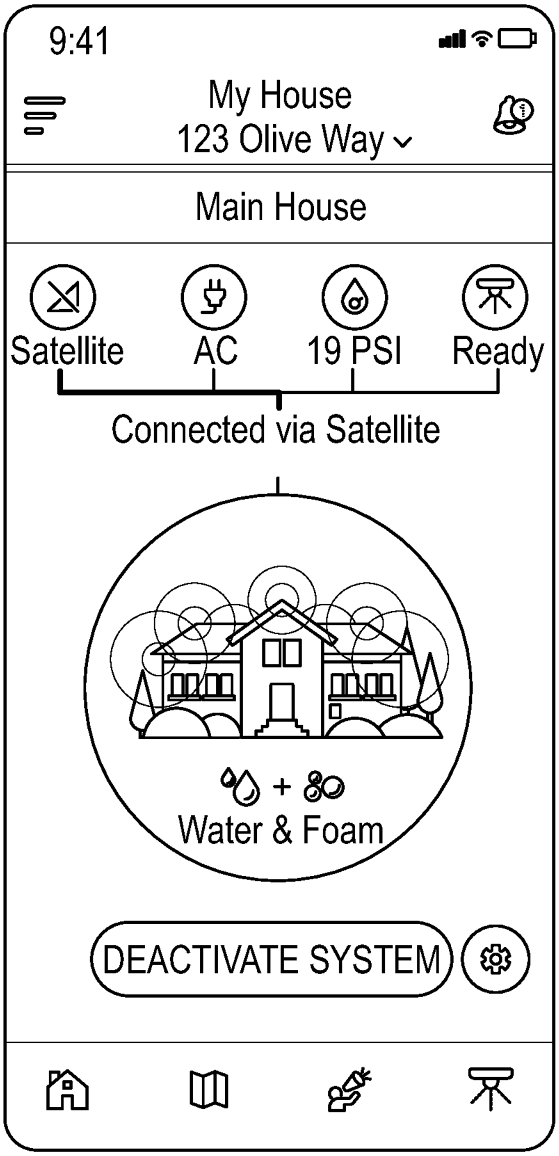

Turning to FIG. 13 there is shown a schematic flow chart off embodiments A, B, C, D of different popup screens and their corresponding detailed event screens, and a home screen showing activation of the EFMS. FIGS. 13A to 13D show the details of the popup screen and detailed event screens A, B, C and D respectively. FIG. 13E shows the details of home screen E.

Figure 13F:
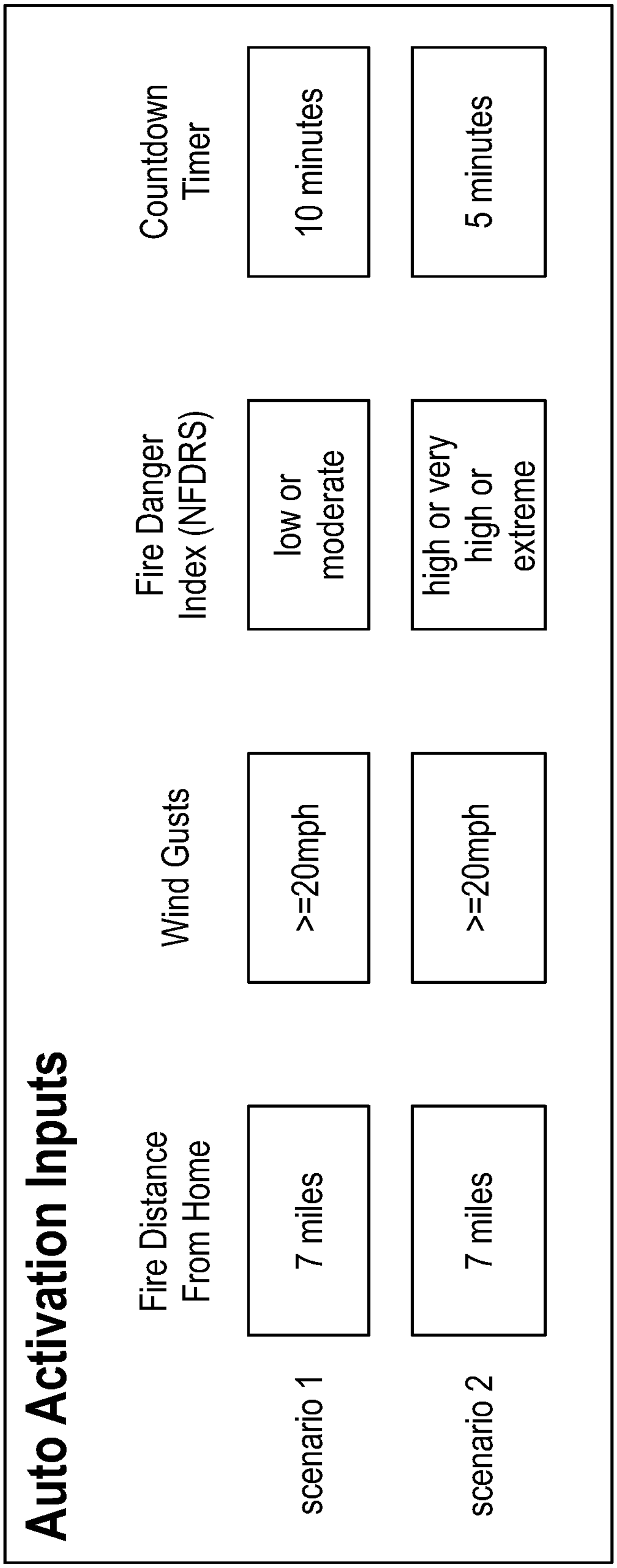
FIG. 13F is a schematic flow chart of an embodiment of an auto-activation notice with default activation plan in accordance with the present inventions.

FIG. 13F shows a table that shows an example of the information and data that can be used to determine the countdown period. This information can also be present, in whole or in part, as a part of a detailed event screen.

The control system of can send and display multiple notices, as the predetermined time to activation approaches. Thus, a second popup notice can be sent, with a link to a second detailed event screen. An example of this is shown in FIG. 1B, which would be a notice that is sent at 5 minutes before activation.

Upon activation of the system, whether by automatic activation, or by the activate now command, the GUI will display a screen providing information that the EFMS is activated and operating. An example of this screen is shown in FIG. 1E. This screen, preferably, is configured to receive a user input to deactivate the system. The deactivation command can preferably have a second confirmation notice,—"confirm deactivation during even"—or the like, to prevent accidental or unintentional deactivation. Absent a deactivation command, the EFMS once automatically activated will operate for a predetermined time, and predetermined operation plan.

Example 4

As part of the control commands for one or more EFMSs, the commands include an auto-activation plan, which is configured so that upon receipt of the auto activation notice the GUI is configured to alarm, alert and directly display the detailed event screen.

Example 5

One, two, tens, hundreds of EFMS are configured on a network and are each in control communication with one or more GUIs. Each of the systems are configured to implement an automatic activation plan, such as the plans of Examples, 1, 2 and 3, and combinations and variations of these.

The detailed event notices can also display the number and location of nearby EFMS that have been, or are scheduled to be, activated.

Example 6

The automatic activation notices, and any user response to those notices, are communicated to emergency management, where they can be monitored, for example on a large GUI showing a specific area, or location, and the EFMS system present in that area, and their status.

Example 7

In an embodiment the EFMS, the control system and combinations of these includes an interlock. In general, the interlock can be configured to turn on or off, or control, one or more other systems, such as peripheral systems to the EFMS (e.g., utilities, natural gas, lawn sprinklers, security systems, lighting, HVAC, etc.) that are associated with the structure upon a determined condition or event, a predetermined condition or event, at a determined time, or predetermined time, or combinations and variations of these. The interlock can be part of the control commands, it can be mechanical and combinations and variations of these. The interlock commands can reside on a local controller, the control system and combinations and variations of these.

Example 8

In an embodiment of an EFMS having an interlock, the control system is configured so that when an automatic activation notice is sent to a GUI, the system also provides a notice regarding the interlock. Thus, in conjunction with, or as a part of the automatic activation notice, the system sends an interlock notice, advising that one or more other systems associated with the structure will be subject to an interlock operation, such as being shut down, turned off, turned on, or otherwise controlled in a specific manner. The timing (e.g., count down timer) for this interlock operation (e.g., shut down, etc.) can be the same as timer for the automatic activation of the EFMS, or it can be shorter (i.e., interlock operation occurs before automatic activation) or longer (interlock operation occurs at a predetermined time after automatic activation).

The interlock notice, preferably is initially displayed on the GUI as a popup notice with an associated detailed event screen. The lockout popup notice can be a part of the autoactivation notice, or a separate popup. Additionally, the interlock countdown can change with the auto-activation countdown, or can change independently of the auto-activation countdown.

One or more system of the other systems can have separate interlock countdowns. Thus, the interlock countdown for the shutdown of the lawn sprinklers can be different from the interlock countdown for the shutdown of the natural gas.

The user has the ability to manually override the interlock, e.g., the automatic shutdown of the other systems, from the GUI device. However, and preferably, if there is no user input, the shutdown of the other systems will occur at the end of the interlock countdown, as determined by the system.

Example 9

In an embodiment the interlock is configured to turn off the irrigation system (e.g., lawn sprinklers) for the land surrounding the property. In this manner, the full amount of available water provided to the structure from its water source (e.g., a well, municipal water supply, etc.) will be available for and provided to the EFMS upon automatic activation of the system.

Example 10

In an embodiment the interlock is configured to turn off the supply of natural gas to the structure.

Example 11

Figure 14:
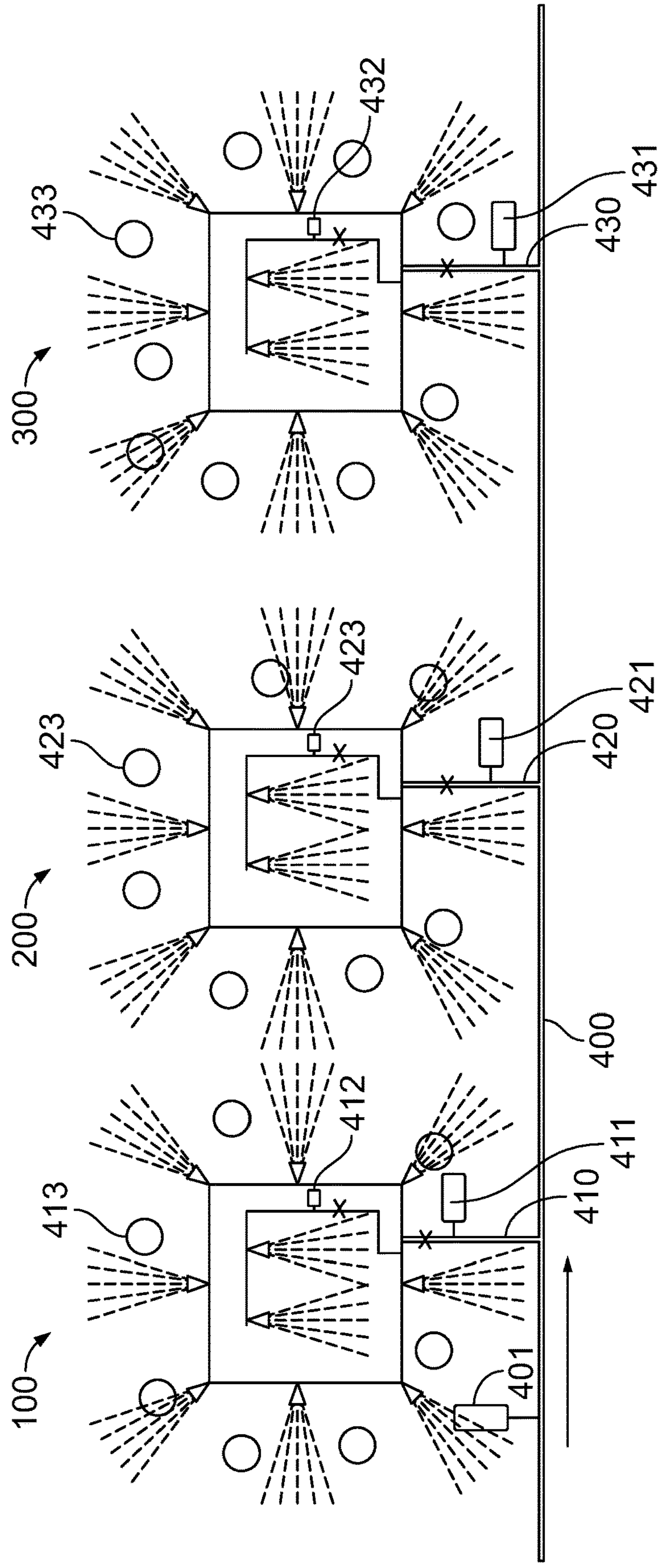
FIG. 14 is a schematic EFMSs and a network having a control command operation plan in accordance with the present inventions.

A network and one or more EFMS on the network have a control command operation plan for performing an operation lockout plan. Turning to FIG. 14 there are shown three structures 100, 200, 300 each having an EFMS, and an internal sprinkler system. The structures receive their water from a public water line 400 flowing in the direct of the arrow. Each structure has its own water line 410, 420, 430 extending from line 400 and thus providing a source of water to the structure, and in particular, the EFMS and the internal sprinkler systems. Water lines 410, 420 and 430 each have a sensor 411, 421, 431, which can be a pressure sensor, a flow meter, or both, and water line 400 has a sensor 401, which can be a pressure sensor, flow meter or both. The internal sprinkler systems have sensors 412, 422, 432, which can be pressure sensors, flow sensors, or other means to determine that the system is operating. The EFMS have external sensors, e.g., 413, 423, 433, that determine or sense the moisture/hydration level of the combustible materials adjacent to and near by the structure.

In operation, information from one or more than one, and preferably all of the sensors 401, 411, 421, 431, 412, 422, 432, 413, 423, 433 are transmitted over a network to the cloud-based control system, having the control program that determines if the lock out of a system is needed. (As noted above, the control system can reside on the cloud, the control system can be local, the control system can be distributed between local and cloud systems and combinations and variation of these) Thus, for example the control system could lock out the EFMS for structure 200, if the EFMS system for structure 100, structure 300 or both were operating. Similarly, the controller could lock out the EFMS for any of the structures if the internal system was operating, and in particular if the internal system was operating and the line pressure for the incoming water was low, e.g., below a predetermined pressure to require shut down to the EFMS, when the internal system is operating.

Example 12

In an embodiment, the control command operation plan for performing an operation lockout plan, e.g., the lockout program, resides entirely on the local controller for the EFMS.

Example 13

In an embodiment one or more of an EFMS, the network, or both have a control command operation plan for performing a low line pressure plan, e.g., the lockout is based at least in part upon water line pressure. In an embodiment of the low line pressure plan the network and one or more EFMS on the network have a control command operation plan for performing an operation lockout plan that is based primarily upon water pressure in one or more the water lines feeding a structure, or zone or area of structures. By primarily, it is meant that this factor is most significant, or most heavily weighted in the algorithm. In an embodiment of the low line pressure plan the water pressure in the water line is the only factor relied upon by command operation plan for performing an operation lockout plan.

Example 14

In an embodiment, the control command operation plan for performing an operation lockout plan, e.g., the lockout program, resides entirely on the local controller for the EFMS.

Example 15

Figure 15:
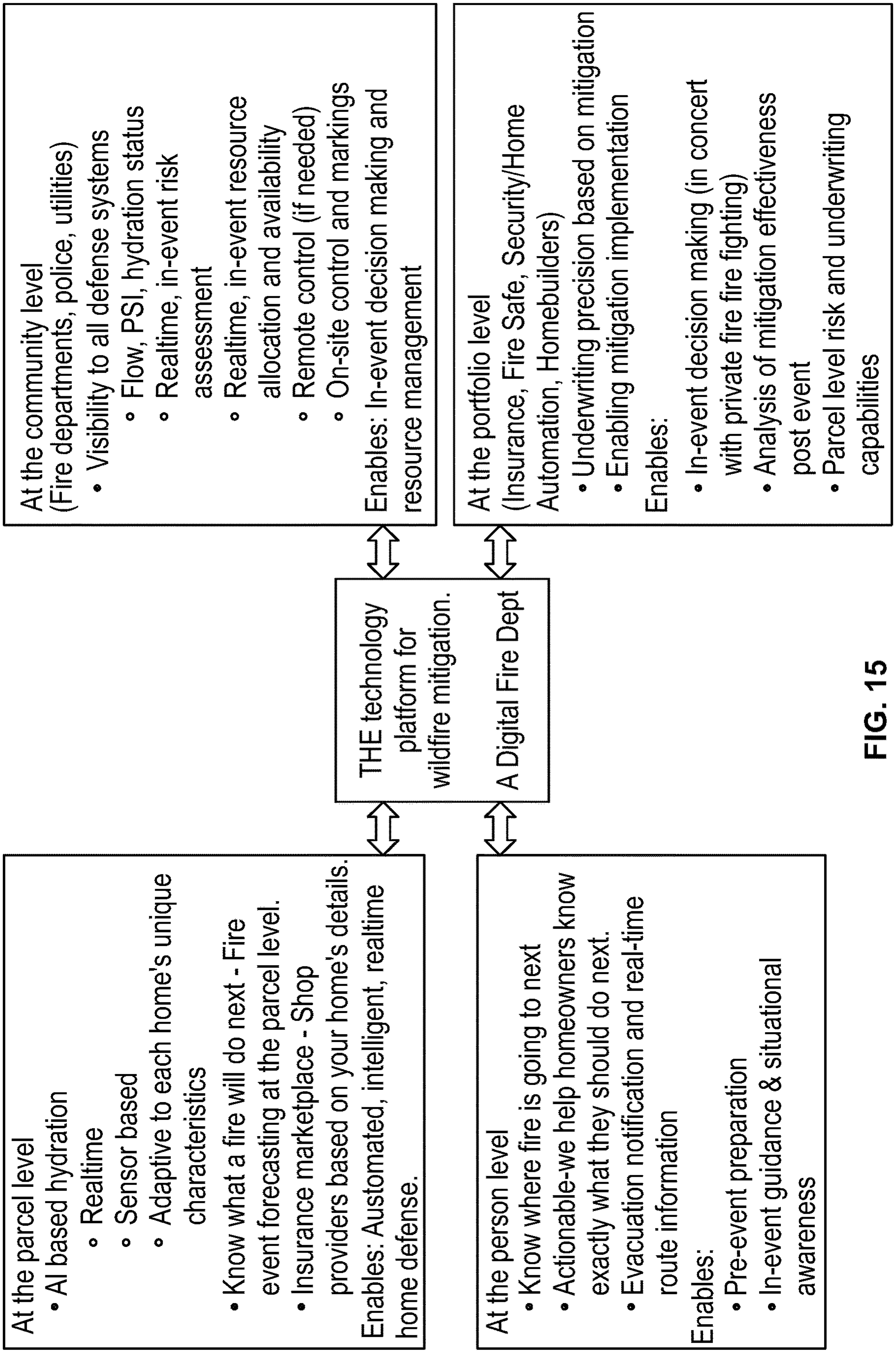
FIG. 15 is a schematic flow chart of EFMSs and a network having a control command operation plan in accordance with the present inventions.

Turning to FIG. 15 there is shown a flow chart showing the operation and benefits of an embodiment of a control command operation plan for a network and EFMSs.

Example 16

Figure 16:
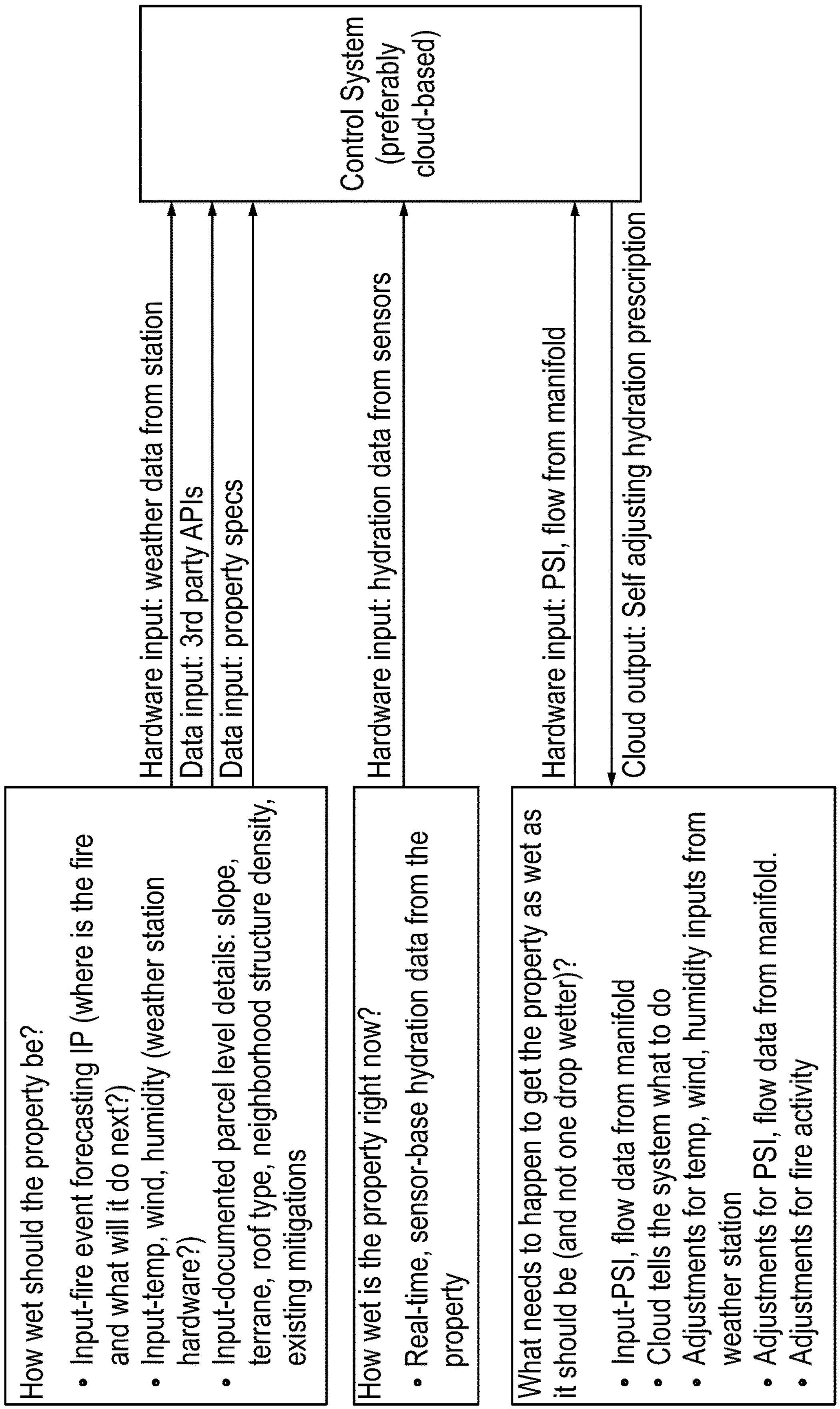
FIG. 16 is a schematic flow chart of EFMSs and a network having a control command operation plan in accordance with the present inventions.

Turning to FIG. 16 there is shown a flow chart showing the operation and benefits of an embodiment of a control command operation plan for performing a hydration plan.

Example 17

Figure 17:
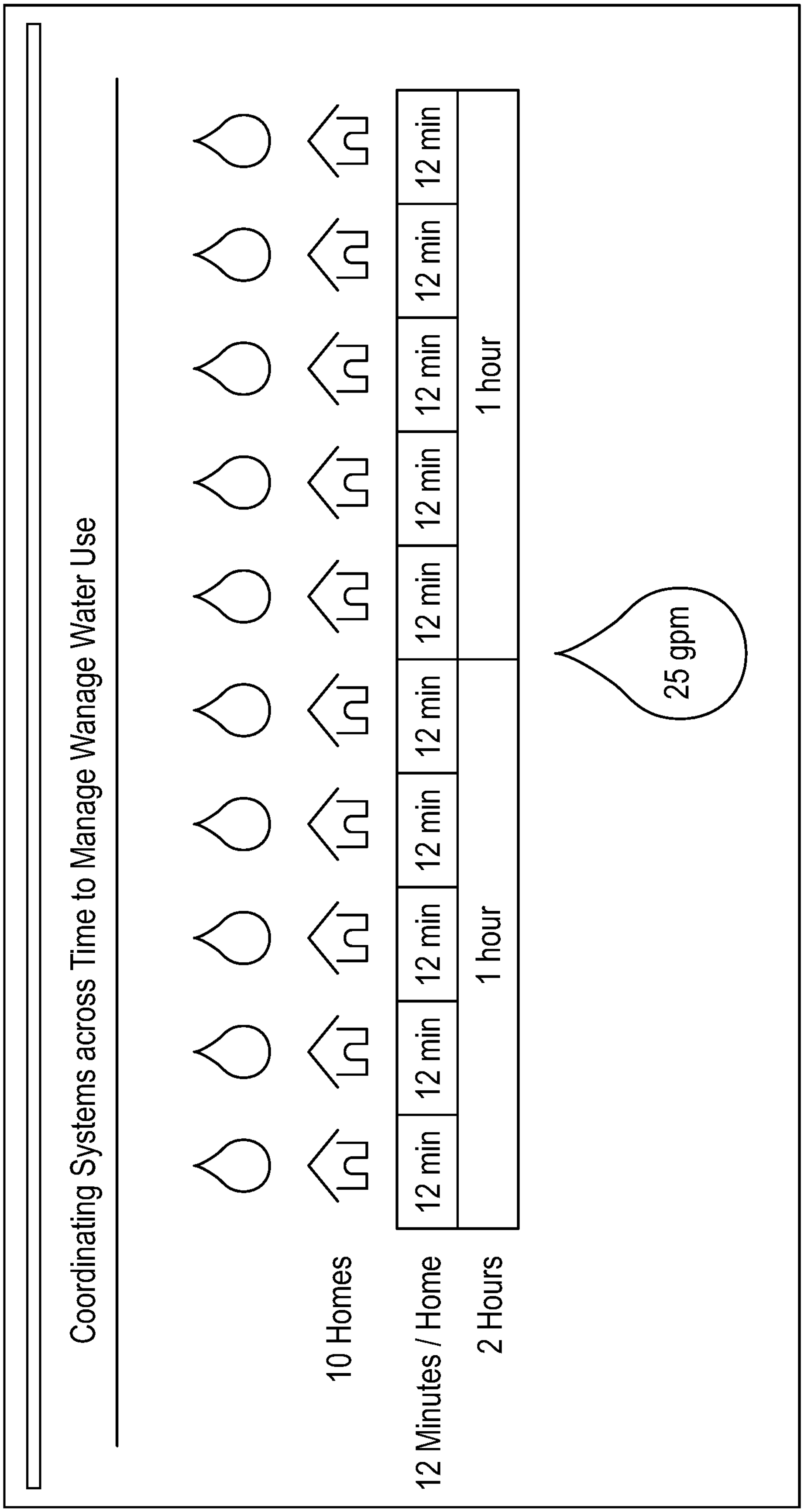
FIG. 17 is a schematic flow chart of EFMSs and a network having a control command operation plan in accordance with the present inventions.

Turning to FIG. 17 there is shown a flow chart showing the operation a control command operation plan for optimizing the use of water in a zone of 10 home.

Example 18

In embodiments the control system has several control command operation plans and methods that can be used to activate the EFMS and control and regulate the operation of EFMS in several operation plans. These embodiments include one or more of the following, as well as, combinations and variations of these.

- Moisture sensors are located in the area adjacent to the structure. The moisture sensors send data to the control system that can be used to cause the activation of the EMFS. That data can also be used to send notifications to users, providing moisture levels, recommendations to activate, recommendation to change the EFMS's hydration plan, the fire mitigation plan (exterior sprinkler operation when fire is imminent) or both.
- In an embodiment, the data and the information from the moisture sensors are evaluated by the control system in combination with line pressure of water lines feeding the structures. In this manner, the control system can adjust the hydration plan based upon moisture levels and line pressure, can lock out a system or area if moisture levels are high and line pressure is low, or can evaluate moisture levels in a predetermined area and line pressure in that predetermined area, and optimize EFMS to maximize line pressure (e.g., maintain line pressure at highest levels possible while obtaining effective mitigation of wildfire for the predetermined area)
- In an embodiment, the data and the information from the motion sensors are evaluated by the control system in combination with line pressure of water lines feeding the structures. This monitoring can be on a structure-by-structure basis and for a predetermined area. The information about moisture levels and line pressure is provided to Fire Departments or other emergency management offices, and based upon the information, (including recommendations from the control system) specific EFMS can be locked out.
- In an embodiment the operation of interior sprinkler systems (e.g., NPA13 D systems) is configured to be operated in conjunction with an EFMS. Thus, for example, the activation of the interior sprinkler system can cause the exterior system to lock out. This lock out operation can be based upon line pressure in the interior system, indicating operation of the interior system, and sending a lock out signal to the EFMS. In a preferred embodiment, upon activation of the interior system the control system monitors the line pressure in the interior system, as well as, the line pressure feeding the structure, and in embodiments, also the line pressure feeding a predetermined area where the structure is located. The control system can then make the determinations, based upon one or more of the line pressure in the interior sprinkler, the line pressure feeding the structure, the line pressure in the area, as well as, moisture levels, to lock out the EFMS. In addition to only a lock out option, the control system can modify the hydration plan, the fire mitigation plan (exterior sprinkler operation when fire is imminent) or both for the EFMS.
- In an embodiment the control system can monitor and determine the advantage of the cooling effect to adjacent structures when the interior system is activated in a structure. This can also be an effect from the EFMS being activated in the adjacent structure. The control system can use this cooling effect to adjust, lock out, and regulate the EFMS in the adjacent structures.
- In an embodiment there can be a flow sensor on the internal sprinkler system that determines when the system is operating. This information and data about the activation and operation of the interior systems can be sent wirelessly, (e.g., cellular, satellite) or via wired internet connection to a control system that then can make calculations, determination and provide notice and instructions based upon this information. Thus, for example, the control system can provide instruction to the EFMS, notice to the structure owner, Emergency Management or both.
- In an embodiment the sensor that determines activation of the interior system operates with the EFMS along the lines of a dead man switch. Thus, the sensor sends a signal that permits the EFMS to operate when the interior system is not operating, upon operation of the interior system this signal stops, and thus locks out the EFMS.

Example 19

In an embodiment there is a method of installing an EMFS control module that would use an existing outdoor irrigation systems (e.g., lawn sprinklers) as the sprinkler heads, and to deliver the fire suppression material (e.g., water) upon activation of the EMFS, for either hydration plans or fire suppression. In this embodiment additional sprinkler head and piping, such as roof top and eve sprinkler heads, can be added. In this embodiment the cost of installation of the EFMS is greatly reduced. The EMFS controller is mounted in the structure (e.g., adjacent to the lawn sprinkler controller). There is a bypass and cut off that permits the EMFS to override the law sprinkler controller and operate the system. The EFMS has one or more of the control communication features of the EFMS set forth in this Specification, including such as a hydration plan, a lockout plan, a low line pressure plan, an adjacent structure based plan, and an auto-activation notice with default activation plan.

Example 20

In an embodiment of these systems that use the existing irrigation systems for piping and sprinkler heads of the EFMS, there can be a foam general system that is also used. The foam generation systems can be in fluid communication (e.g., pipes) with the sprinkler systems and having valves (e.g., cut offs, automatic valves) that permit the foam system to generate foam and flow the foam through the lawn sprinkler heads. Thus, for example only the controller for EFMS can be used and configured to by-pass or turn off the power the landscape irrigation system (e.g., law sprinklers) controller and then operate the landscape irrigation system as an EFMS. In an embodiment both the EMFS controller and manifold are integrated into the landscape irrigation system. The manifold connects below landscape irrigation valves and the EFMS controller turns off power to landscape irrigation controller so that the landscape irrigation valves do not open.

Example 21

Figure 18:
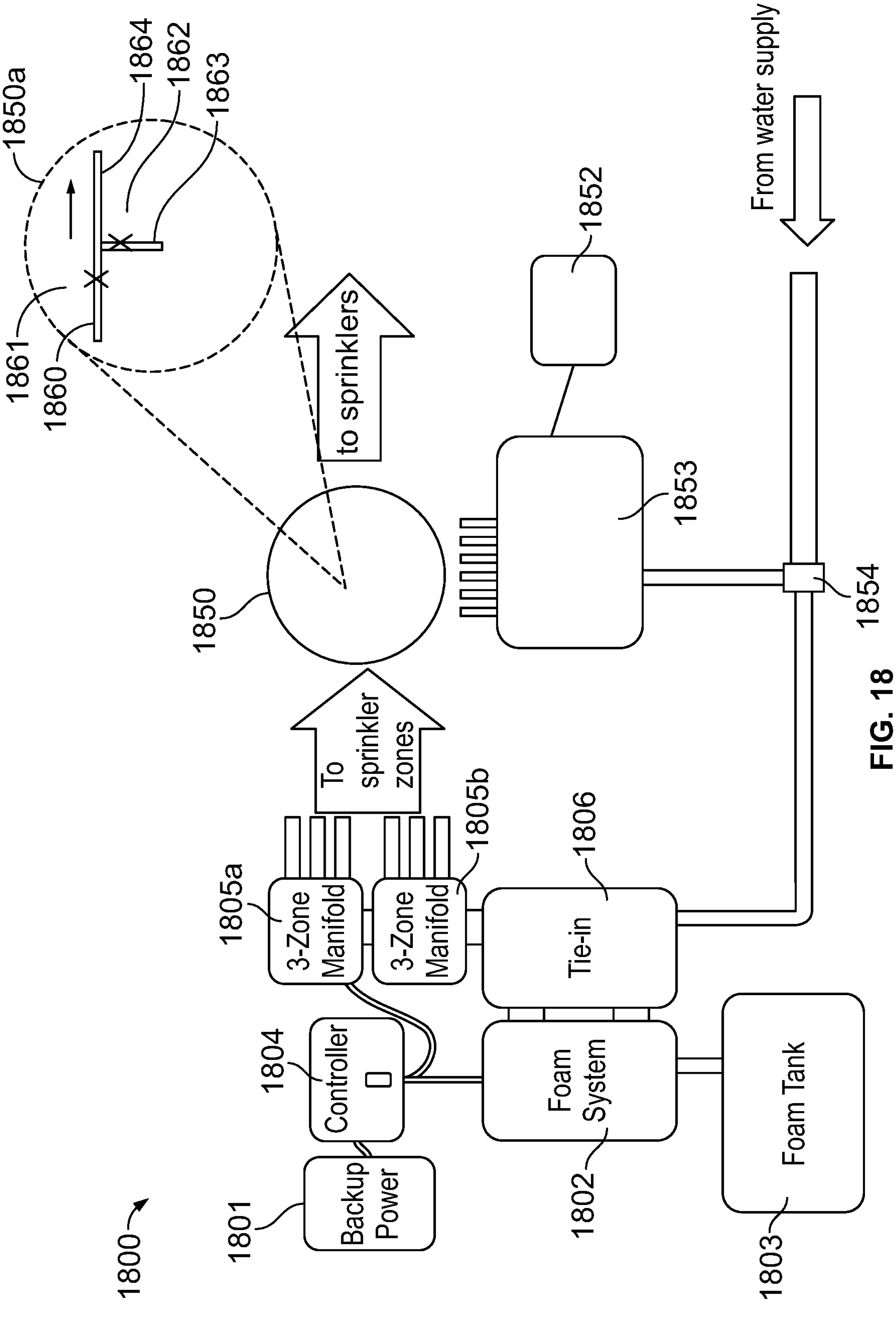
FIG. 18 is a schematic of an EFMS that is integrated with an existing landscape irrigation system in accordance with the present inventions.

Turning to FIG. 18 there shown a schematic of an EFMS 1800 that utilizes the existing landscape irrigation system. The EFMS 1800 has a power back up 1801, a controller 1804, a foam system 1802 and a foam tank 1803. Water from a water source, e.g., city water, public utility water is connected via a pipe to a tie-in unit 1806, that is in fluid communication with the foam system 1802. Water or a water-foam mix is flowed through a pipe from the tie-in unit 1806 to a first manifold **1805*b* and a second manifold 1805*a***. The manifolds distribute the water, or water-foam mixture through pipes to sprinkler heads. (The reference to "zones" in this figure refers to a group of particular sprinkler heads in the system, i.e., a zone of sprinkler heads, such as for example 5 sprinkler heads under the eve of the north side of the structure, and not the hydration zones as discussed with respect to a hydration plan.) The manifolds are modular, so that a system can have one, two (as shown), three, four or more modules depending upon the number of sprinkler heads used in the system. This EMFS can perform all of the various functions of EMFS set forth in this Specification.

This EMFS has, is in control communication with a control system that has an operation control command plan for performing operation plans, such as one or more of a hydration plan, a lockout plan, a low line pressure plan, an adjacent structure based plan, an auto-activation notice with default activation plan. The control system can be in the controller 1804, in a controller on the cloud, or combinations of these. The control system operates the one or more operation control command plans.

The operation control command plans, and thus the plan which they provide, can be updated, for example, via the cloud, via the network, locally and combinations and variations of these.

The EMFS system 1800 utilizes the existing piping and sprinklers for a landscape irrigation system. The landscape irrigation system has a controller 1852 and manifold 1853, and pipes and sprinkler heads (not shown). An automatic 3-way valve 1854 is controlled by the controller 1804 of the EMFS. Upon activation of the EFMS the controller 1804 operates the valve 1854 to direct the flow of water to the EMFS and not to the irrigation system manifold 1853. The control 1804 can also turn off the power to the control 1852 upon activation of the EFMS.

The fire suppression material (e.g., water, foam, water-foam mix) is flowed to a series of individual connection assemblies, where the lines from the EFMS flow into the lines (pipes) for the landscape irrigation system, collectively shown as 1850. An example of an individual connection assembly is shown in call out circle 1850*a*. Thus, there is a line from the EFMS 1860 that is connected at a T joint or Y joint with the line 1863 from the irrigation manifold 1853. Thus, both line 1860 and 1863 are connected to line 1863 (or pipe) which goes to the irrigation systems sprinkler heads. Preferably check valves 1861 and 1862 are present to prevent backflow into the non-operating system.

Example 22

In an embodiment, the EMFS manifold(s) 1805*a* are not used. In this embodiment the line from the tie-in 1806 is attached directly to manifold 1853 of the irrigation system. Thus, the EFMS utilizes the existing manifold 1853 of the irrigation system. Further, in this manner connectors 1850 are also not needed.

Example 23

In embodiments the EFMS is an integrated system that operates and controls other devices and systems associated with the structure. Thus, in addition to having an operation control command plan for performing operation plans, such as one or more of a hydration plan, a lockout plan, a low line pressure plan, an adjacent structure based plan, an auto-activation notice with default activation plan, the EFMS can have operation control command plans and related hardware for one or more of the following, and combinations and variations of these.

managing HVAC systems in structures, such as control communications to a thermostat or breaker to turn off the HVAC system. shutting off electrical panels in a structure. In an embodiment the HVAC system can be configured to vent the structure to prevent, or mitigate, the amount of smoke that enters the structure.

turning on emergency circuits in emergency panels managing the temperature in the refrigerator to evacuation mode shutting off propane to a structure closing garage doors (embers commonly get inside garages or under garage doors and burn homes during fire)

turning on inside and outside lights to a structure. (it is very dark during a fire and turning on lights can aid in firefighting)

arming all security alarms in the event of a fire and evacuation. This will help prevent homes or businesses from being looted, after the structures and area have been evacuated managing and receiving information and data from anything in the structure that connects to a weather station and any downstream device that is regulated by a weather station that connects to Frontline data managing smart charging to homes managing, autonomous, non-autonomous, semi autonomous vehicles. planes, helicopters, drones, cars, boats managing and deploying fire blankets that wrap over structures when a fire comes. The blankets can be gravity deployed or deployed by a powered device, electrical or pneumatic. The blankets can be deployed before, preferably after, initial wetting by the system, and wetting can continue after deployment.

managing and deploying automatic fire shutters that shut over windows or doors. The shutters can be gravity deployed or deployed by a powered device, electrical or pneumatic. The shutters can be deployed before, preferably after, initial wetting by the system, and wetting can continue after deployment.

shutting off oil and gas lines, for each structure, for an area or zones of structures, and combinations and variations of these.

turning off password protection to routers by switching them into a emergency mode that firefighters can then use to enhance internet communication during a fire Pool architecture—a valve that closes the intake from a pool filter during a fire. Under certain circumstances, this would allow the pool water to be drawn solely from the drain at bottom of the pool, as opposed to also pulling off filter box 12" from surface level and causing air to enter lines after the top 12" of pool water is drawn down Example 24

In embodiments, communication towers, such as cell towers, radio towers, etc., have an EFMS.

Example 25

In embodiments, major electrical power line towers or polls have EFMS.

Example 26

In embodiments, structures and areas that house electrical power transformers, and communication hubs, such as internet hub have an EFMS. In the case of these electrical and internet structures and areas, the fire mitigation material should be suitable for use on electronics.

Example 27

In an embodiment the system is configure to automatically, or upon instructions from the use, select and use a particular type of fire suppression material. Thus, the user, the control system, or both can select from one or more of water, foam, water and foam, another pre-mixed fire retardant, mechanical protection such as fire blankets and combinations and variation of these. Different materials can be used at different times, and for different risk factors, and these materials can each be used alone or in combination, and in serial or parallel sequences.

Example 28

An embodiment of the present networks and systems can be configured and implemented to manage a hurricane emergency.

Example 29

Historic, actual, predictive, and derived hydration level data and information, and combinations and variations of these is used to determine the configuration of an EMFS. In this manner the hydration level data and information can form a basis in whole or part, to determine the number and placement of sprinkler heads, the amount of fire suppression material to be stored in the system.

Predictive hydration level data and information can be used to determined modifications that may be need to existing EMFS, to future, e.g., increased needs of the system to protect the structure. Thus, for example additional sprinkler heads, large capacity storage tanks for foam, could be recommended by the control system, for addition to the system.

Example 30

Embodiments of the EFMS, including any of the Examples, having one, two, tens, and hundreds, of individual structures and individual EMFS. These systems form a platform as a distributed network and based upon hydration data and information, historic, actual, derived, predicted, and combinations and variations of these, the platform determines optimum strategies for the use of available water to increase hydration levels in a manner that is optimum for the platform.

Example 31

The embodiments of the EFMS, including any of the Examples provide notifications to individuals, such as on hand held devices, fire crews and emergency management teams. The systems are also configured to receive input and control compunctions from one or more of these groups.

Example 32

Embodiments of the EFMS, including any of the Examples, are reconfigured and adapted for use with, as a part of, or integrated with, an internal fire suppress systems for the protection of the interior of structures. These internal systems can be integrated with, and preferable are a part of the distributed network of EMFS. The internal systems may rely upon the same source of fire mitigation material as the EMFS for the structure or they may have a completely separate source. Further, there may be a common back up source of fire suppression material that can be used, if needed, by both the EMFS and internal system.

The internal systems can similarly provide and receive information, communication and control communication from users, e.g., home owner, emergency management personal.

Example 33

A satellite system is configured to provide information to, and to manage embodiments of the EFMS, including any of the Examples.

Example 34

A system of drones, alone or in conjunction with, or without, the satellite system of Example 33, is configured to provide information to, and to manage embodiments of the EFMS, including any of the Examples.

Example 35

An EMFS system, including any of the Examples, or a separate system, is configured to provide water, or a cleaning solution, to solar panels. These systems can be installed on individual structures, e.g., solar panels on the roof of a house, or they can be utilized to protect large solar energy farms. These systems can be operation, on a timer, but preferably they are operated based upon fire conditions, for example, ash and particulate density in the air (actual, derived from fire conditions and wind conditions, or both).

Example 36

Embodiments of the EFMS having hydration plans and hydration control commands, including any embodiments of the Examples having hydration plans, can have and can maintain predetermined condition based hydration levels as shown in Table 1.

TABLE 1

| Hydration levels to be maintained by EMFS (Hydration Level as soil % water content by weight) | | | |
|---|---|---|---|
| | Minimal Hydration level | Recommended hydration level | Optimum hydration level |
| HIZ0 | 10-15% | 25% | 35+% |
| HIZ1 | 5%-10% | 20-25% | 25+% |
| HIZ2 | 5%-10% | 10-15% | 20-25% |

Hydration levels are by way of example and are for high-risk fire conditions

Example 37

Embodiments of the EFMS having hydration plans and hydration control commands, including any embodiments of the Examples having hydration plans, can provide hydration amounts and rates based upon predetermined conditions, e.g., a wildfire event, as shown in Table 2.

TABLE 2

| Hydration amounts and Timing in Face of Wildfire Event | | |
|---|---|---|
| | Primary Hydration amount | Replenishment Hydration amount |
| HIZ0 | 1" over 24 hours | 0.5" per each 24 hours after primary hydration |
| HIZ1 | 0.25" over 24 hours | 0.13" per each 24 hours after primary hydration |

Example 38

Embodiments of the EFMS, including any of the Examples, have discrete "scenes" or "modes" in the controller firmware of the EFMS controller, or in the control system in the cloud, or both, that act according to the exposure of the property, e.g., risk exposure, and then put the hydration plan into action, e.g., implement the hydration plan through the hydration control commands. For example, one mode may be a red flag warning mode, another a utility shutdown, another an evacuation mode, another an imminent fire mode, another a dry fuel moisture seasonal activation mode. There would be others that align with exposure (both real and perceived exposure, as well as, actual, predictive and derived exposure).

These modes could be triggered manually by selection of the user on their app or at their controller GUI located at the property; they can also be activated automatically by the integrated/network systems control system and software ingesting data (e.g., receiving data and information, whether from push, pull, or combinations of these and other ways of receiving data and information into the control systems) that is relevant to a certain property or properties, and then selecting the appropriate mode of protection; and combinations and variations of these manual and automatic modes. For example, an algorithm, e.g., logic on a controller, is configured such that if data is ingested indicating low fuel moistures for an area, then it can trigger activation of the EFMS in that area (such as at night when it will not interrupt the homeowner). The homeowner can opt into this feature on their app or an insurer or fire service can also opt in on behalf of their portfolio or their service area. The system may run all zones or select certain zones.

In this manner the use of hydration is coupled with exposure risks based upon actual, historic, predictive and derived data to protect and mitigate the risk to the structure from wildfire.

Additionally, the identification of the exposure (e.g., risk level, risk factors) and selection of data that is operable for the activation of systems is an embodiment of the present systems and methods. Selecting single or multiple data sources that determine fuel moisture, or fire exposure (ground based, satellite based, actual perimeters, spread modeling of where a fire can travel and expose, weather variables, etc.) are all integral in determining exposure in real time, actual, derived and predictive approaches.

Example 39

Embodiments of the EFMS having a hydration plan, and hydration control commands, including any of the embodiments of the Examples, can be configure for operation in a manner that makes, and maintains, the environment around the structure to be too wet to burn.

Thus, HIZ0 is five feet from the outer walls of the structure being protected, and has a footprint that follows the footprint of the structure. HIZ1 is adjacent to the outer edge of HIZ0 and extends outwardly therefrom to a distance that is 30 feet from the structure (e.g., HIZ1 starts at 5 feet away from the structure, i.e., adject to HIZ0, and extends 25 additional feet away from the structure). The system has two types of sprinkler heads that provide two patterns, small and large. The small patterns and the large patterns completely overlap over HIZ0, i.e., 100% overlap of HIZ0. The small patterns and the large patterns can also have a 60-70%, or greater, overlap for the entire protected area around the structure.

In exposures, e.g., risk factor, where ambers are present or likely to be present, a preferred wetting rate of about 1 inch of precipitation in 24 hours is provided to HIZ0I and HIZ1 receives about 0.25 inches of precipitation in 24 hours.

The system can also be configured to apply 0.75 inches, about 1.25 inches, about 1.5 inches, and about 2 inches, of precipitation per 24 hours to HIZ0. The system can also be configured to apply about 0.5 inches, about 0.75 inches, and about 1 inch of precipitation per 24 hours to HIZ1. Combinations and variations of these precipitation rates are contemplated. For example, depending on conditions and size of the zones, lower HIZ0 rates may be used in conjunction with higher HIZ1 rates. These rates, as well as, combinations and variations of them can also be used in a 3 zone system.

Example 40

Hydration plan control commands can have one or more different hydration plans. These hydration plans can be implemented by the control system executing the hydration plan control commands, and operating the EMFS to hydrate the zones surrounding a structure.

The hydration plans can have a series of operation cycles, or cycles, when the EFMS is operating and delivering water to the zones.

The usage rate of water during operation of a hydration plan can be about 25 gpm during a wetting cycle.

During fire seasons, before an actual fire event, prewetting hydration plans can be implemented. In these prewetting hydration plans, for example, three to four hydration cycles, i.e., operation of the EMFS to wet the zones, occur 1 to 2 times a week, with each cycle providing about 0.25% the amount of full hydration, e.g., ¼ inch of precipitation in 24 hours, where full hydration is 1 inch in 24 hours.

Maintenance hydration plans can be used to address evaporation, and in particular during high levels of evaporation. In these maintenance hydration plans, for example, about 6 hydration cycles, i.e., operation of the EMFS to wet the zones, occur in a 24 hours period, with the total wetting of all 6 cycles being about 50% the amount of full hydration, e.g., ½ inch of precipitation in 24 hours, where full hydration is 1 inch in 24 hours.

During a fire event, e.g., ambers present, active fire within predetermined distance, evacuation order, etc., an in-event soak, or soak, hydration plan can be used. In these soak hydration plans, for example, about 12 hydration cycles, i.e., operation of the EMFS to wet the zones, occur in a 24 hours period, with the total wetting of all 12 cycles being about 100% the amount of full hydration, e.g., 1 inch of precipitation in 24 hours, where full hydration is 1 inch in 24 hours.

In a preferred embodiment the control system has all three types of hydration plans, and can automatically switch from the operation of one plan to the next based in part of information and data provided to the control systems over the network.

Example 41

For the implementation of hydration plans, the fire suppression material, which as used in a hydration plan, would be considered the hydration material, can be water, a combination of water and foam, and foam. In a preferred embodiment, during an operating cycle, the hydration material is initially a water foam combination. For example, a 1:400 solution (foam:water by volume) of class A fire fighting foam approved by the USFS. This foam solution helps to break the surface tension of the water to accelerate absorption into vegetation and combustible fuels. The solution is preferably biodegradable, non-toxic, and requires no cleanup. The solution would be delivered preferably during the first ⅓ of the cycle, with the last ⅔ of the cycle being water.

Example 42

In an embodiment of in an interlock plan, the operation control command plan is configured to activate the EFMS at a structure, upon the activation of an internal fire suppression system at an adjacent structure.

Example 43

In an embodiment of in an operation plan, including an interlock plan, the operation control command plan is configured to close vents, preferably all vents, in an HVAC system, upon one or more of detection of embers, the EFMS at a structure, upon the activation of an internal fire suppression system at an adjacent structure.

Example 44

In an embodiment the control system having an operation control command plans for performing several operation plans, actively manages one, two, three or more, five or more, 10 or more, 100 or more, EFMS, with each EFMS associated with a structure and further with each such EFMS associated with the property identification number (PIN) for the parcel of land where the structure is located. A PIN is a number that is assigned to a parcel of real property (i.e., land). PIN is a unique identification code, typically having about 8 to 10 digits, but can have more or less. PINs are unique for every parcel of land in any given area or jurisdiction, can are assigned by the government, for example by taxing authorities. PINs can also be referred to as Property Tax ID Number, Folio Number, Parcel ID Number, as well as other terms used to describe this unique identification number.

The control system for each PIN receives relevant information about a wildfire, status of EFMS, internal fire suppression systems, and other factors and events, the control system can such real time, raw data to created determine data and predicative data, as well as balancing factors to determine an event. From this the control system for a parcel using the operation control command plan performs the various operation plans. Preferably, the control system does this for all EFMS that the control system is control communication with, which EFMS are in a determined area, e.g., an area under risk of an approaching wildfire. In this manner the control system determines an optimum plan for the activation, lockout, interlock of the EFMS and the peripheral system.

This parcel by parcel, PIN by PIN, manner of control can be viewed as controlling each pixel in a monitor. It being understood that the more parcels, for a particular area, that the control system is receiving information about, and the more EFMSs in that area, the better the optimization of the utilization of the EFMSs in that area will be. In configurations, and dependent on such things as specific location of the parcel, distribution of the EFMS, the presence of natural barriers and wind speed, optimization can be obtained by receiving parcel by parcel information (and having EFMS) on 5% or more of the parcels in the area, 10% or more of the parcels in the area, 25% or more of the parcels in the area, 50% or more of the parcels in the area, and 70% or more of the parcels in the area.

Example 44A

In an embodiment of this parcel-by-parcel control system, the control system evaluates, one, two, three or more of: water availability at the parcel level, amber fall out at the parcel level, location of the fire at the parcel level, wind speed, wind direction at a parcel level; hydration at a parcel level. The control system, using an operation control command plan, determines the optimum EFMS and peripheral system unitization strategy and status (e.g., activate, locked out, vents open, automatic activation notice, etc.) on a parcel by parcel, PIN by PIN, level, and upgrades this parcel by parcel, PIN by PIN, utilization strategy, periodically, as new information, events and factors are received.

Example 44B

In an embodiment of this parcel-by-parcel control system, the control system evaluates, the status of EFMSs and internal fire suppression systems at the parcel level, a with respect to each parcel. This evaluation includes an evaluation that a parcel does not have, or is not known to have, an EFMS, an internal fire suppression system or both. The control system, using an operation control command plan, determines the optimum EFMS and peripheral system unitization strategy and status (e.g., activate, locked out, vents open, automatic activation notice, etc.) on a parcel by parcel, PIN by PIN, level, and upgrades this parcel by parcel, PIN by PIN, utilization strategy, periodically, as new information, events and factors are received. Preferably, this updating is continuous.

Example 44C

In an embodiment of this parcel-by-parcel control system, the control system evaluates, one, two, three, four, or more, of water availability at the parcel level, amber fall out at the parcel level, hydration level on at the parcel level, location of the fire at a parcel level, wind speed and wind direction at a parcel level, the status of EFMSs at the parcel level, and the status of internal fire suppression systems at the parcel level. This evaluation includes an evaluation that a parcel does not have, or is not known to have, an EFMS. The control system, using an operation control command plan, determines the optimum EFMS and peripheral system unitization strategy and status (e.g., activate, locked out, vents open, automatic activation notice, etc.) on a parcel by parcel, PIN by PIN, level, and upgrades this parcel by parcel, PIN by PIN, utilization strategy, periodically, as new information, events and factors are received. Preferably, this updating is continuous.

It is noted that there is no requirement to provide or address the theory underlying the novel and groundbreaking performance or other beneficial features and properties that are the subject of, or associated with, embodiments of the present inventions. Nevertheless, various theories are provided in this specification to further advance the art in this important area, and in particular in the important area of lasers, laser processing and laser applications. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the operation, function and features of embodiments of the methods, articles, materials, devices and system of the present inventions; and such later developed theories shall not limit the scope of protection afforded the present inventions.

The various embodiments of networks, systems for providing and displaying data and information set forth in this specification may be used in the above identified fields and in various other fields. Additionally, these embodiments, for example, may be used with: existing networks, emergency systems, social media systems, alert systems, broadcast systems, as well as other existing equipment; future systems and activities; and such items that may be modified, in-part, based on the teachings of this specification. Further, the various embodiments set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combinations, e.g., A, C, D, and A. A" C and D, etc., in accordance with the teaching of this Specification. The scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A system for mitigating fire risks, the system comprising:

a. an external fire management system (EFMS);

b. a control system in control communication with the EFMS and configured for control communication with a GUI device;

c. the control system comprising an operation control command plan for performing an operation plan;

d. the operation control command plan for performing an operation plan comprising an auto-activation notice with default activation plan; and, e. wherein the auto-activation notice with default activation plan is configured to upon a first event:

i. determine a time to activation;

ii. start a countdown to activation based upon the determined time to activation;

iii. send a first automatic activation notice to the GUI device; and, iv. activate the EFMS upon an end of the countdown, unless the control system receives a deactivation instruction from the GUI device; and, v. wherein the auto-activation notice with default activation plan is configured to upon a second event adjust the time to activation to provide an adjusted countdown; send a second automatic activation notice to the GUI device, based upon the adjusted countdown; and activate the EFMS upon an end of the adjusted countdown, unless the control system receives a deactivation instruction from the GUI device.

2. The system of claim 1, wherein the auto-activation notice with default activation plan is configured to upon a third event adjust the time to activation to provide a second adjusted countdown; send a third automatic activation notice to the GUI device, based upon the second adjusted countdown; and activate the EFMS upon an end of the second adjusted countdown, unless the control system receives a deactivation instruction from the GUI device.

3. The system of claim 1, comprising a hydration plan.

4. The system of claim 1, comprising a lockout plan.

5. The system of claim 1, comprising two or more of an interlock, a hydration plan, a lockout plan, a low line pressure plan, and an adjacent structure based plan.

* * * * *